United States Patent
Lee et al.

(10) Patent No.: US 7,528,920 B2
(45) Date of Patent: May 5, 2009

(54) ARRAY SUBSTRATE FOR IN-PLANE SWITCHING MODE LIQUID CRYSTAL DISPLAY DEVICE AND METHOD OF FABRICATING THE SAME

(75) Inventors: Yun-Bok Lee, Seoul (KR); Won-Ho Lee, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 247 days.

(21) Appl. No.: 11/711,636

(22) Filed: Feb. 28, 2007

(65) Prior Publication Data

US 2007/0146607 A1    Jun. 28, 2007

Related U.S. Application Data

(62) Division of application No. 10/825,486, filed on Apr. 16, 2004, now Pat. No. 7,202,928.

(30) Foreign Application Priority Data

Oct. 16, 2003   (KR)   ................... 10-2003-0072124
Apr. 14, 2004   (KR)   ................... 10-2004-0025955

(51) Int. Cl.
*G02F 1/1368*   (2006.01)
*G02F 1/139*    (2006.01)
*G02F 1/1343*   (2006.01)

(52) U.S. Cl. .................. 349/141; 349/38; 349/187; 438/30

(58) Field of Classification Search .............. 349/38, 349/39, 42, 43, 106, 108, 110, 141, 146, 349/187; 257/59, 72; 438/30; 345/92
See application file for complete search history.

(56) References Cited

U.S. PATENT DOCUMENTS 5,069,813 A    12/1991    Patel
(Continued)

FOREIGN PATENT DOCUMENTS

JP    09-230311    9/1997
(Continued)

*Primary Examiner*—Dung Nguyen
*Assistant Examiner*—Tai Duong
(74) *Attorney, Agent, or Firm*—McKenna Long & Aldridge LLP

(57) ABSTRACT

An array substrate for use in an in-plane switching liquid crystal display device includes a gate line on a substrate; a data line crossing the gate line to define a pixel region having an aperture area; a thin film transistor disposed at one corner of the pixel region and connected to the gate line and the data line, the thin film transistor including a semiconductor layer; a common line spaced apart from and substantially parallel to the gate line; a common electrode extending from the common line and including a plurality of common electrode patterns, wherein an outermost portion of the common electrode pattern is substantially rectangle shaped within the pixel region and has a substantially circular opening in the middle thereof; a capacitor electrode overlapping the rectangle shaped common electrode pattern, the capacitor electrode connected to the thin film transistor; a pixel connecting line substantially parallel to the data line in the pixel region and connected to the capacitor electrode; and a pixel electrode disposed within the substantially circular opening, extending from the pixel connecting line and including a plurality of pixel electrode patterns; wherein an innermost pixel electrode pattern has a substantially circular shape and other pixel electrode patterns are patterned to have circular bands, and wherein the aperture area is circular banded shaped.

46 Claims, 48 Drawing Sheets

U.S. PATENT DOCUMENTS

| | | |
|---|---|---|
| 5,434,687 A | 7/1995 | Kawata et al. |
| 5,610,743 A | 3/1997 | Tsai |
| 5,977,562 A | 11/1999 | Hirakata et al. |
| 6,243,154 B1 | 6/2001 | You et al. |
| 6,433,764 B1 | 8/2002 | Hebiguchi et al. |
| 7,227,607 B2 * | 6/2007 | Lee ............................ 349/141 |
| 2003/0053020 A1 | 3/2003 | Okada et al. |
| 2003/0123011 A1 | 7/2003 | Chae |
| 2003/0189680 A1 | 10/2003 | Kim et al. |
| 2005/0128406 A1 | 6/2005 | Lee |

FOREIGN PATENT DOCUMENTS

| | | |
|---|---|---|
| JP | 09-325340 | 12/1997 |
| JP | 11-174482 | 7/1999 |
| JP | 2002-066621 | 3/2000 |
| JP | 2000-206533 | 7/2000 |
| JP | 2003-186017 | 7/2003 |
| KR | 1999-0048947 | 7/1999 |
| KR | 1999-0058889 | 7/1999 |
| KR | 19990058889 | 7/1999 |

* cited by examiner

[0V]

[2V]

[4V]

[6V]

[8V]

[10V]

US 7,528,920 B2

ARRAY SUBSTRATE FOR IN-PLANE SWITCHING MODE LIQUID CRYSTAL DISPLAY DEVICE AND METHOD OF FABRICATING THE SAME

This application is a divisional application of U.S. patent application Ser. No. 10/825,486, filed Apr. 16, 2004, now U.S. Pat. No. 7,202,928, which claim priority to Koran Patent Application No.: 10-2004-0025955, filed Apr. 14, 2004, and 10-2003-0072124, filed Oct. 16, 2003 all of which are incorporated by reference for all purposes as if fully set forth herein.

BACKGROUND OF THE INVENTION

1. Field of the Invention

The present invention relates to liquid crystal display devices. More particularly, the present invention relates to liquid crystal display devices implementing in-plane switching (IPS) where an electric field to be applied to liquid crystals is generated in a plane parallel to a substrate.

2. Discussion of the Related Art

A liquid crystal display device uses the optical anisotropy and polarization properties of liquid crystal molecules to produce an image. Liquid crystal molecules have a definite orientational alignment as a result of their long, thin shapes. The alignment direction can be controlled by an applied electric field. In other words, as an applied electric field changes, so does the alignment of the liquid crystal molecules. Due to the optical anisotropy, the refraction of incident light depends on the alignment direction of the liquid crystal molecules. Thus, by properly controlling an applied electric field, a desired light image can be produced.

Of the different types of known liquid crystal displays (LCDs), active matrix LCDs (AM-LCDs), which have thin film transistors (TFTs) and pixel electrodes arranged in a matrix form, are the subject of significant research and development because of their high resolution and superiority in displaying moving images.

LCD devices have wide application in office automation (OA) equipment and video units because they are light and thin and have low power consumption characteristics. The typical liquid crystal display panel has an upper substrate, a lower substrate and a liquid crystal layer interposed there between. The upper substrate, commonly referred to as a color filter substrate, usually includes a common electrode and color filters. The lower substrate, commonly referred to as an array substrate, includes switching elements, such as thin film transistors and pixel electrodes.

LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

In a conventional LCD device, the pixel and common electrodes are positioned on the lower and upper substrates, respectively, and the electric field induced between pixel and common electrodes is perpendicular to the lower and upper substrates. However, these conventional LCD devices have a very narrow viewing angle. In order to solve the problem of narrow viewing angle, in-plane switching liquid crystal display (IPS-LCD) devices have been proposed. The IPS-LCD devices typically include a lower substrate in which a pixel electrode and a common electrode are disposed, an upper substrate having no electrode, and a liquid crystal interposed between the upper and lower substrates. A detailed explanation of a typical IPS-LCD panel will be provided with reference to FIG. 1.

FIG. 1 is a schematic cross-sectional view illustrating a related art IPS-LCD panel. As shown in FIG. 1, upper and lower substrates 10 and 20 are spaced apart from each other, and a liquid crystal layer 30 is interposed there between. The upper and lower substrates 10 and 20 are often referred to as an array substrate and a color filter substrate, respectively. A common electrode 22 and a pixel electrode 24 on the lower substrate 20. The common and pixel electrodes 22 and 24 are aligned parallel to each other. On a surface of the upper substrate 10, a color filter layer (not shown) is commonly positioned in a position between the pixel electrode 24 and the common electrode 22 of the lower substrate 20. A voltage applied across the common and pixel electrodes 22 and 24 produces an electric field 26 through the liquid crystal 32. The liquid crystal 32 has a positive dielectric anisotropy, and thus it aligns parallel to the electric field 26.

When no electric field is produced by the common and pixel electrodes 22 and 24, i.e., off state, the longitudinal axes of the liquid crystal (LC) molecules 32 are parallel and form a definite angle with the common and pixel electrodes 22 and 24. For example, the longitudinal axes of the LC molecules 32 are arranged parallel with both the common and pixel electrodes 22 and 24.

On the contrary, when a voltage is applied to the common and pixel electrodes 22 and 24, i.e., on state, an in-plane electric field 26 that is parallel to the surface of the lower substrate 20 is produced because the common and pixel electrodes 22 and 24 are on the lower substrate 20. Accordingly, the LC molecules 32 are re-arranged to bring their longitudinal axes into coincidence with the electric field 26.

Therefore, the result is a wide viewing angle that ranges, for example, from about 80-85 degrees in up-and-down and left-and-right sides from a line vertical to the IPS-LCD panel.

FIG. 2 is a plan view illustrating one pixel of an array substrate according to a related art IPS-LCD device. As shown, gate lines 40 are transversely arranged and data lines 42 are disposed substantially perpendicular to the gate lines 40. A common line 50 is also transversely arranged parallel with the gate line 40 and is spaced apart from the gate line 40. The gate line 40, the common line 50 and a pair of the data lines 42 define a pixel region P on the array substrate. A thin film transistor (TFT) is disposed at a corner of the pixel region P near a crossing of the gate and data lines 40 and 42.

In each pixel, three common electrodes 44 extend perpendicularly from the common line 50, and two of the common electrodes 44 are disposed next to the data lines 42, respectively. A pixel connecting line 48 is disposed next to and parallel to the gate line 40, and is electrically connected to the TFT T. Pixel electrodes 46 extend perpendicularly from the pixel connecting line 48 toward the common line 50. Each of the pixel electrodes 46 is disposed between two of the common electrodes 44 parallel with the data line 42. Each of areas "I" between the respective common electrodes 44 and the respective pixel electrodes 46 is defined as a block where the liquid crystal molecules are re-arranged by the electric fields. In FIG. 2, there are four blocks in one pixel.

As shown in FIG. 2, the IPS-LCD device according to the related art re-arranges and operates the liquid crystal molecules using the electric field generated parallel with the array substrate. Thus, it can provide a wide viewing angle rather than the LCD device that forms the electric field perpendicular to the array substrate. Recently, however, some modifications have been developed in the IPS-LCD device in order to further increase the viewing angle.

FIG. 3 is a plan view of an array substrate for use in an IPS-LCD device having multiple domains according to the related art. Some of the detailed explanations previously explained with reference to FIG. 2 will be omitted in order to prevent duplicate explanations.

In FIG. 3, a pixel connecting line 58 is disposed over a common line 60. Common and pixel electrodes 54 and 56, respectively, are elongated from the common and pixel connecting lines 60 and 58, respectively, in an up-and-down direction. Both the common and pixel electrodes 54 and 56 have a zigzag shape with plural bent portions. The common and pixel electrodes 54 and 56 are parallel to each other and alternately arranged. The zigzag shape defines the multi domains in the pixel regions symmetrically to the bent portions of the common and pixel electrodes 54 and 56. The zigzag shape and the multi domain structures improve the viewing angle over the straight shaped structure of FIG. 2.

Moreover in FIG. 3, the pixel connecting line 58 overlaps the common line 60 so that an overlapped area becomes a storage capacitor CST. In particular, the pixel connecting line 58 acts as one electrode of the storage capacitor CST, while the overlapped portion of the common line 60 acts as the other electrode of the storage capacitor CST. One of the pixel electrodes 56 is connected to a drain electrode 62 so that all of the pixel electrodes 56 can electrically communicate with the TFT T.

However, the IPS-LCD device having the above-mentioned multi domains has a color shift problem based upon the viewing angles because of long and thin shapes of the liquid crystal molecules.

FIG. 4 is a graph illustrating viewing angle properties of a IPS-LCD device having the zigzag structure of FIG. 3. The IPS-LCD device having the zigzag-shaped common and pixel electrodes can have improved viewing angles in directions of ±90 and ±180 degrees, i.e., in right-and-left and up-and-down directions, as illustrated by reference lines "IVa" and "IVb" in FIG. 4. However, the viewing angles are degraded in directions of ±45 and ±135 degrees, i.e., in diagonal directions, as illustrated by references "IVc" and "IVd" in FIG. 4. Furthermore, a color shift also occurs based upon the viewing angles or directions.

When the voltages applied to the electrodes generate electric fields between the common and pixel electrodes, the liquid crystal molecules rotate about 45 degrees in accordance with the electric fields. Then, gray inversion occurs due to the rotation of the liquid crystal molecules. When the IPS-LCD is operated in gray mode, the IPS-LCD produces a yellowish color in 45(+45) degrees declination with respect to the liquid crystal polarization because of the optical anisotropy properties of liquid crystal molecules. The IPS-LCD also produces a bluish color in 135(−45) degrees declination with respect to the liquid crystal polarization because of the optical anisotropy properties of the liquid crystal molecules.

SUMMARY OF THE INVENTION

Accordingly, the present invention is directed to an array substrate for an in-plane switching mode liquid crystal display LCD device and method of manufacturing the same that substantially obviates one or more of the problems due to limitations and disadvantages of the related art.

An advantage of the present invention is to provide an array substrate and a method of forming the array substrate for use in an IPS-LCD device, which increase a viewing angle and prevent a color shift.

Another advantage of the present invention is to provide an array substrate and a method of forming the array substrate for use in an IPS-LCD device, which provide uniform director of liquid crystal molecules in all directions.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages, and in accordance with the purpose of the present invention, as embodied and broadly described, an array substrate for an in-plane switching liquid crystal display device comprising a gate line on a substrate; a data line crossing the gate line to define a pixel region having an aperture area; a thin film transistor disposed at one corner of the pixel region and connected to the gate line and the data line, the thin film transistor including a semiconductor layer; a common line spaced apart from the gate line with being parallel with the gate line; a common electrode extending from the common line and including a plurality of common electrode patterns, wherein an outermost portion of the common electrode pattern is substantially rectangle shaped within the pixel region and has a circular opening in the middle thereof; a capacitor electrode overlapping the substantially rectangle shaped common electrode pattern, the capacitor electrode connected to the thin film transistor; a pixel connecting line disposed parallel with the data line in the pixel region and connected to the capacitor electrode; and a pixel electrode disposing within the circular opening, extending from the pixel connecting line and including a plurality of pixel electrode patterns; wherein an innermost pixel electrode pattern has a circular shape and the other pixel electrode patterns are patterned to have circular bands, wherein an innermost portion of the plurality of common electrode patterns is circular shaped, and wherein the aperture area is circular band shaped.

In another aspect, a method of forming an array substrate for use in an in-plane switching liquid crystal display device is provided. The method includes forming a gate line having a gate electrode, a common electrode including a plurality of common electrode patterns and a common line disposed parallel to and spaced apart from the gate line on a substrate through a first mask process, wherein an outermost portion of the common electrode pattern has a substantially rectangle and a circular opening in the middle thereof; forming a gate insulating layer on the gate line, the common electrode and the common line; forming a semiconductor layer using a second mask process on the gate insulating layer and over the gate electrode; forming a data line crossing the gate line to define a pixel region having an aperture area, a source electrode extending from the data line, and a drain electrode spaced apart from the source electrode using a third mask process, wherein the source and drain electrodes overlaps opposite end portions of the semiconductor layer, the semiconductor layer being exposed between the source and drain electrodes, and the gate electrode, the semiconductor layer, the source electrode and the drain electrode constitute a thin film transistor; forming a passivation layer over an entire of the substrate to cover the thin film transistor and then patterning the passivation layer through a fourth mask process to form a drain contact hole exposing a portion of the drain electrode; and forming a capacitor electrode that overlaps the outermost portion of the common electrode pattern and connects to the drain electrode, a pixel connecting line connected to the capacitor electrode, and a pixel electrode extending from the pixel connecting line and including a plurality of pixel electrode patterns on the passivation layer through a fifth mask process; wherein an innermost pixel electrode pattern has a circular shape, wherein an innermost portion of the plurality of common electrode patterns and the plurality of pixel electrode patterns are circular band shaped, wherein the aperture area is circular band shaped.

In another aspect, a method of forming an array substrate for use in an in-plane switching liquid crystal display device is provided. The method includes forming a gate line having a gate electrode, a common electrode including a plurality of common electrode patterns and a common line disposed parallel to and spaced apart from the gate line on a substrate through a first mask process, wherein an outermost portion of the common electrode pattern is substantially rectangle shaped and has a substantially circular opening in the middle thereof; forming a gate insulating layer on the gate line, the common electrode and the common line; forming a data line crossing the gate line to define a pixel region having an aperture area, a source electrode extending from the data line, a drain electrode spaced apart from the source electrode across the gate electrode, a semiconductor layer under the data line and having the same pattern shape as the data line, a semiconductor layer that extends from the semiconductor line over the gate electrode and under the source and drain electrodes using a second mask process, wherein the source and drain electrodes overlap opposite end portions of the gate electrode, the semiconductor layer being exposed between the source and drain electrodes, and the gate electrode, the semiconductor layer, the source electrode and the drain electrode form a thin film transistor; forming a passivation layer over an entire surface of the substrate to cover the thin film transistor and then patterning the passivation layer using a third mask process to form a drain contact hole to expose a portion of the drain electrode; and forming a capacitor electrode that overlaps the outermost portion of the common electrode pattern and connects to the drain electrode, a pixel connecting line connected to the capacitor electrode, and a pixel electrode that extends from the pixel connecting line and includes a plurality of pixel electrode patterns on the passivation layer using a fourth mask process; wherein an innermost pixel electrode pattern has a circular shape, wherein an innermost portion of the plurality of common electrode patterns and the plurality of pixel electrode patterns are circular band shaped, and wherein the aperture are is circular band shaped.

In another aspect, an array substrate for use in an in-plane switching liquid crystal display device is provided. The array substrate includes a gate line on a substrate; a data line crossing the gate line to define a pixel region having an aperture area; a thin film transistor disposed at one corner of the pixel region and connected to the gate line and the data line, the thin film transistor including a semiconductor layer; a common electrode disposing in the pixel region and having first and second common electrode patterns, wherein the first common electrode pattern is substantially rectangle shaped and has a substantially circular opening in the middle thereof, and the second common electrode pattern is disposed in the circular opening and has a gyre shape; a common line substantially perpendicular to and crossing the data line and connecting the common electrode to a neighboring common electrode in a neighboring pixel region; a capacitor electrode overlapping the first common electrode pattern, the capacitor electrode connected to the thin film transistor; a pixel electrode disposed within the substantially circular opening and having a gyre shape along a side of the second common electrode pattern, wherein the pixel electrode and the second common electrode pattern each have the substantially gyre shape; and wherein the aperture area is substantially gyre shaped.

In another aspect, a method of forming an array substrate for an in-plane switching liquid crystal display device is provided. The method includes forming a gate line having a gate electrode, a common electrode having first and second common electrode patterns, and a common line disposed parallel to and spaced apart from the gate line on a substrate using a first mask process, wherein the first common electrode pattern is substantially rectangle shaped and has a substantially circular opening in the middle thereof, and the second common electrode pattern is disposed in the substantially circular opening and has a substantially gyre shape; forming a gate insulating layer on the gate line, the common electrode and the common line; forming a semiconductor layer on the gate insulating layer and over the gate electrode using a second mask process; forming a data line that crosses the gate line to define a pixel region having an aperture area, a source electrode extending from the data line, and a drain electrode spaced apart from the source electrode using a third mask process, wherein the source and drain electrodes overlap opposite end portions of the semiconductor layer, the semiconductor layer being exposed between the source and drain electrodes, and the gate electrode, the semiconductor layer, the source electrode and the drain electrode form a thin film transistor; forming a passivation layer over an entire surface of the substrate to cover the thin film transistor and patterning the passivation layer using a fourth mask process to form a drain contact hole to expose a portion of the drain electrode; and forming a capacitor electrode overlapping the first common electrode pattern, and a pixel electrode within the substantially circular opening and having a substantially gyre shape along a side of the second common electrode pattern using a fifth mask process, wherein the capacitor electrode is connected to the thin film transistor, and the pixel electrode and the second common electrode pattern each have the substantially gyre shape, wherein the aperture area is substantially gyre shape.

In another aspect, a method of forming an array substrate for an in-plane switching liquid crystal display device is provided. The method includes forming a gate line having a gate electrode, a common electrode having first and second common electrode patterns, and a common line disposed substantially parallel to and spaced apart from the gate line on a substrate using a first mask process, wherein the first common electrode pattern is substantially rectangle and has a substantially circular opening in the middle thereof, and the second common electrode pattern is disposed in the substantially circular opening and has a substantially gyre shape; forming a gate insulating layer on the gate line, the common electrode and the common line; forming a data line that crosses the gate line to define a pixel region having an aperture area, a source electrode extending from the data line, a drain electrode spaced apart from the source electrode across the gate electrode, a semiconductor layer under the data line and having the same pattern shape as the data line, and a semiconductor layer extending from the semiconductor line over the gate electrode and under the source and drain electrode using a second mask process, wherein the source and drain electrodes overlap opposite end portions of the gate electrode, the semiconductor layer being exposed between the source and drain electrodes, and the gate electrode, the semiconductor layer, the source electrode and the drain electrode forming a thin film transistor; forming a passivation layer over an entire surface of the substrate to cover the thin film transistor and patterning the passivation layer using a third mask process to form a drain contact hole to expose a portion of the drain electrode; and forming a capacitor electrode overlapping the first common electrode pattern, and a pixel electrode disposing within the substantially circular opening and having a substantially gyre shape along the second common electrode pattern using a fourth mask process, wherein the capacitor electrode is connected to the thin film transistor, and the pixel electrode and the second common electrode pattern each have the substantially gyre shape, wherein the aperture area is substantially gyre shape.

In another aspect, an array substrate for an in-plane switching liquid crystal display device is provided. The array substrate includes a gate line on a substrate; a data line crossing the gate line to define a pixel region having an aperture area; a semiconductor line under the data line and having the same pattern shape as the data line; a thin film transistor disposed at one corner of the pixel region and connected to the gate and data lines, the thin film transistor including source and drain electrodes and a semiconductor layer extending from the semiconductor line; a common line spaced apart from and substantially parallel to the gate line; a common electrode extending from the common line and including a plurality of common electrode patterns, wherein an outermost common electrode pattern is substantially rectangle within the pixel region and has a substantially circular opening in the middle thereof; a capacitor electrode overlapping a previous gate line of a previously neighboring pixel region; a pixel electrode within the substantially circular opening and including a plurality of pixel electrode patterns; and a pixel connecting line substantially parallel to the data line in the pixel region and connected to the capacitor electrode, the pixel electrode and the drain electrode of the thin film transistor; wherein the pixel electrode overlaps portions of the pixel connecting line and directly contacts the pixel connecting line; wherein an innermost pixel electrode pattern has a substantially circular shape and other pixel electrode patterns are patterned to have circular bands, and wherein the plurality an innermost portion of the common electrode patterns is substantially circular band shaped, and wherein the aperture area is circular band shaped.

In anther aspect, a method of forming an array substrate for use in an in-plane switching liquid crystal display device is provided. The method includes forming a gate line having a gate electrode, a common electrode including a plurality of common electrode patterns, and a common line substantially parallel to and spaced apart from the gate line on a substrate using a first mask process, wherein an outermost common electrode pattern is substantially rectangle shaped and has a substantially circular opening in the middle thereof; forming a gate insulating layer on the gate line, the common electrode and the common line; forming a data line crossing the gate line to define a pixel region having an aperture area, a source electrode extending from the data line, a drain electrode spaced apart from the source electrode across the gate electrode, a pixel connecting line extending from the drain electrode and substantially parallel to the data line, a capacitor electrode over a previous gate line with extending from the pixel connecting line, a semiconductor line under the data line and having the same pattern shape as the data line, and a semiconductor layer extending from the semiconductor line over the gate electrode and under the source and drain electrode using a second mask process, wherein the source and drain electrodes overlap opposite end portions of the gate electrode, the semiconductor layer being exposed between the source and drain electrodes, and the gate electrode, the semiconductor layer, the source electrode and the drain electrode forming a thin film transistor; forming a photoresist pattern on the thin film transistor using a third mask process, the photoresist pattern having openings between the plurality of common electrode patterns; forming a transparent conductive layer on an entire surface of the substrate to cover the photoresist pattern; and removing the transparent conductive layer on the photoresist pattern by stripping the photoresist pattern to obtain a pixel electrode, wherein the pixel electrode fits in the openings of the photoresist and directly contacts the pixel connecting line and including a plurality of pixel electrode patterns, wherein an innermost pixel electrode pattern has a substantially circular shape and other pixel electrode patterns are patterned to have circular bands, wherein an innermost portion of the plurality of common electrode patterns is substantially circular band shaped, and wherein the aperture area is circular band shaped.

In another aspect, an array substrate for use in an in-plane switching liquid crystal display device is provided. The array substrate includes a gate line on a substrate; a data line crossing the gate line to define a pixel region having an aperture area; a semiconductor line under the data line and having the same pattern shape as the data line; a thin film transistor disposed at one corner of the pixel region and connected to the gate and data lines, the thin film transistor including source and drain electrodes and a semiconductor layer extending from the semiconductor line; a common line spaced apart from and substantially parallel to the gate line; a capacitor electrode overlapping a previous gate line of a previously neighboring pixel region; a pixel connecting line substantially parallel to the data line within the pixel region and connected to the capacitor electrode and the drain electrode of the thin film transistor; a common electrode including a plurality of common electrode patterns, each of common electrode patterns divided into two parts by the pixel connecting line without overlapping the pixel connecting line; and a pixel electrode within the substantially circular opening and including a plurality of pixel electrode patterns without overlapping the common line, wherein an outermost common electrode pattern is substantially rectangle shaped within the pixel region and has a substantially circular opening in the middle thereof, and other common electrode patterns are shaped substantially like semicircular arcs, wherein an innermost pixel electrode pattern has a rod shape and is disposed within an area of pixel connecting line, and the other pixel electrode patterns have a substantially semicircular-arc shape; and wherein the plurality of common electrode patterns the plurality of pixel electrode patterns form substantially circular band shaped aperture area.

In another aspect, a method of forming an array substrate for use in an in-plane switching liquid crystal display device is provided. The method includes forming a gate line having a gate electrode and a common line substantially parallel to and spaced apart from the gate line on a substrate using a first mask process; forming a gate insulating layer on the gate line and the common line; forming a data line that crosses the gate line to define a pixel region having an aperture area, a source electrode extending from the data line, a drain electrode spaced apart from the source electrode across the gate electrode, a pixel connecting line extending from the drain electrode and substantially parallel to the data line, a capacitor electrode over a previous gate line extending from the pixel connecting line, a semiconductor line under the data line and having the same pattern shape as the data line, and a semiconductor layer extending from the semiconductor line over the gate electrode and under the source and drain electrode using a second mask process, wherein the source and drain electrodes overlap opposite end portions of the gate electrode, the semiconductor layer being exposed between the source and drain electrodes, and the gate electrode, the semiconductor layer, the source electrode and the drain electrode forming a thin film transistor; forming a photoresist pattern on the thin film transistor using a third mask process, the photoresist pattern including first two symmetric open portions separated from the pixel connecting line without overlapping the pixel connecting line and second two symmetric open portions separated from the common line without overlapping the common line; etching the gate insulating layer using the photoresist pattern as an etch mask to expose the common and pixel connecting lines under the first two symmetric open portions; forming a transparent conductive layer on an entire surface of the substrate having the photoresist pattern; and removing the transparent conductive layer on the photoresist pattern by stripping the photoresist pattern to obtain a common electrode and a pixel electrode, wherein the common and pixel electrodes fit in the first and second symmetric open portions of the photoresist, the common electrode including a plurality of common electrode patterns, and the pixel electrode including a plurality of pixel electrode patterns, wherein an outermost common electrode pattern is substantially rectangle shaped within the pixel region and has a substantially circular opening in the middle thereof, and other common electrode patterns are patterned to have substantially semicircular arcs, wherein an innermost pixel electrode pattern has a rod shape and is disposed within an area of pixel connecting line, and the other pixel electrode patterns are substantially semicircular-arc shaped, and wherein the aperture area is circular band shaped.

In another aspect, an array substrate for use in an in-plane switching liquid crystal display device is provided. The array substrate a gate line on a substrate; a data line crossing the gate line to define a pixel region having an aperture area; a thin film transistor disposed at one corner of the pixel region and connected to the gate line and the data line, the thin film transistor including a gate electrode, a semiconductor layer and source and drain electrodes; a common line spaced apart and substantially parallel to the gate line; a common electrode extending from the common line and including a plurality of common electrode patterns, wherein an outermost common electrode pattern is substantially rectangle shaped within the pixel region and has a substantially rectangular opening in the middle thereof; a capacitor electrode overlapping the substantially rectangular common electrode pattern, the capacitor electrode connected to the thin film transistor; a pixel connecting line substantially parallel to the data line in the pixel region and connected to the capacitor electrode; and a pixel electrode within the substantially rectangular opening, extending from the pixel connecting line and including a plurality of pixel electrode patterns, wherein an innermost pixel electrode pattern has a substantially circular shape and other pixel electrode patterns are patterned to have circular bands, wherein an innermost portion of the plurality of common electrode patterns is circular band shaped, and wherein the aperture area is circular band shaped.

In another aspect, an array substrate for use in an in-plane liquid crystal display device is provided. The array substrate includes a gate line on a substrate; a data line crossing the gate line to define a pixel region; a semiconductor line under the data line and having the same pattern shape as the data line; a thin film transistor disposed at one corner of the pixel region and connected to the gate and data lines, the thin film transistor including source a gate electrode, and drain electrodes and a semiconductor layer extending from the semiconductor line; a common line spaced apart from and substantially parallel to the gate line; a capacitor electrode overlapping a previous gate line of a previously neighboring pixel region; a pixel connecting line substantially parallel to the data line in the pixel region, extending from the drain electrode, and connecting the capacitor electrode and the drain electrode of the thin film transistor; a passivation layer over the thin capacitor and pixel electrodes, the passivation layer having first and second contact holes that expose the common line and pixel connecting line, respectively; a common electrode on the passivation layer and having a plurality of common electrode patterns, wherein an outermost common electrode pattern is continuously connected to neighboring outermost common electrode patterns of neighboring pixel regions and has a substantially circular opening in the middle of the pixel region, and other common electrode patterns have circular band shapes; and a pixel electrode disposing within the substantially circular opening and including a plurality of pixel electrode patterns, wherein an innermost pixel electrode pattern has a substantially circular shape and is disposed over a crossing of the common and pixel connecting lines, and the other pixel electrode patterns have circular band shapes.

In another aspect, an array substrate for an in-plane switching liquid crystal display device is provided. The array substrate includes a gate line on a substrate; a data line crossing the gate line to define a pixel region having an aperture area; a gate pad connected to one end of the gate line; a data pad connected to one end of the data line; a gate pad terminal connected to the gate pad; a data pad terminal connected to the data pad; a semiconductor line under the data line and having the same pattern shape as the data line; a thin film transistor disposed at one corner of the pixel region and connected to the gate and data lines, the thin film transistor including source and drain electrodes and a semiconductor layer extending from the semiconductor line; a common line spaced apart from and substantially parallel to the gate line; a common electrode extending from the common line and including a plurality of common electrode patterns, wherein an outermost common electrode pattern is substantially rectangle-shaped within the pixel region and has a substantially circular opening in the middle thereof; a capacitor electrode overlapping a previous gate line of a previously neighboring pixel region; a pixel electrode within the substantially circular opening and including a plurality of pixel electrode patterns; and a pixel connecting line substantially parallel to the data line in the pixel region and connected to the capacitor electrode, the pixel electrode and the drain electrode of the thin film transistor, wherein the innermost pixel electrode pattern is shaped like a rod and disposed within an area of the pixel connecting line, wherein the pixel electrode overlaps portions of the pixel connecting line and directly contacts the pixel connecting line, wherein other pixel electrode patterns are patterned to have semicircular shapes, and wherein the semiconductor line extends underneath the source and drain electrodes, the pixel connection line and the capacitor electrode, wherein an innermost portion of the plurality of common electrode patterns is substantially circular band shaped, and wherein the aperture area is circular band shaped.

In another aspect, a method of forming an array substrate for use in an in-plane switching liquid crystal display device is provided. The method includes forming a gate line having a gate electrode, a common electrode including a plurality of common electrode patterns, a gate pad connected to one end of the gate line and a common line substantially parallel to and spaced apart from the gate line on a substrate using a first mask process, wherein an outermost common electrode pattern is substantially rectangle-shaped and has a substantially circular opening in the middle thereof; forming a gate insulating layer on the gate line, the common electrode, the gate pad and the common line; forming a data line that crosses the gate line to define a pixel region having an aperture area, a source electrode extending from the data line, a drain electrode spaced apart from the source electrode across the gate electrode, a pixel connecting line extending from the drain electrode and substantially parallel to the data line, a capacitor electrode over a previous gate line with extending from the pixel connecting line, a data pad connected to one end of the data line, a semiconductor line under the data line and having the same pattern shape with the data line, and a semiconductor layer extending from the semiconductor line over the gate electrode and under the source and drain electrodes and pixel connecting line and capacitor electrode using a second mask process, wherein the source and drain electrodes overlap opposite end portions of the gate electrode, the semiconductor layer being exposed between the source and drain electrodes, and the gate electrode, the semiconductor layer, the source electrode and the drain electrode form a thin film transistor; forming a passivation layer over the data line, the source and drain electrodes, the data pad, the pixel connecting line, and the capacitor electrode; forming a photoresist pattern on the passivation layer to cover the thin film transistor using a third mask process, the photoresist pattern having openings between the plurality of common electrode patterns and contact openings exposing the gate and data pads; forming a transparent conductive layer on an entire surface of the substrate to cover the photoresist pattern; and removing the transparent conductive layer on the photoresist pattern by stripping the photoresist pattern to obtain a pixel electrode, a gate pad terminal and a data pad terminal, wherein the pixel electrode fits in the openings of the photoresist and directly contacts the pixel connecting line, the pixel electrode including a plurality of pixel electrode patterns, wherein an innermost pixel electrode pattern has a substantially rod shape and other pixel electrode patterns are patterned to have semicircular shapes, wherein an innermost portion of the plurality of common electrode patterns is substantially circular band shaped, and wherein the aperture area is circular band shaped.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the present invention and together with the description serve to explain the principles of that invention.

In the drawings.

DETAILED DESCRIPTION OF THE ILLUSTRATED EMBODIMENTS

Reference will now be made in detail to illustrated embodiments of the present invention, examples of which are shown in the accompanying drawings. Wherever possible, similar reference numbers will be used throughout the drawings to refer to the same or similar parts.

Figure 1:
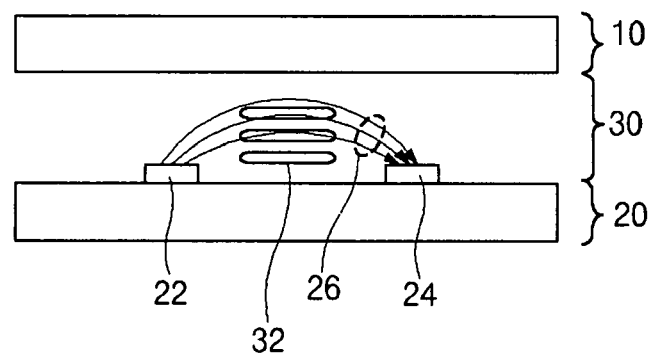
FIG. 1 is a schematic cross-sectional view illustrating a related art IPS-LCD panel.
Figure 2:
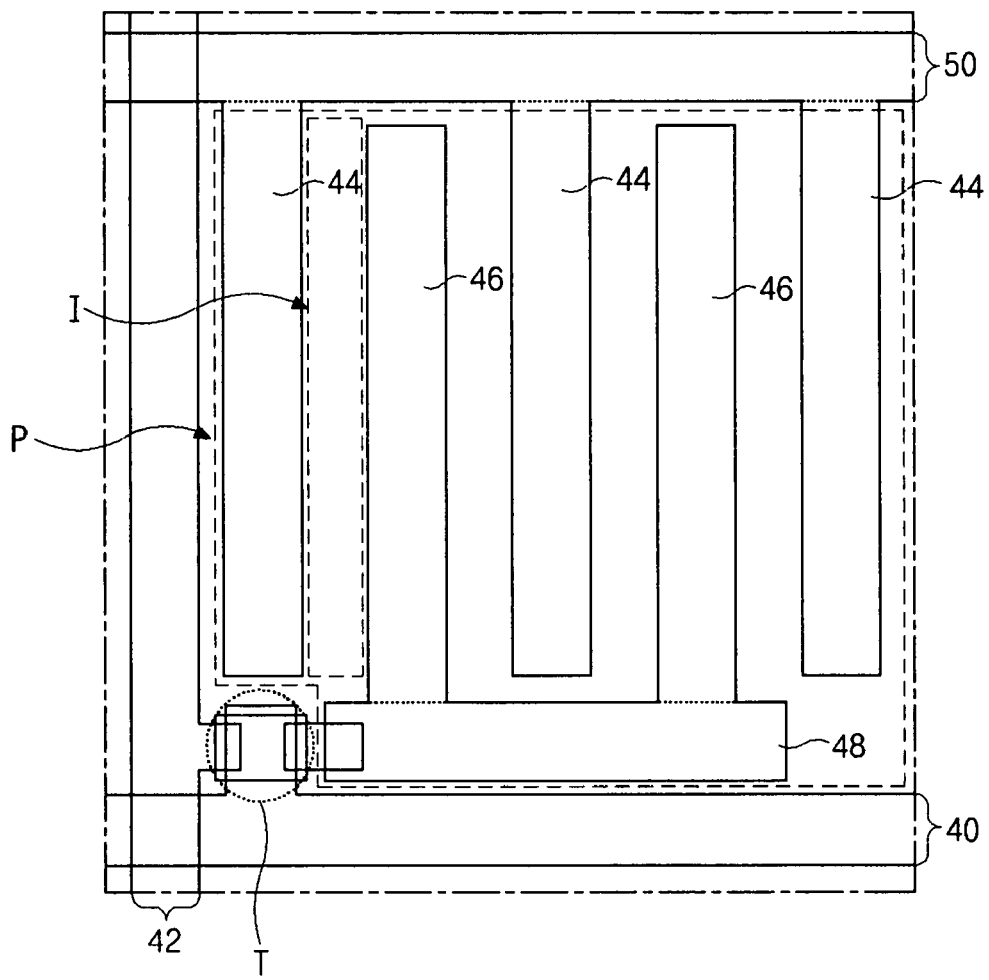
FIG. 2 is a plan view illustrating a pixel of an array substrate according to a related art IPS-LCD device.
Figure 3:
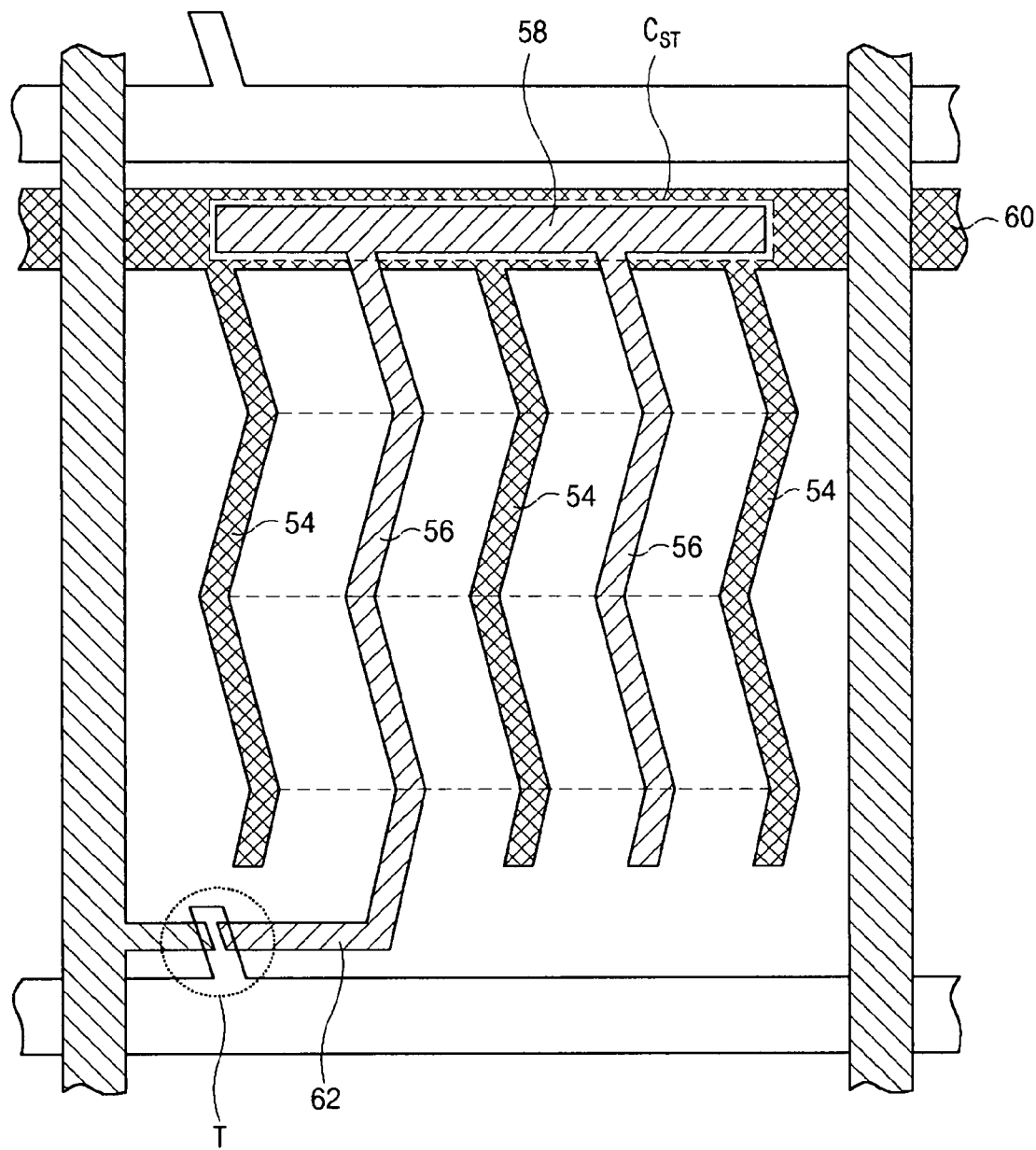
FIG. 3 is a plan view of an array substrate for use in an IPS-LCD device having multiple domains according to the related art.
Figure 4:
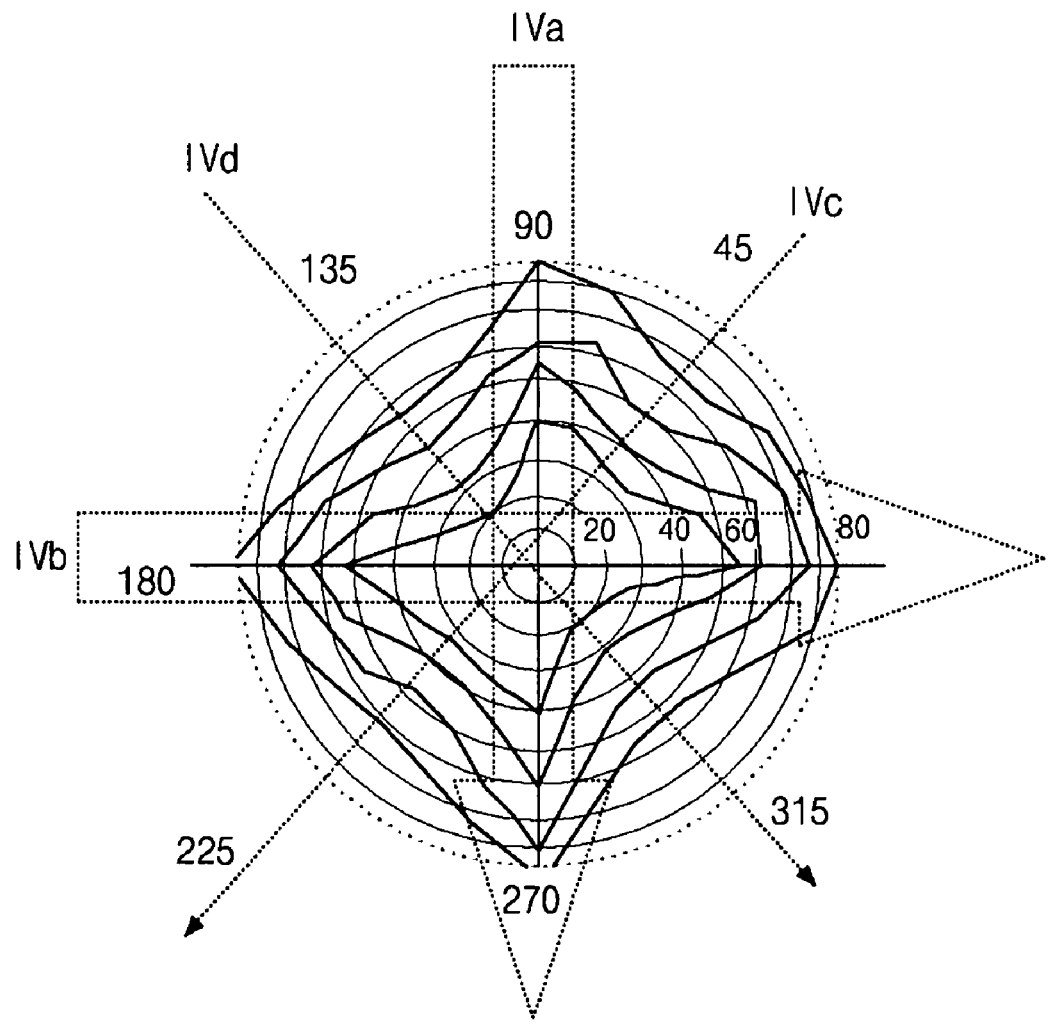
FIG. 4 is a graph illustrating a viewing angle of the IPS-LCD device having the zigzag structure of FIG. 3.
Figure 5:
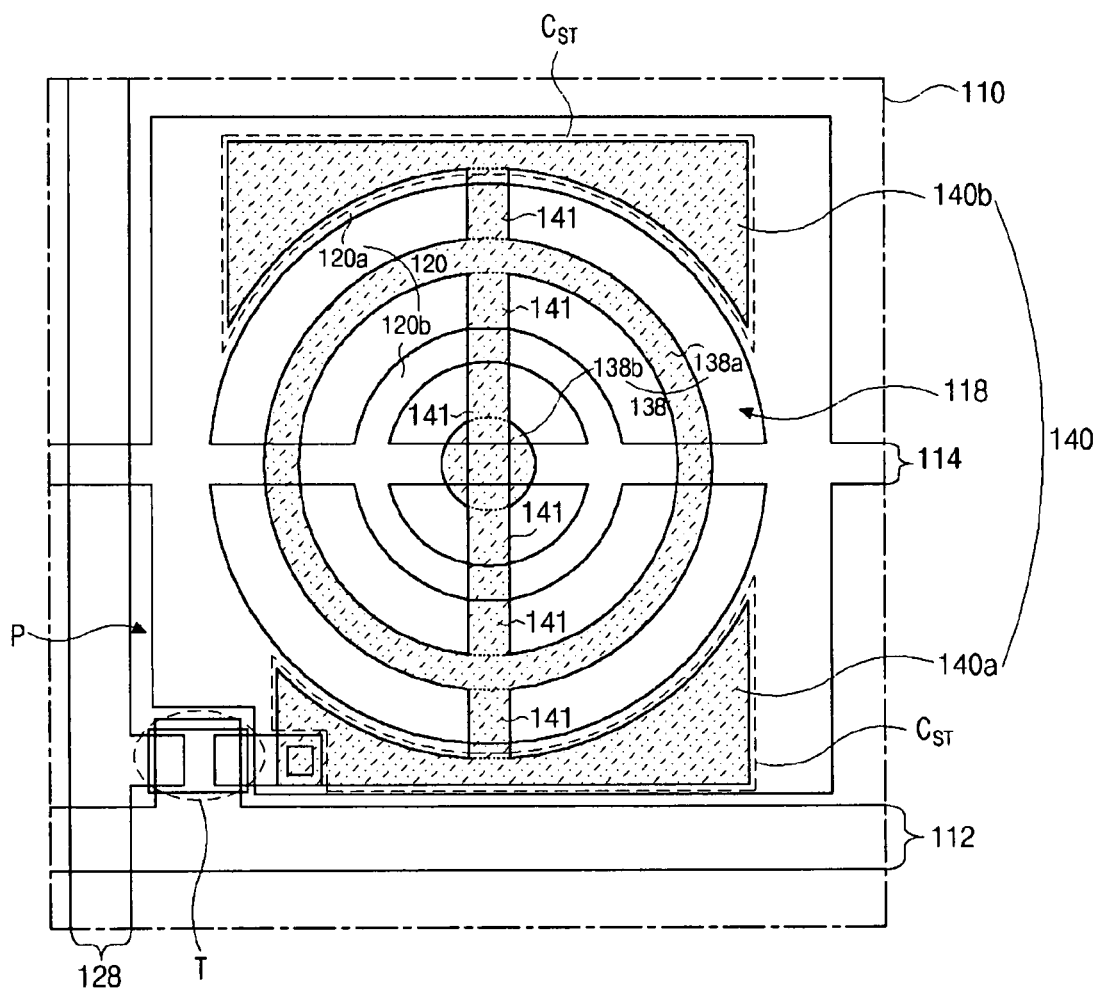
FIG. 5 is a plan view illustrating a pixel of an array substrate for use in an IPS-LCD device according a first embodiment of the present invention.

FIG. 5 is a plan view illustrating a pixel of an array substrate for use in an IPS-LCD device according a first embodiment of the present invention. In this embodiment, the common and pixel electrodes have a circular shape, and the array substrate is fabricated using a five-mask process.

As shown in FIG. 5, a gate line 112 is transversely arranged and a data line 128 is disposed substantially perpendicular to the gate line 112. A pair of gate and data lines 112 and 128 define one pixel region P on a substrate 110, and common and pixel electrodes 120 and 138, respectively, both having circular shapes, are formed within the pixel region P. Because the pixel electrode 138 and the common electrode 120 have the circular shapes, liquid crystal detectors are the same in all directions and color inversion along a specific angle is prevented. A thin film transistor (TFT) T is disposed near a crossing of the gate and data lines 112 and 128, respectively. A common line 114 runs from left to right in the middle of the pixel region P and is substantially parallel with and spaced apart from the gate line 112.

The common electrode 120 includes a firs common electrode pattern 120a that surrounds the pixel region P and has a circular opening 118 in the middle, and a second common electrode pattern 120b within the circular opening 118. First, half portions of the first and second common electrode patterns 120a and 120b extend from the common line 114 in an upward direction, and second half portions extend from the common line 114 in a downward direction. Thus, the first and second common electrode patterns 120a and 120b are connected to the common line 114. The first common electrode pattern 120a is shaped like a rectangle and has the circular opening 118 therein, while the second common electrode pattern 120b is shaped like a ring. Because the common line 114 transversely crosses the pixel region P, the common line 114 corresponds to and crosses along a diametric line of the circular band shaped second common electrode pattern 120b and the circular opening 118.

A capacitor electrode 140 is formed in an area where the first common electrode pattern 120a is disposed such that the capacitor electrode 140 overlaps the first common electrode pattern 120a and forms a storage capacitor "CST" with the overlapped portions of the first common electrode pattern 120a. The capacitor electrode 140 includes a first capacitor electrode pattern 140a and a second capacitor electrode pattern 140b, respectively, in bottom and top portions of the pixel region P. The first capacitor electrode pattern 140a is connected to the second capacitor electrode pattern 140b through a pixel connecting line 141, and the first capacitor electrode pattern 140a is connected to the TFT T.

The pixel electrode 138 includes first and second pixel electrode patterns 138a and 138b. The first pixel electrode pattern 138a has a ring shape and is disposed between the first and second common electrode patterns 120a and 120b, and the second pixel electrode pattern 138b has a circular shape is disposed inside the circular band shaped second common electrode pattern 120b. The pixel connecting line 141 is vertically disposed in the middle of the pixel region P and connects the first and second capacitor electrode patterns 140a and 140b to each other. Furthermore, the pixel connecting line 141 also connects the first pixel electrode pattern 138a to the second pixel electrode pattern 138b. Accordingly, the pixel electrode 138, the capacitor electrode 140 and the pixel connecting line 141 may form as one united or integrated body during the same patterning process.

In the first embodiment illustrated with reference to FIG. 5, the pixel region P may be divided into multi domains, e.g., four domains, by the pixel connecting line 141 and the common line 114. To prevent reduction of a lateral electric field between the first common electrode pattern 120a and the first pixel electrode pattern 138a, the capacitor electrode 140 may be formed to have a smaller area than the first common electrode pattern 120a and expose edge portions of the first common electrode pattern 120a. Moreover, since aperture areas defined between the common and pixel electrodes 120 and 138 have circular shapes, the liquid crystal directors become the same in all directions. Thus, the color shift is provided that would have occurred in ±45 directions of the related art. Furthermore, the image quality of the IPS-LCD device is improved, and the IPS-LCD device has much wider viewing angle.

FIGS. 6A-6E are plan views illustrating process steps of forming the array substrate of FIG. 5. In this embodiment, the fabrication is completed using a five-mask process.

Figure 6A:
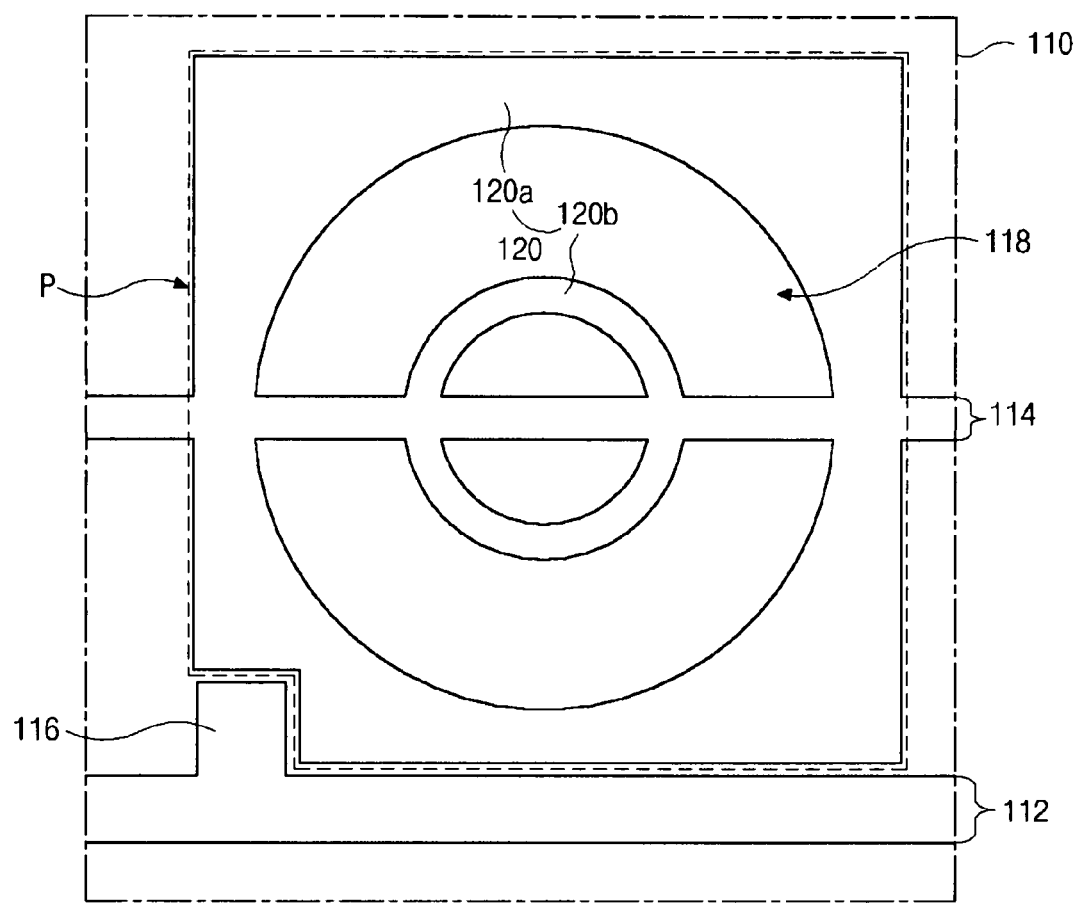
FIGS. 6A-6E are plan views illustrating process steps of forming the array substrate of FIG. 5.

In FIG. 6A, a first metal layer is formed on the substrate 110 and then patterned in a first mask process to form a gate electrode 116, the gate line 112, the common line 114, the common electrode 120 and the circular opening 118. As described with reference to FIG. 5, the gate line 112 and the common line 114 are transversely disposed. The gate electrode 116 extends from the gate line 112, and the common electrode 120 extends from the common line 114 in both up and down directions. The common electrode 120 includes the first and second common electrode patterns 120a and 120b. The first common electrode pattern 120a includes the circular opening 118 therein. Also, the first common electrode pattern 120a is shaped like a rectangle within the pixel region P such that it surrounds a boundary portion of the pixel region P. The second common electrode pattern 120b has a ring shape and is disposed within the circular opening 118. The common line 114 crosses the pixel region P in the middle such that it runs along the diametric line of the circular band shaped second common electrode pattern 120b and the circular opening 118.

Figure 6B:
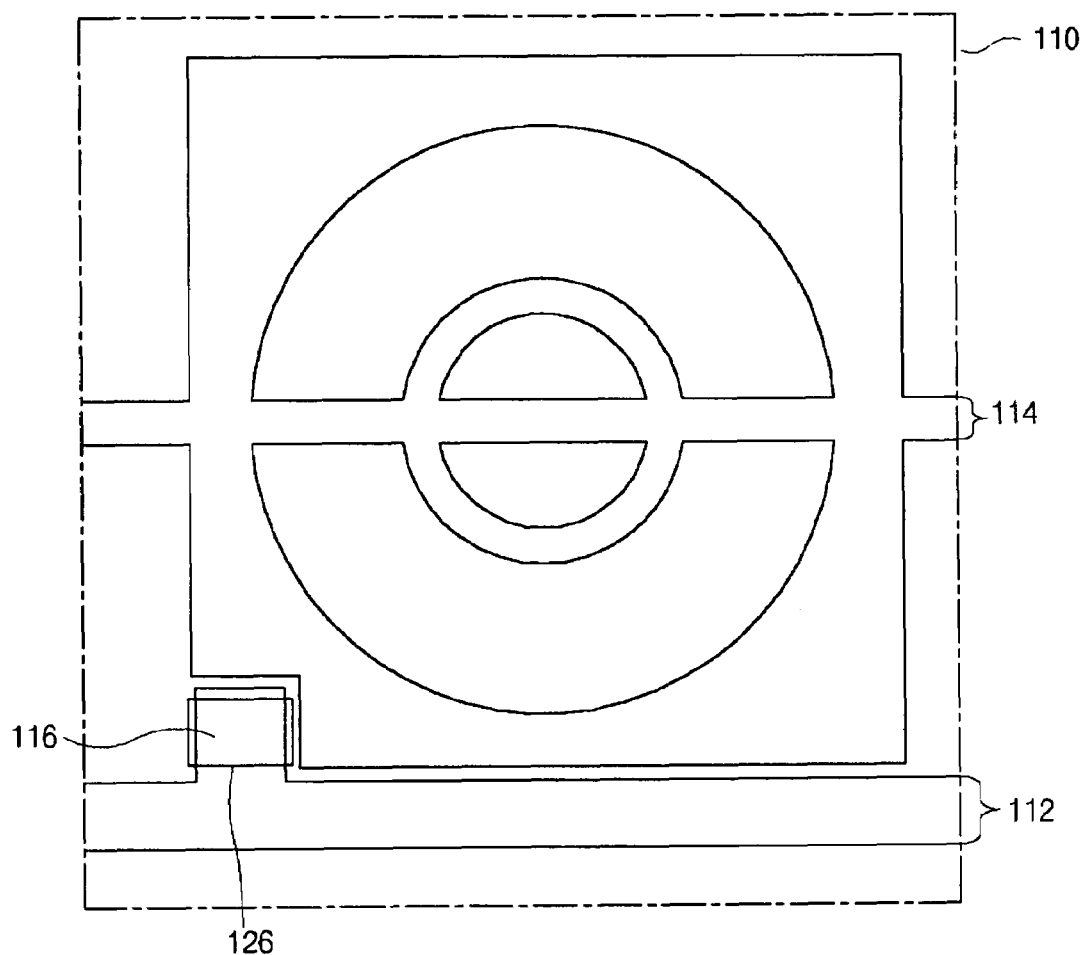

In FIG. 6B, after forming a gate insulating layer (not shown) over the substrate 110 to cover the gate line 112, the common line 114 and the common electrode 120, a semiconductor layer 126 is formed on the gate insulating layer by a second mask process, including the gate electrode 116. Although not shown in FIG. 6B, the semiconductor layer 126 may include first layer of pure amorphous silicon and a second layer of doped amorphous silicon.

Figure 6C:
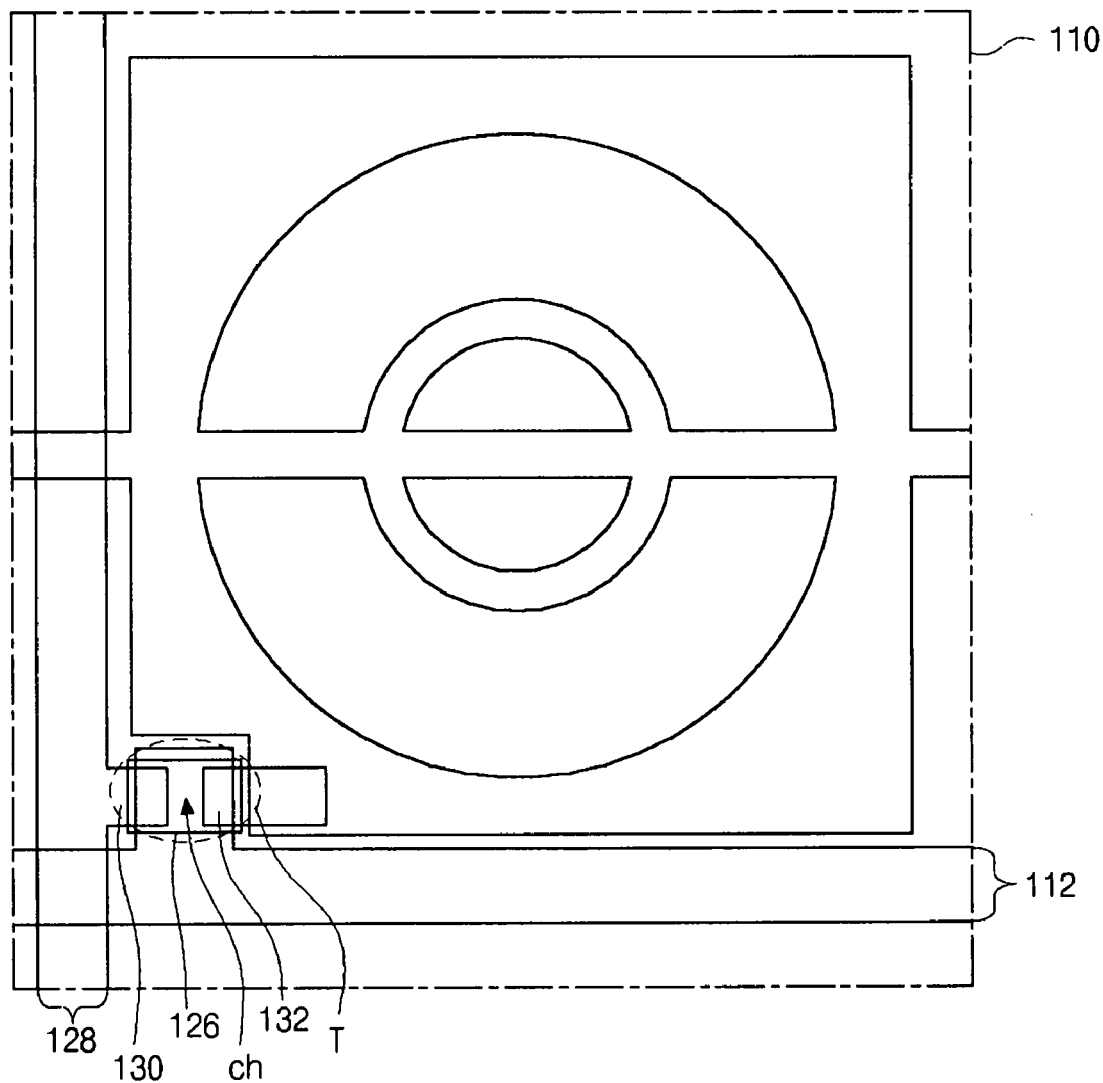

FIG. 6C illustrates a step of forming the data line 128 using a third mask process. A second metal layer is formed over the substrate 110 and then patterned to form the data line 128 and source and drain electrodes 130 and 132. The data line 128 is perpendicular to the gate line 112. The source electrode 130 extends from the data line 128 over one portion of the semiconductor layer 126, and the drain electrode 132 is spaced apart from the source electrode 130 and overlaps the other portion of the semiconductor layer 126. After forming the source and drain electrode 130 and 132, a channel "ch" is formed on the semiconductor layer 126. The gate electrode 116, the semiconductor layer 126 and the source and drain electrodes 130 and 132 form a thin film transistor (TFT) T.

Figure 6D:
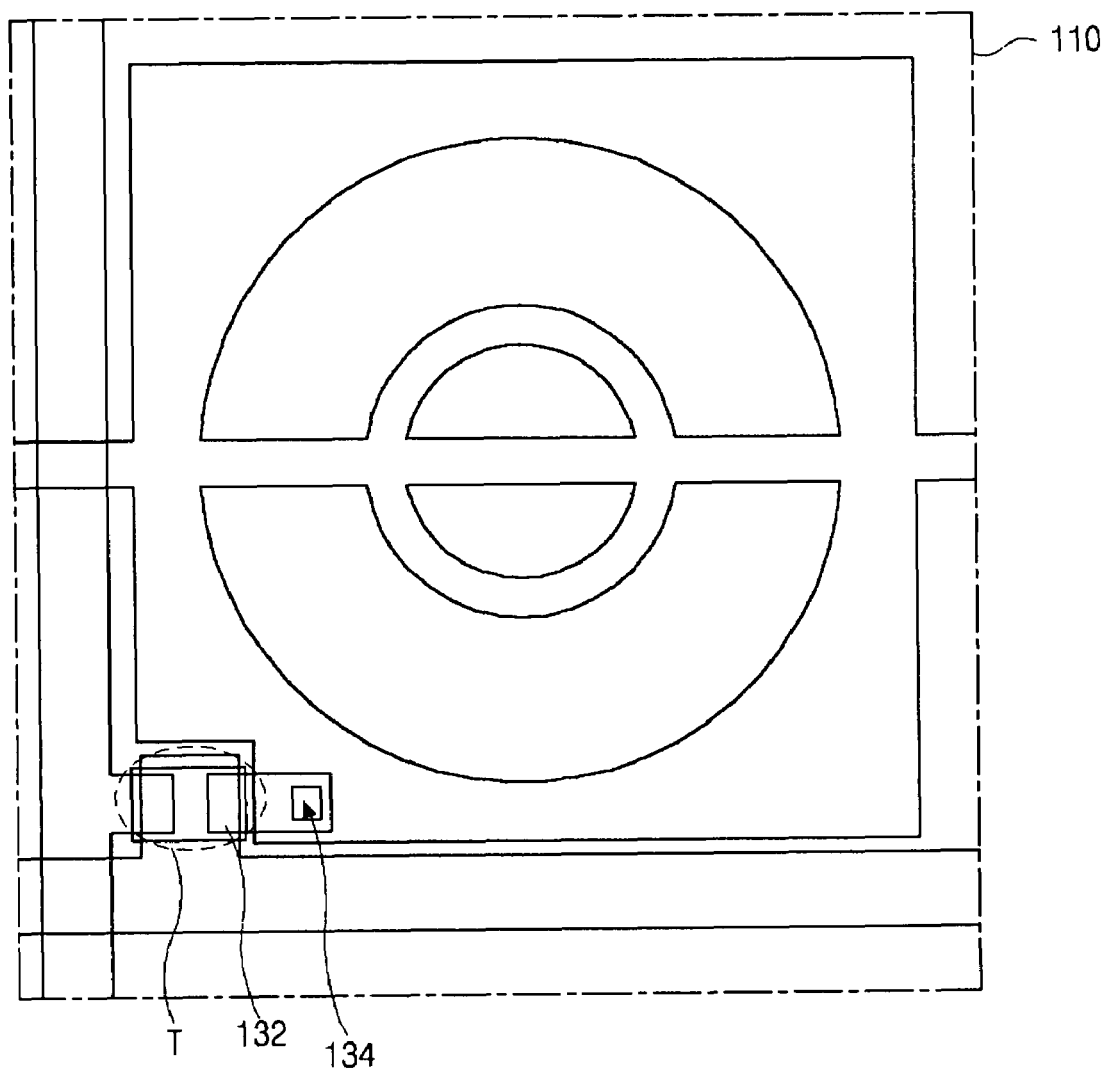

In FIG. 6D, a passivation layer (not shown) having a drain contact hole 134 is formed on the TFT T through a fourth mask process. The drain contact hole 134 exposes the drain electrode 132.

Figure 6E:
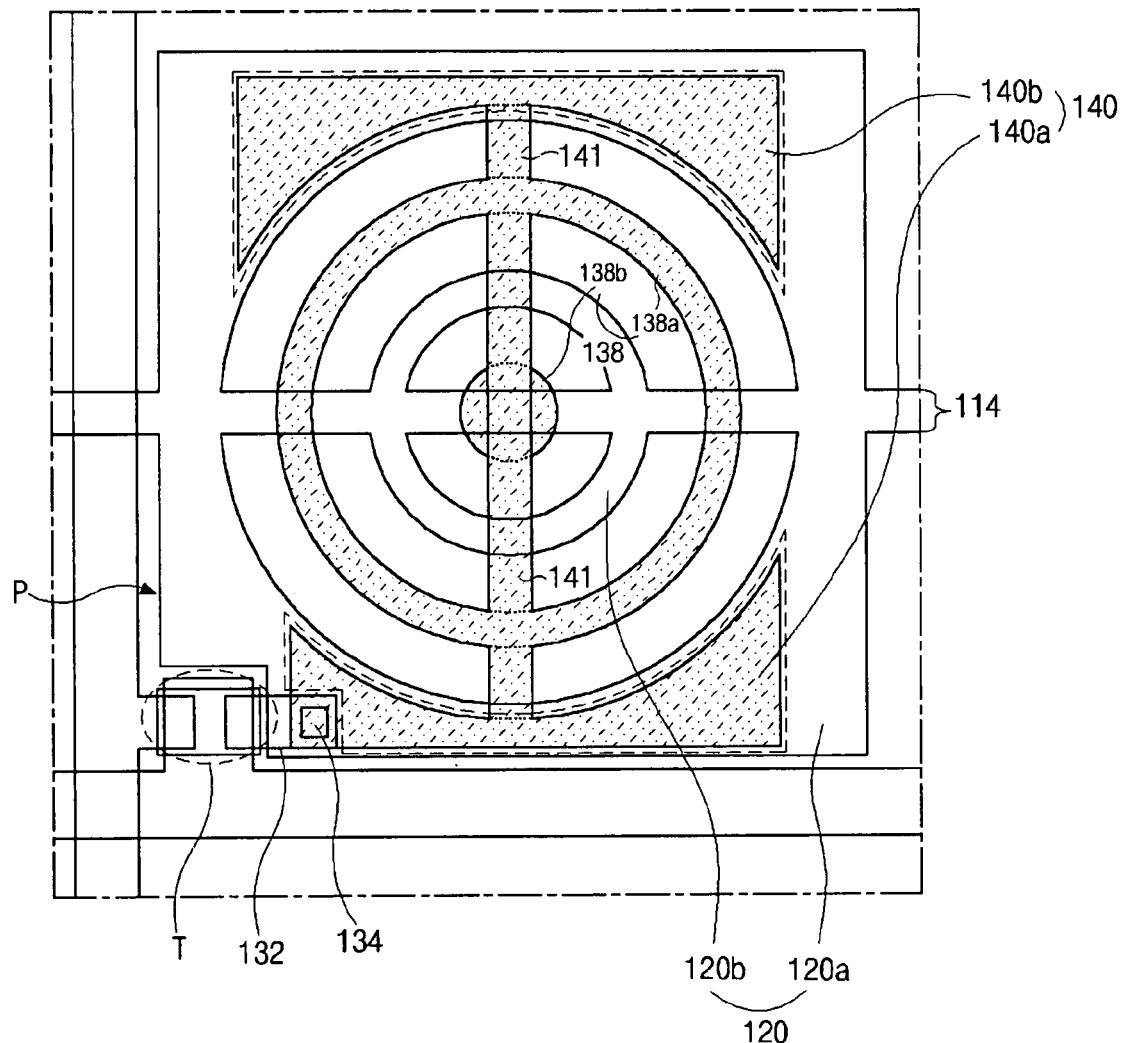

FIG. 6E illustrates a fifth mask process in which the pixel electrode 138 is formed. A transparent conductive layer is formed on the passivation layer having the drain contact hole 134, and then patterned by the fifth mask process. Thus, the pixel electrode 138, the capacitor electrode 140 and the pixel connecting line 141 on the passivation layer. The pixel electrode 138 includes first and second pixel electrode patterns 138a and 138b. The first pixel electrode pattern 138a is shaped like a ring and disposed between the first and second common electrode patterns 120a and 120b. The second pixel electrode pattern 138b is shaped like a circle and disposed inside the second common electrode pattern 120b in the middle of the pixel region P. The capacitor electrode 140 includes the first and second capacitor electrode patterns 140a and 140b which are disposed over top and bottom portions of the first common electrode pattern 120a, respectively. The pixel connecting line 141 is vertically disposed in the pixel region P, crosses the common line, and is connected to the first and second capacitor electrode patterns 140a and 140b. The pixel connecting line 141 also connects the first and second pixel electrode patterns 138a and 138b to each other. The pixel connecting line 141 may be formed as a unitary pattern with the pixel electrode 138 and the capacitor electrode 140 through one process.

The pixel region P may be divided into four sections by the common line 114 and pixel connecting line 141, such that the four sections form a multi-domain structure. Specifically, the pixel region P is comprised of four domains, for example. Because the common and pixel electrodes 120 and 140 form circular aperture areas between the respective common electrode patterns and the respective pixel electrode patterns, the liquid crystal directors are the same in all directions. Thus, color shift and contrast degradation are prevented.

The transparent conductive layer for the pixel electrode 140 may be one of indium tin oxide (ITO), indium tin zinc oxide (ITZO) and indium zinc oxide (IZO).

Figure 7:
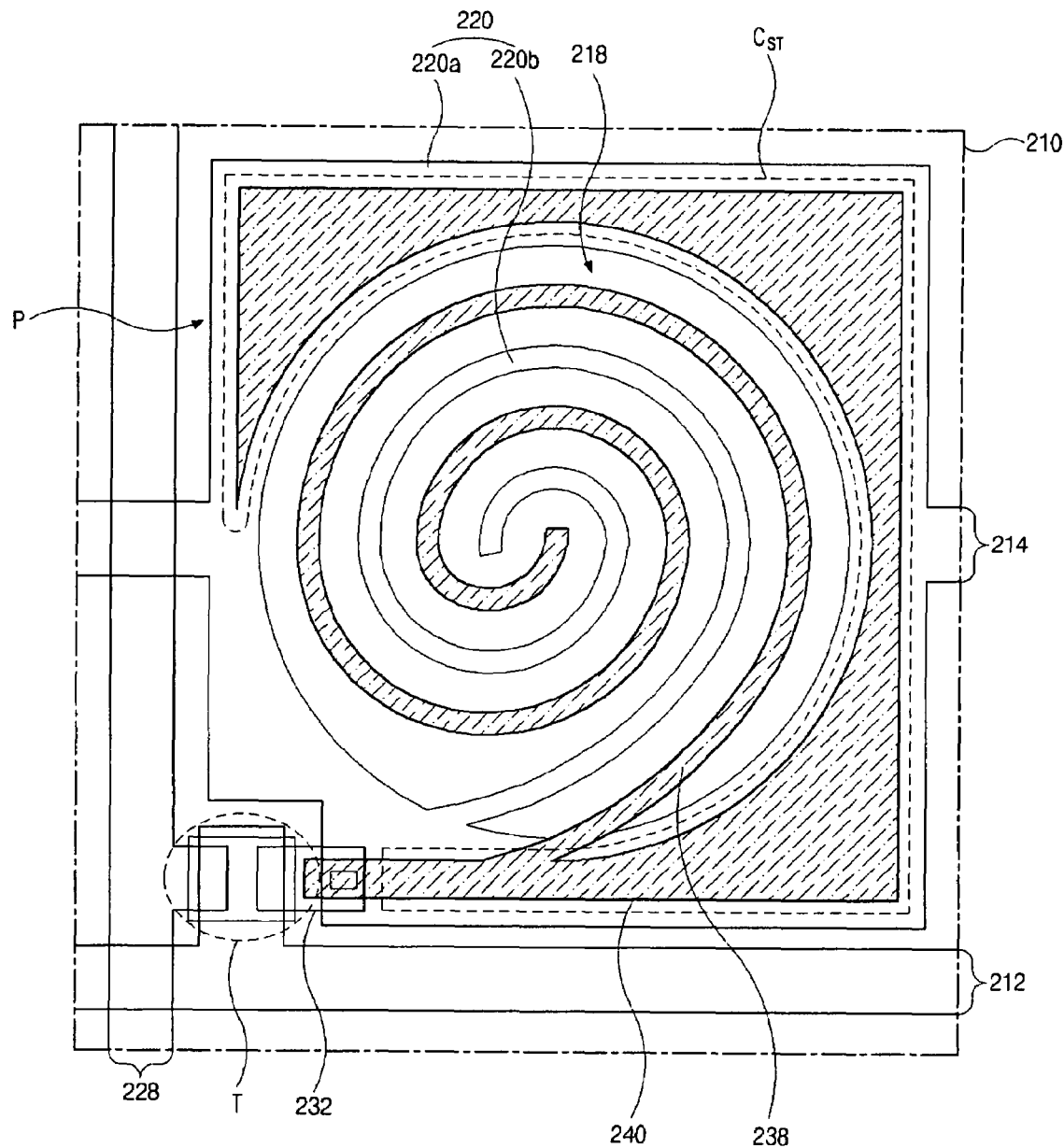
FIG. 7 is a schematic plan view of an array substrate for an IPS-LCD device according to a second embodiment of the present invention.

FIG. 7 is a schematic plan view of an array substrate for an IPS-LCD device according to a second embodiment of the present invention. In this second embodiment, the array substrate has an aperture area having a gyroidal shape defined by gyroidal common and pixel electrodes.

In FIG. 7, a gate line 212 is transversely arranged and a data line 228 is arranged substantially perpendicular to the gate line 212. A pixel region P is defined on the array substrate by a crossing of the gate and data lines 212 and 228. A thin film transistor (TFT) T is arranged in the pixel region P near a crossing of the gate and data line 212 and 228.

Within the pixel region P, a first common electrode pattern 220a having a rectangular shape is located. The first common electrode pattern 220a has a circular opening 218 in the middle thereof such that the first common electrode pattern 220a surrounds a boundary portion of the pixel region P. A second common electrode pattern 220b, having a gyre shape, is located in the circular opening 218 as an extension from the first common electrode pattern 220a. The first and second common electrode patterns 220a and 220b form a common electrode 220. A common line 214 crosses the data line 228 and connects the common electrode 220 to a neighboring common electrode (not shown) in a neighboring pixel region. The common line 214 may be formed as one united or integral body with the common electrode 220.

A capacitor electrode 240 is formed to overlap the first common electrode pattern 220a and forms a storage capacitor "CST" with the overlapped portions of the first common electrode pattern 220a. One end of the capacitor electrode 240 is connected to a drain electrode 232 of the TFT T. A pixel electrode 238 having a gyre shape is also disposed in the circular opening 218. The gyroidal pixel electrode 238 extends beginning from the capacitor electrode 240 alongside the gyroidal first common electrode pattern 220a. The first helical turn of the gyroidal pixel electrode 238 should be disposed between the first helical turn of the gyroidal second common electrode pattern 220b and the first common electrode pattern 220a in order to form a gyre-shaped aperture area between the common and pixel electrodes 220 and 238. The pixel electrode 238 may be shaped to surround and be spaced apart from the second common electrode pattern 220b. In the second embodiment illustrated with reference to FIG. 7, the capacitor electrode 240 may be formed to have a smaller width than the first common electrode pattern 220a and expose a boundary portion of the first common electrode pattern 220a to generate a lateral electric field between the first common electrode pattern 220a and the pixel electrode 238.

FIGS. 8A-8E are schematic plan views illustrating a five-mask process for fabricating the array substrate of FIG. 7.

Figure 8A:
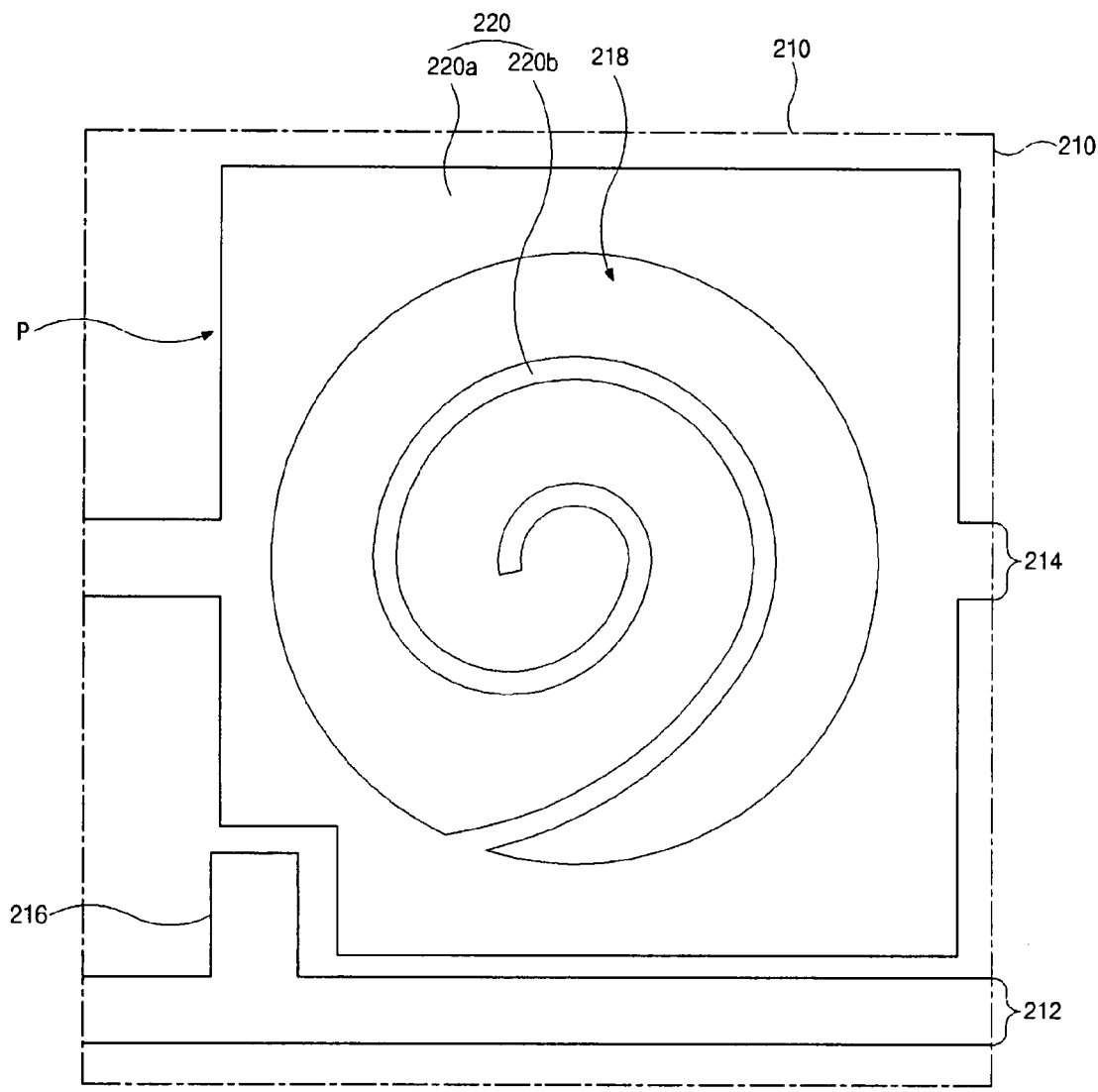
FIGS. 8A-8E are schematic plane views illustrating a five-mask process for fabricating the array substrate of FIG. 7.

In FIG. 8A, a first metal layer is formed on the substrate 210 and then pattern through a first mask process to form the gate line 212, the common line 214, and the common electrode 220 including first and second common electrode patterns 220a and 220b. A gate electrode 216 extending from the gate line 212 is also formed. The common line 214 connects the common electrode 220 to a neighboring common electrode (not shown) of the next pixel region. The first common electrode pattern 220a may be shaped like a rectangle and includes a circular opening 218 therein such that the first common electrode pattern 220a overlaps peripheral portions of a pixel region P. The second common electrode pattern 220b has a gyre shape and extends from the first common electrode pattern 220a in the circular opening 218.

Figure 8B:
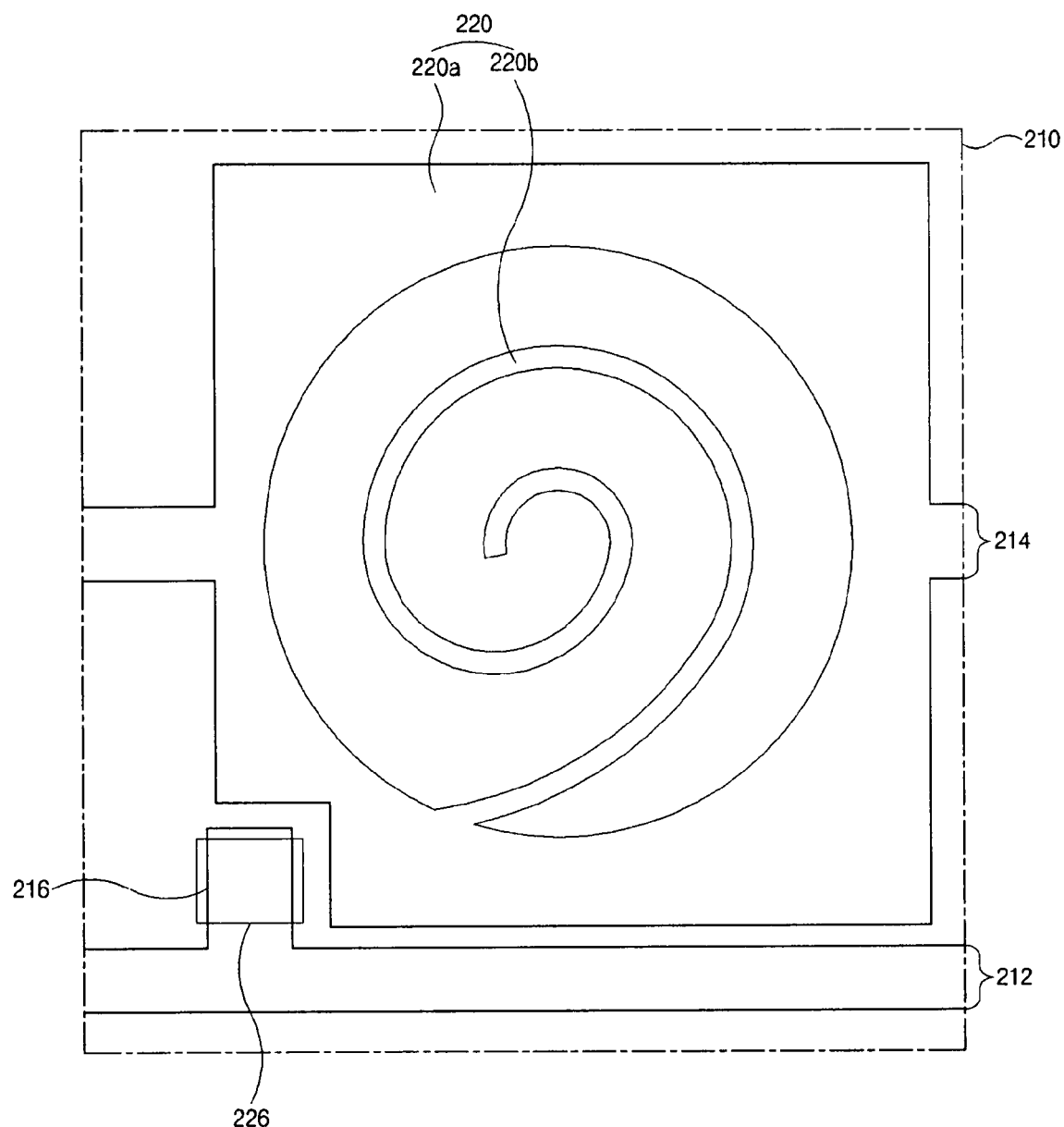

In FIG. 8B, after patterning the first metal layer, a gate insulating layer (not shown) is formed over an entire surface of the substrate 210 to cover the gate line 212 and the common electrode 220. Then, a semiconductor layer 226 is formed, through a second mask process, on the gate insulating layer (not shown), and the gate electrode 216. The semiconductor layer 226 may be a double layer including a first layer of pure amorphous silicon and a second layer of doped amorphous silicon.

Figure 8C:
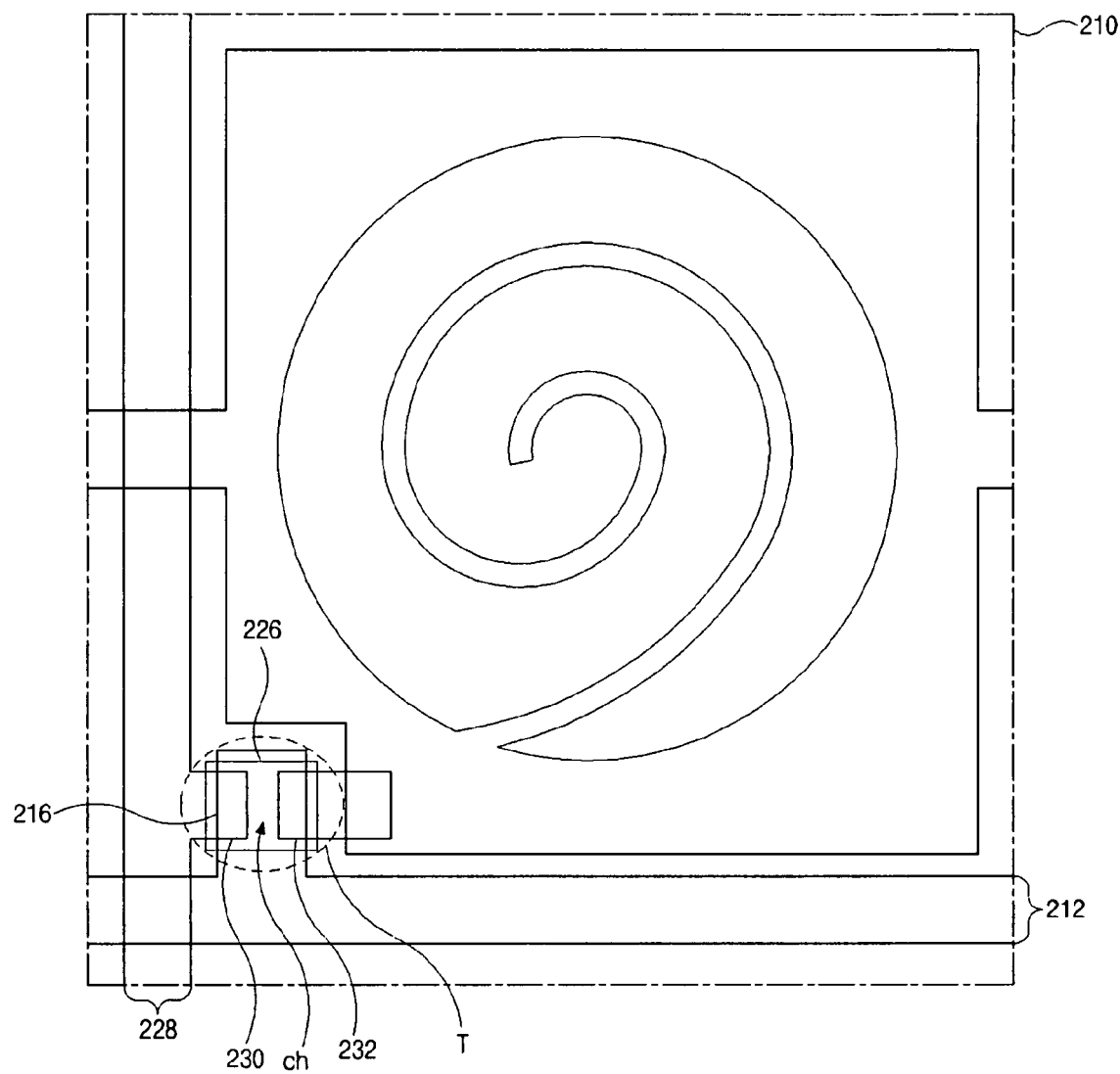

In FIG. 8C, a second metal layer is formed over the entire surface of the substrate 210 to cover the semiconductor layer 226, and then patterned, through a third mask process, to form the data line 228 substantially perpendicular to the gate line 212. The source and drain electrodes 230 and 232 are also formed to contact the semiconductor layer 226. The source electrode 230 extends from the data line 228 over one portion of the semiconductor layer 226, and the drain electrode 232 is spaced apart from the source electrode 230 across the gate electrode 216. The doped amorphous silicon exposed between the source and drain electrodes 230 and 232 is etched to form a channel "ch" on the semiconductor layer 226. The gate electrode 216, the semiconductor layer 226 and the source and drain electrodes 230 and 232 form a thin film transistor T.

Figure 8D:
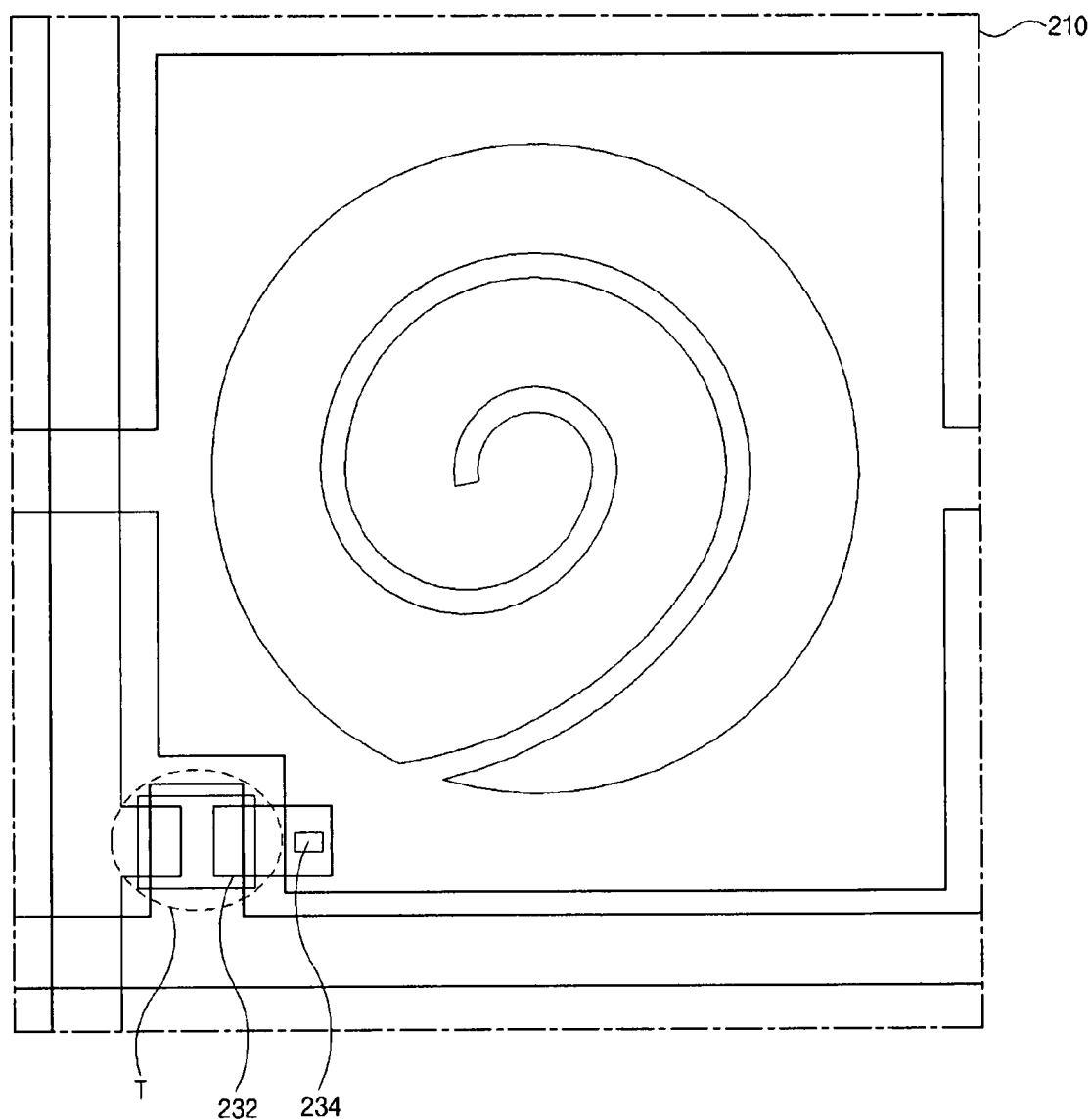

FIG. 8D illustrates formation of a drain contact hole 234. A passivation layer (not shown) is formed over the entire surface of the substrate 210 to cover the thin film transistor T. Then, the passivation layer (not shown) is patterned, through a fourth mask process, to form the drain contact hole 234 to expose a portion of the drain electrode 232.

Figure 8E:
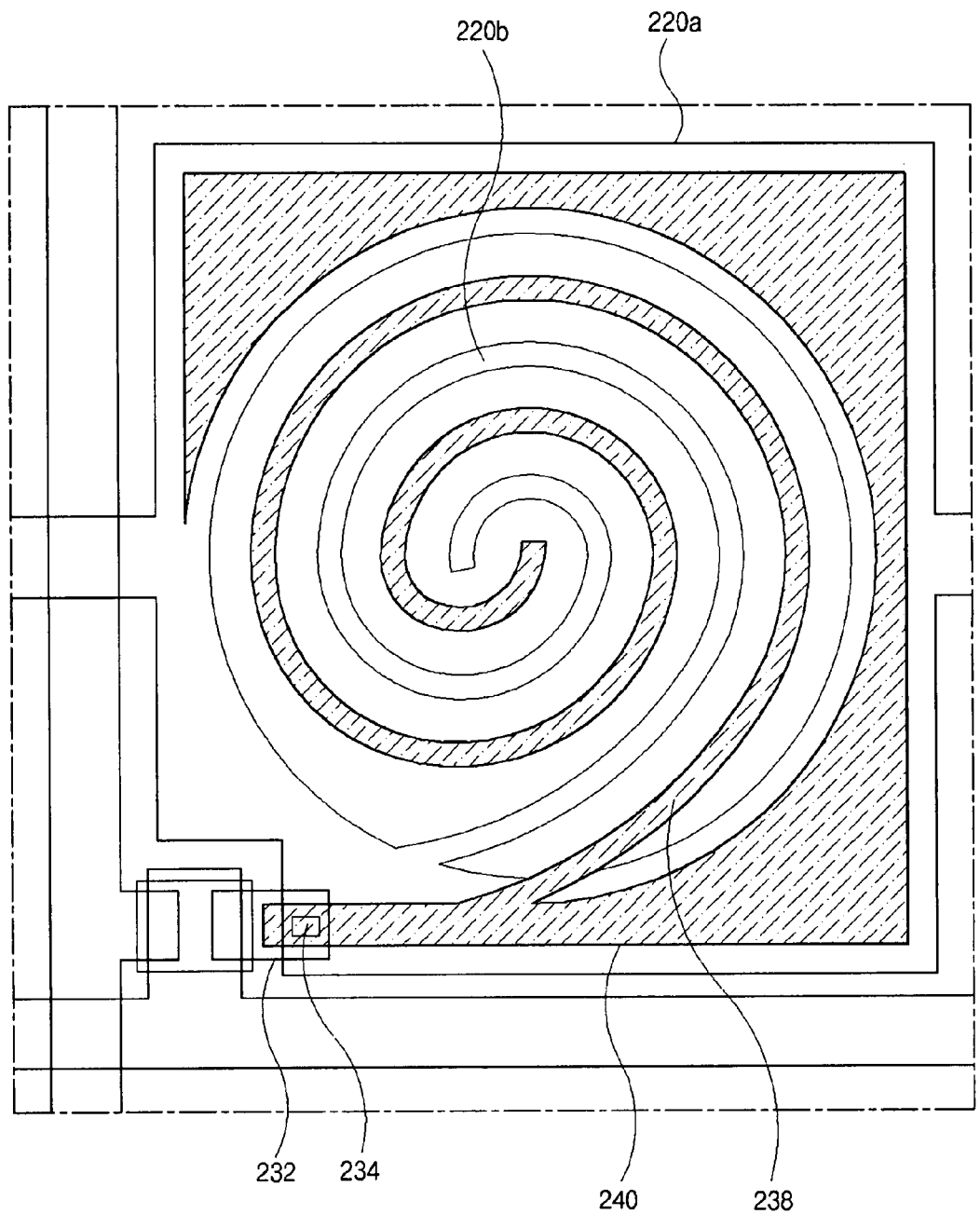

In FIG. 8E, a transparent conductive layer is formed on the passivation layer having the drain contact hole 234, and then patterned, through a fifth mask process, to form the capacitor electrode 240 and the gyre-shaped pixel electrode 238. The capacitor electrode 240 may be arrayed to overlap the first common electrode pattern 220a and be connected to the drain electrode 232 through the drain contact hole 234. The pixel electrode 238, having a gyre shape, extends from the capacitor electrode 240 alongside the gyroidal second common electrode pattern 220b. The extension of the pixel electrode 238 from the capacitor electrode 240 starts from a portion next to the beginning of the gyre-shaped second common electrode pattern 220b. The capacitor electrode 240 may have a smaller width than the first common electrode pattern 220a to prevent electrical interruption between the pixel electrode 238 and the capacitor electrode 240.

Figure 9:
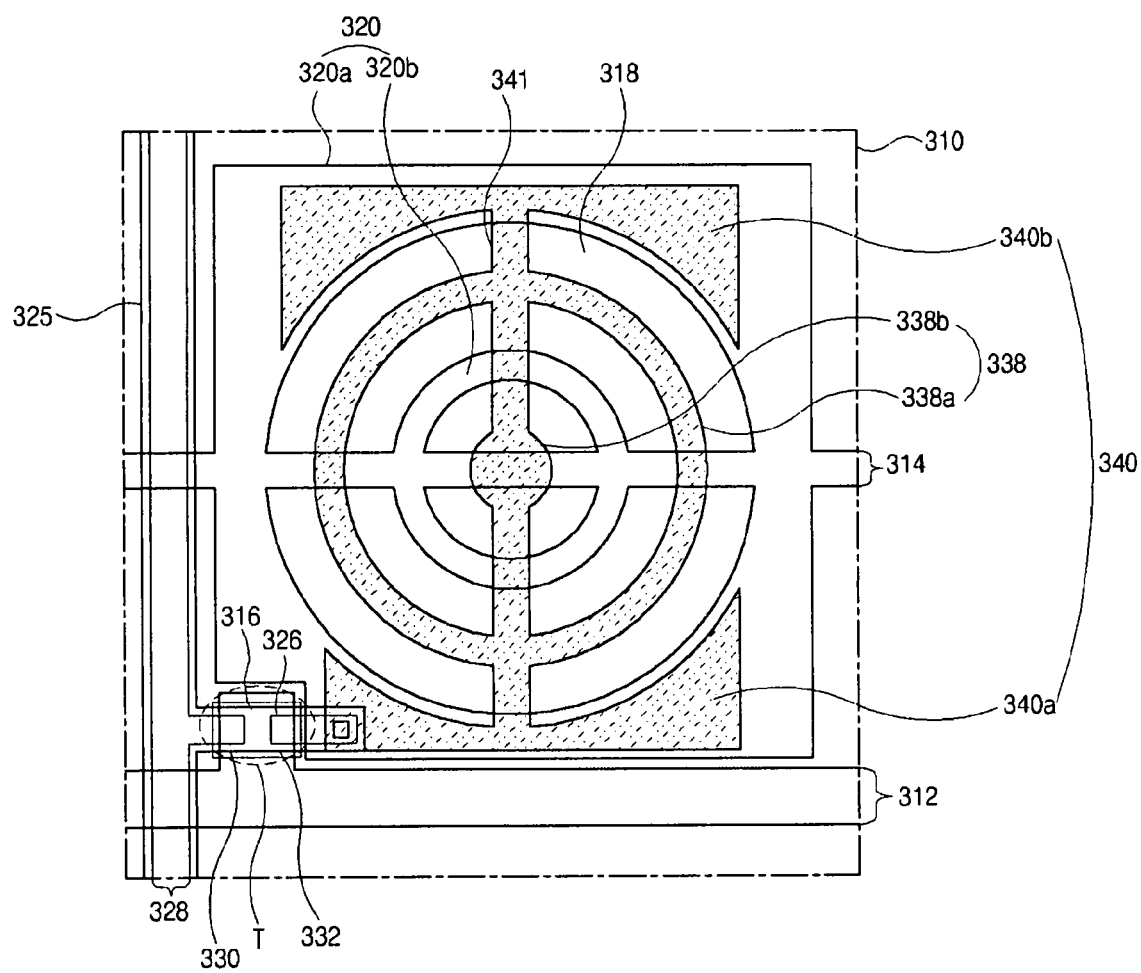
FIG. 9 is a plan view illustrating a pixel of an array substrate for use in an IPS-LCD device according a third embodiment of the present invention.

FIG. 9 is a plan view illustrating one pixel of an array substrate for use in an IPS-LCD device according a third embodiment of the present invention. The array substrate of FIG. 9 is very similar to that of FIG. 5, except the array substrate is completed using a four-mask process in which diffraction exposure is utilized to form the semiconductor layer and the data line.

As shown in FIG. 9, a gate line 312 is transversely arranged and a data line 328 is disposed substantially perpendicular to the gate line 312. A pair of gate and data lines 312 and 328 define one pixel region P on a substrate 310, and common and pixel electrodes 320 and 338 both, having circular shapes, are formed within the pixel region P. Because the pixel electrode 338 and the common electrode 320 have circular shapes, liquid crystal detectors are the same in all directions and a color inversion along a specific angle is prevented. A common line 314 runs from left to right in the middle of the pixel region P. The common line is substantially parallel with and spaced apart from the gate line 312. A thin film transistor (TFT) T is disposed near a crossing of the gate and data lines 312 and 328. The TFT T includes a gate electrode 316, a semiconductor layer 326, a source electrode 330 and a drain electrode 332. The gate electrode 316 extends from the gate line 312, and the source electrode 330 extends from the data line 328. The drain electrode 332 is spaced apart from the source electrode 330 and overlaps a portion of the gate electrode 316. The data line 328 and the source and drain electrodes 320 and 332 are formed with the semiconductor layer 326 during the same patterning process such that a semiconductor line 325 is disposed under the data line 328 and has the same pattern shape as the data line 328. Specifically, the semiconductor layer 326 extends from the semiconductor line 325 and is also disposed under the source and drain electrodes 330 and 332.

As illustrated in FIG. 5, the common electrode 320 includes a firs common electrode pattern 320a that surrounds the pixel region P and has a circular opening 318 in the middle, and a second common electrode pattern 320b within the circular opening 318. Portions of a first half of the first and second common electrode patterns 320a and 320b extend from the common line 314 in an upward direction, and portions of a second half extend in a downward direction from common line 314. Thus, the first and second common electrode patterns 320a and 320b are connected to the common line 114. The first common electrode pattern 320a is shaped like a rectangle and has the circular opening 318, while the second common electrode pattern 320b is shaped like a ring. Because the common line 314 transversely crosses the pixel region P, the common line 314 corresponds to and crosses along a diametric line of the circular band shaped second common electrode pattern 320b and the circular opening 318.

A capacitor electrode 340 is formed in an area where the first common electrode pattern 320a is disposed such that the capacitor electrode 340 overlaps the first common electrode pattern 320a and forms a storage capacitor with the overlapped portions of the first common electrode pattern 320a. The capacitor electrode 340 includes a first capacitor electrode pattern 340a and a second capacitor electrode pattern 340b, respectively, in bottom and top portions of the pixel region P. The first capacitor electrode pattern 340a is connected to the second capacitor electrode pattern 340b through a pixel connecting line 341, and the first capacitor electrode pattern 340a is connected to the TFT T.

The pixel electrode 338 includes first and second pixel electrode patterns 338a and 338b. The first pixel electrode pattern 338a has a ring shape and is disposed between the first and second common electrode patterns 320a and 320b, and the second pixel electrode pattern 338b has a circular shape and is disposed inside the circular band shaped second common electrode pattern 320b. The pixel connecting line 341 is vertically disposed in the middle of the pixel region P and connects the first and second capacitor electrode patterns 340a and 340b to each other. Furthermore, the pixel connecting line 341 also connects the first pixel electrode pattern 338a to the second pixel electrode pattern 338b. Accordingly, the pixel electrode 338, the capacitor electrode 340 and the pixel connecting line 341 may be formed as one united or integrated body during the same patterning process.

In the third embodiment illustrated with reference to FIG. 9, the pixel region P may be divided into multidomains, e.g., four domains, by the pixel connecting line 341 and the common line 314. Moreover, the aperture areas defined between the common and pixel electrodes 320 and 338, respectively, have circular shapes similar to the first embodiment of FIG. 5. As a result, color shift is prevented and the image quality and viewing angle of the IPS-LCD device are improved.

FIGS. 10A-10D are plan views illustrating process steps of forming the array substrate of FIG. 9. In this embodiment, the fabrication is completed using a four-mask process.

Figure 10A:
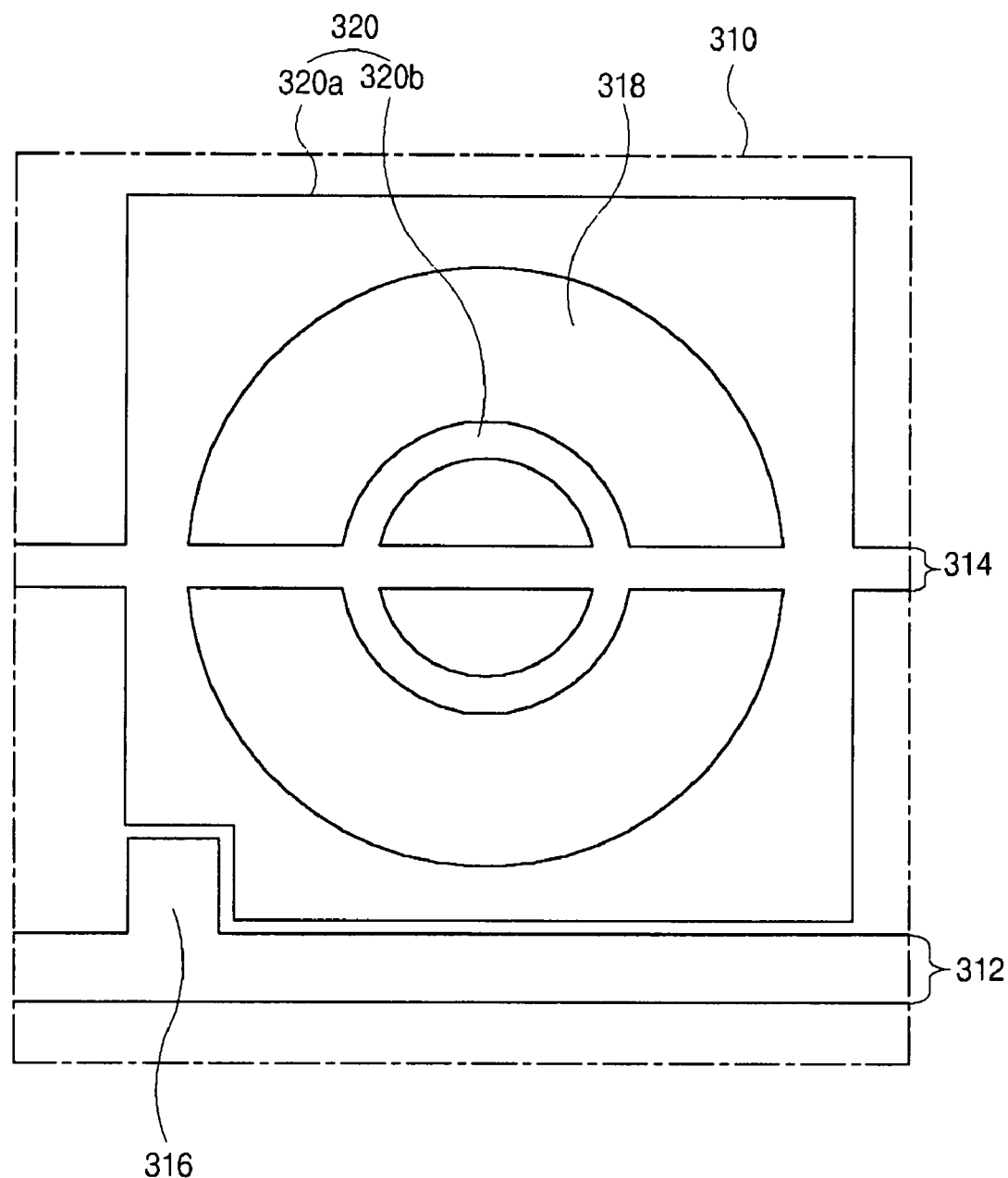
FIGS. 10A-10D are plan views illustrating process steps of forming the array substrate of FIG. 9.

In FIG. 10A, a first metal layer is formed on the substrate 110 and then patterned in a first mask process to form the gate electrode 316, the gate line 312, the common line 314, the common electrode 320 and the circular opening 318. As described with reference to FIG. 9, the gate line 312 and the common line 314 are transversely disposed. The gate electrode 316 extends from the gate line 312. The common electrode 320 includes the first and second common electrode patterns 320a and 320b, and first half portions of the first and second common electrode patterns 320a and 320b extend from the common line 314 in an upward direction and second half portions of the first and second common electrode patterns 320a and 320b extend in a downward direction. The first common electrode pattern 320a is shaped like a rectangle within the pixel region P and includes a circular opening 318 such that the first common electrode pattern 320a surrounds a boundary portion of the pixel region P. The second common electrode pattern 320b has a ring shape and is disposed within the circular opening 318. The common line 314 horizontally crosses the pixel region P in the middle such that it runs along the diametric line of the circular band shaped second common electrode pattern 320b and the circular opening 318.

Figure 10B:
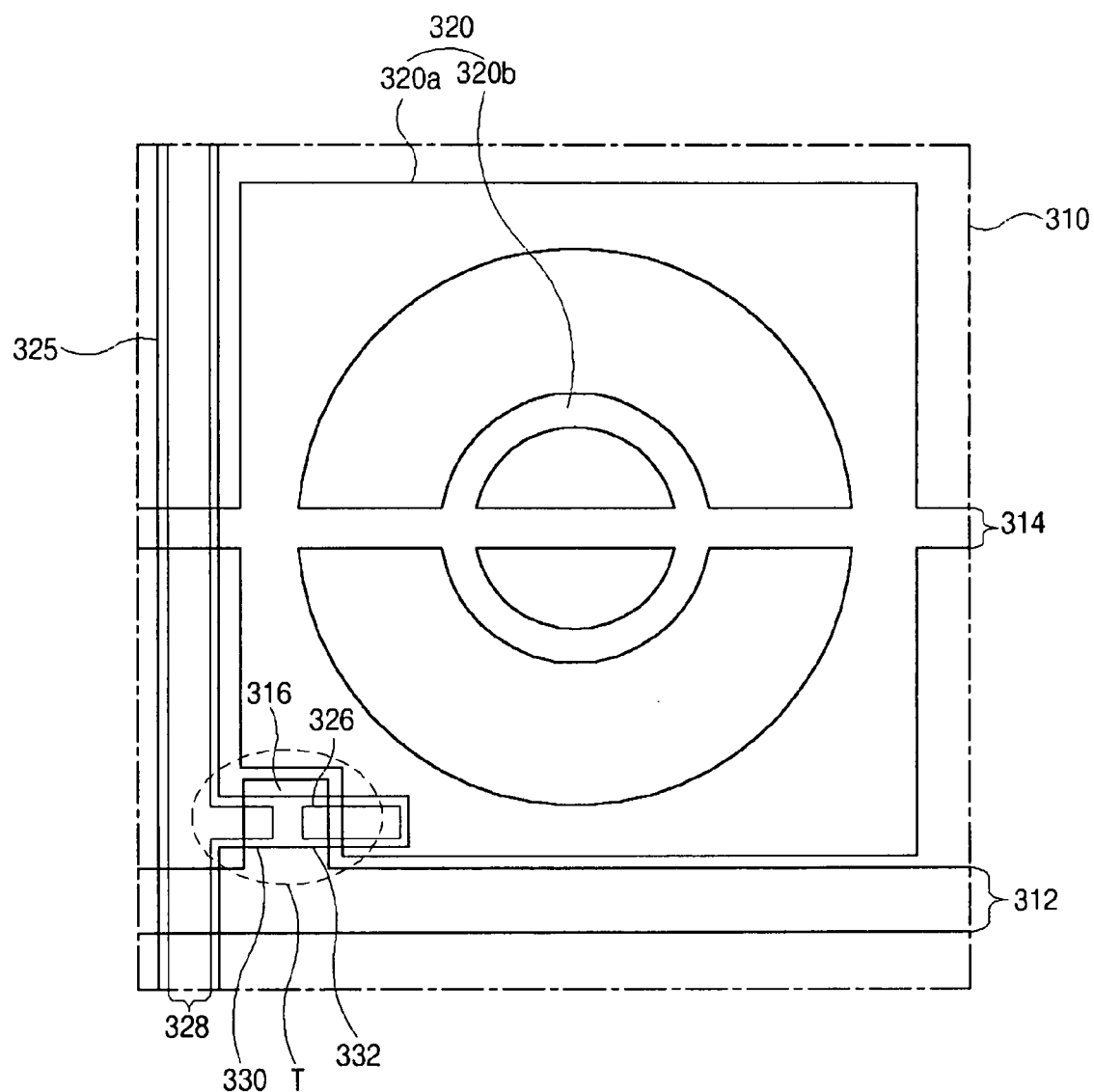

In FIG. 10B, a gate insulating layer (not shown) is formed over an entire surface of the substrate 310 to cover the patterned first metal layer, the gate line 312, the common line 314, the gate electrode 316, and common electrode 320. Thereafter, the semiconductor line 325 and the data line 328 are simultaneously formed on the gate insulating layer through a second mask process. The semiconductor line 325 and the data line 328 have the same pattern shape because they are formed during the same patterning process. The semiconductor line 325 may include a multiple layer of intrinsic amorphous silicon layer and impurity-doped amorphous silicon layer, and the data line 328 may include a metallic material. A source electrode 330 that overlaps the gate electrode 316 and extends from the data line 328 and a drain electrode 332 that is spaced apart from the source electrode 330 are formed at the same time as the semiconductor line 325 and the data 328. Further, a semiconductor layer 326 extending from the semiconductor line 325 is also formed to be disposed under the source and drain electrodes 330 and 332. A portion of the semiconductor layer 326 between the source and drain electrodes 330 and 332 forms a channel by exposing the intrinsic amorphous silicon layer.

The portion of the semiconductor layer 326 between the source and drain electrodes 330 and 332 may be exposed through a process using a diffraction mask. Although not shown in the figures, after sequentially forming an intrinsic amorphous silicon layer, an impurity-doped amorphous silicon layer and a metallic material layer on the gate insulating layer, a photoresist (PR) layer, having a first thickness, may be formed on the metallic material layer. Afterwards, a diffraction mask having transmissive, diffractive and shielding regions is disposed over the PR layer. The PR layer may be irradiated through the diffraction mask. For example, when a negative type PR layer in which an exposed portion remains, the exposed semiconductor region corresponds to the diffractive region of the diffraction mask and the source and drain electrodes correspond to the transmissive region of the diffraction mask. After developing the exposed PR layer. A first PR pattern, having a first thickness on the source and drain electrodes and a second thickness on the exposed semiconductor region is obtained. After sequentially etching the intrinsic amorphous silicon layer, the impurity-doped amorphous silicon layer and the metallic material, layer using the first PR pattern as an etching mask, the first PR pattern becomes a second PR pattern such that portions having the initial second thickness are removed through an ashing step. The semiconductor layer is etched using the second PR pattern as an etching mask. Thus, a portion of the semiconductor layer 316 may be exposed between the source and drain electrodes 330 and 332 through an exposure process using a diffraction mask. The gate electrode 316, the semiconductor layer 316, the source electrode 330 and the drain electrode 332 form the thin film transistor (TFT) T.

Figure 10C:
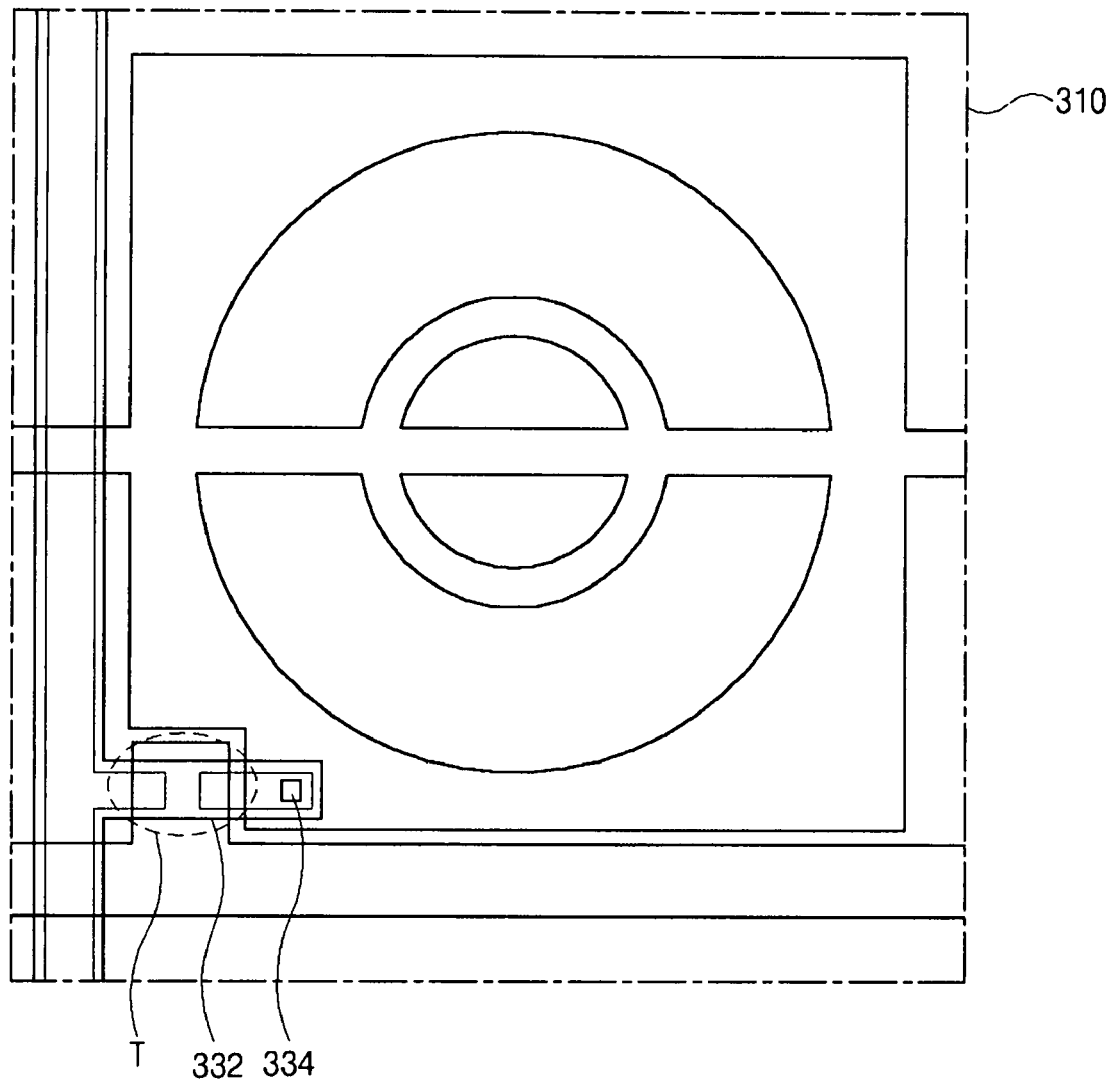

In FIG. 10C, a passivation layer (not shown) is formed on the entire surface of the substrate 310, and then patterned during a third mask process to form a drain contact hole 334 that exposes a portion of the drain electrode 332.

Figure 10D:
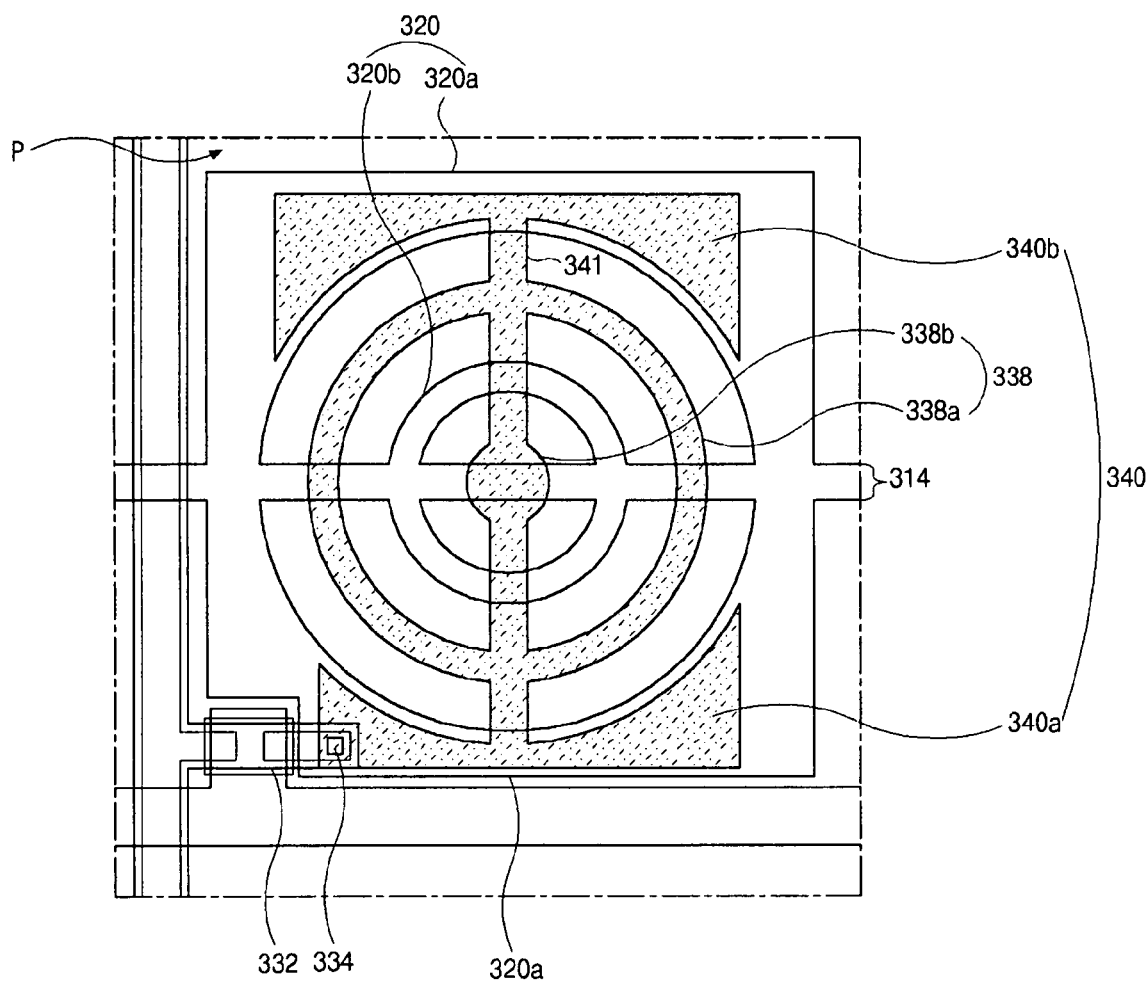

FIG. 10D shows a fourth mask process through which the pixel electrode 338 and the capacitor electrode 340 are formed. A transparent conductive layer is first formed on the passivation layer having the drain contact hole 334, and then patterned by the fourth mask process. Thus, on the passivation layer, formed are the pixel electrode 338, the capacitor electrode 340 and the pixel connecting line 341. The pixel electrode 338 includes first and second pixel electrode patterns 338a and 338b. The first pixel electrode pattern 338a is shaped like a ring and disposed between the first and second common electrode patterns 320a and 320b. The second pixel electrode pattern 338b is shaped like a circle and disposed inside the second common electrode pattern 320b in the middle of the pixel region P. The capacitor electrode 340 includes the first and second capacitor electrode patterns 340a and 340b which are disposed over top and bottom portions of the first common electrode pattern 320a, respectively. The pixel connecting line 341 is vertically disposed in the pixel region P, crosses the common line 314, and is connected to the first and second capacitor electrode patterns 340a and 340b. The pixel connecting line 341 also connects the first and second pixel electrode patterns 338a and 338b to each other. The pixel connecting line 341 may be formed as a unitary pattern with the pixel electrode 138 and the capacitor electrode 340 through one process. The first capacitor electrode pattern 340a contacts the drain electrode 332 through the drain contact hole 334. Meanwhile, the transparent conductive layer for the pixel electrode 340 may be one of indium tin oxide (ITO), indium tin zinc oxide (ITZO) and indium zinc oxide (IZO).

Figure 11:
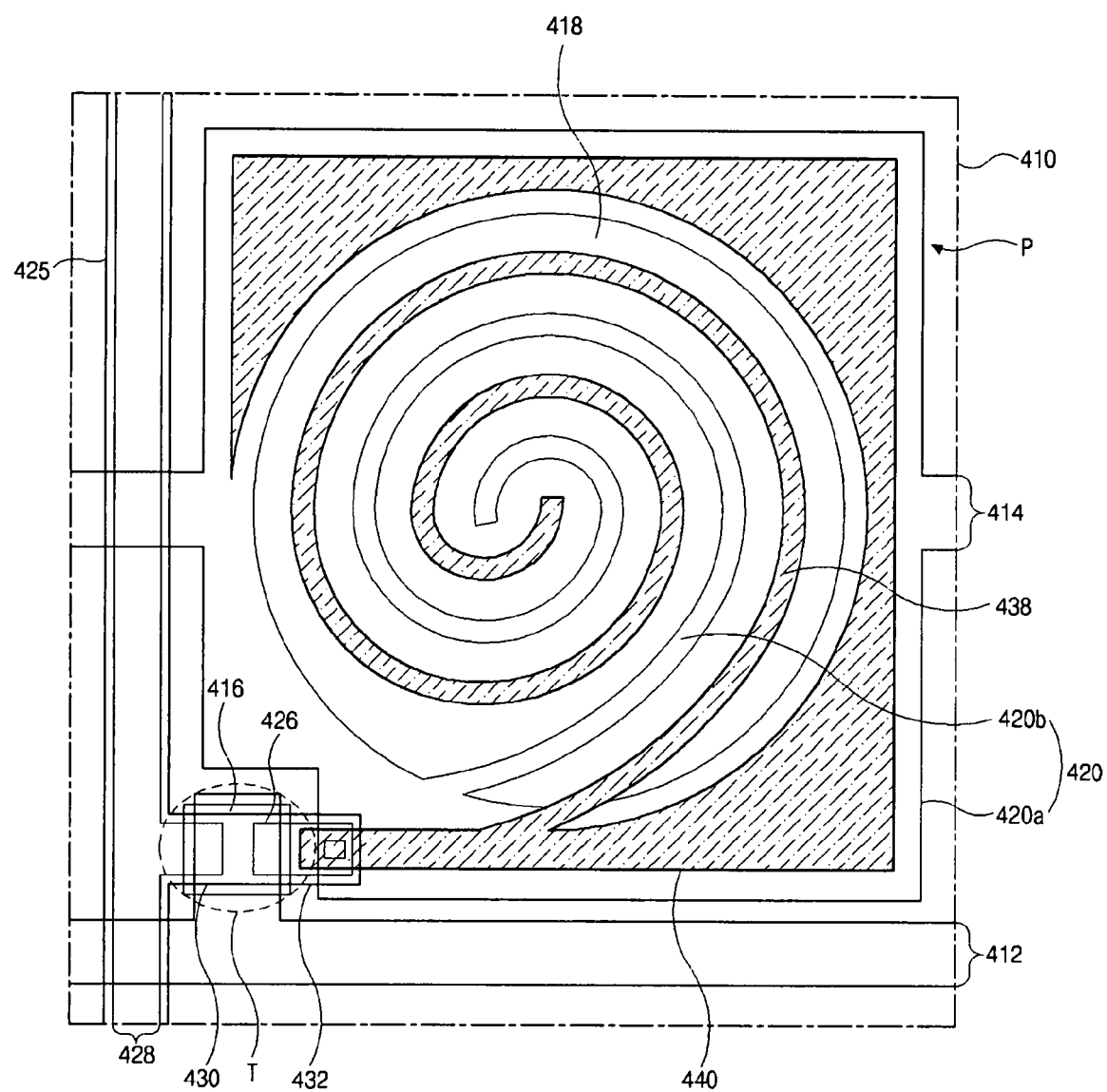
FIG. 11 is a schematic plan view of an array substrate for an IPS-LCD device according to a fourth embodiment of the present invention.

FIG. 11 is a schematic plane view of an array substrate for an IPS-LCD device according to a fourth embodiment of the present invention. The array substrate of FIG. 11 is very similar to that of FIG. 7, but the array substrate is complete throughout a four-mask process where a diffraction exposure is utilized to form the semiconductor layer and the source and drain electrodes. Furthermore in this fourth embodiment, the array substrate has an aperture area having a gyroidal shape by being defined by gyroidal common and pixel electrodes.

In FIG. 11, a gate line 412 is transversely arranged and a data line 428 is disposed substantially perpendicular to the gate line 412. Crossing points of the gate and data lines 412 and 428 define a pixel region P on an array substrate. A thin film transistor (TFT) T is disposed in the pixel region P near a crossing of the gate and data line 412 and 428. The TFT T includes a gate electrode 416, a semiconductor layer 426, a source electrode 430 and a drain electrode 432. The gate electrode 416 extends from the gate line 412, and the source electrode 430 extends from the data line 428. The drain electrode 432 is spaced apart from the source electrode 430 and overlaps a portion of the gate electrode 416. The data line 428 and the source and drain electrodes 420 and 432 are formed together with the semiconductor layer 426 during the same patterning process such that a semiconductor line 425 is disposed under the data line 428 having the same pattern shape as the data line 428. The semiconductor layer 426 extends from the semiconductor line 425 and is also disposed under the source and drain electrodes 430 and 432.

Within the pixel region P, a first common electrode pattern 420a having a rectangular shape is disposed. The first common electrode pattern 420a has a circular opening 418 in the middle thereof such that the first common electrode pattern 420a surrounds a boundary portion of the pixel region P. A second common electrode pattern 420b has a gyre shape and is disposed in the circular opening 418 by extending from the first common electrode pattern 420a. The first and second common electrode patterns 420a and 420b form a common electrode 420. A common line 414 crosses the data line 428 and connects the common electrode 420 to a neighboring common electrode (not shown) in a next pixel region. The common line 414 may be formed as one united or integrated body with the common electrode 420.

A capacitor electrode 440 may be formed to overlap the first common electrode pattern 420a and forms a storage capacitor with the overlapped portions of the first common electrode pattern 420a. One end of the capacitor electrode 440 is connected to a drain electrode 432 of the TFT T. A pixel electrode 438 having a gyre shape is also disposed in the circular opening 418. The gyroidal pixel electrode 438 extends beginning from the capacitor electrode 440 alongside the gyroidal second common electrode pattern 420a. The first helical turn of the gyroidal pixel electrode 438 should be disposed between a first helical turn of the gyroidal second common electrode pattern 420b and the first common electrode pattern 420a in order to form a gyre-shaped aperture area between the common and pixel electrodes 420 and 438. Also, the pixel electrode 438 is shaped and spaced apart from the second common electrode pattern 420b. Similar to the second embodiment illustrated with reference to FIG. 7, the capacitor electrode 440 may be formed to have a smaller width than the first common electrode pattern 420a and expose a boundary portion of the first common electrode pattern 420a to generate a lateral electric field between the first common electrode pattern 420a and the gyroidal pixel electrode 438.

FIGS. 12A to 12D are schematic plane views illustrating a four-mask process for fabricating the array substrate of FIG. 11.

Figure 12A:
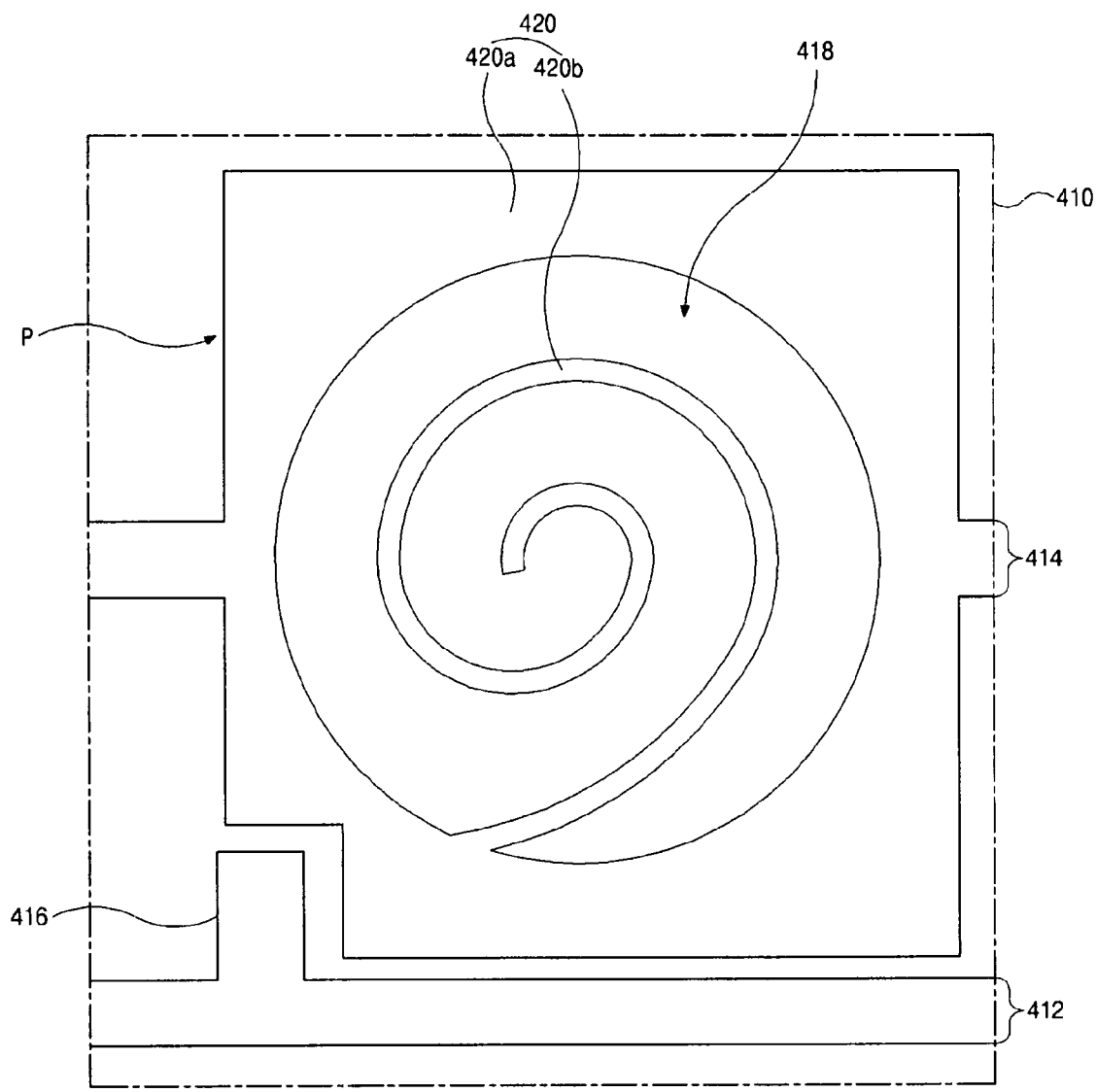
FIGS. 12A-12D are schematic plane views illustrating a four-mask process for fabricating the array substrate of FIG. 11.

In FIG. 12A, a first metal layer is formed on the substrate 410 and then patterned through a first mask process to form the gate line 412, the common line 414, and the common electrode 420 including first and second common electrode patterns 420a and 420b. The gate electrode 416, extending the gate line 412 is also formed. The common line 414 connects the common electrode 420 to the neighboring common electrode (not shown) of the next pixel region. The first common electrode pattern 420a is shaped like a rectangle and includes a circular opening 418 therein such that the first common electrode pattern 420a overlaps peripheral portions of the pixel region P. The second common electrode pattern 420b has a gyre shape and extends from the first common electrode pattern 420a in the circular opening 418.

Figure 12B:
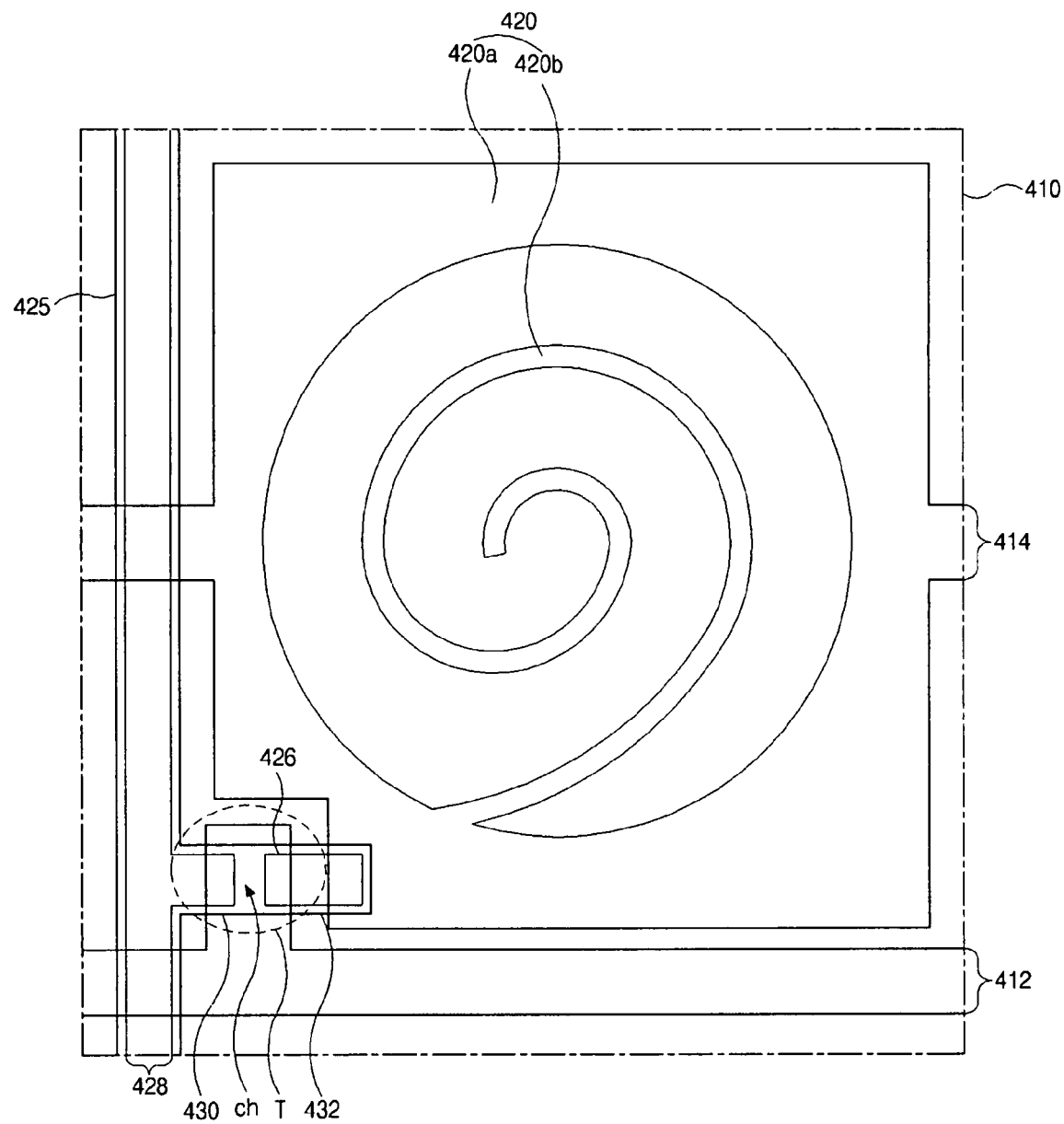

FIG. 12B shows a second mask process that is the same as the diffraction exposure method illustrated with reference to FIG. 10B.

In FIG. 12B, a gate insulating layer (not shown) is formed over an entire surface of the substrate 410 to cover the patterned first metal layer; the gate line 412, the common line 414, the gate electrode 416, and common electrode 420. Thereafter, the semiconductor line 425 and the data line 428 are simultaneously formed on the gate insulating layer through a second mask process. Because the semiconductor line 425 and data line 428 are manufactured during the same patterning process, the semiconductor line 425 and the data line 428 have the same pattern shape. The semiconductor line 425 may include a multiple layer of intrinsic amorphous silicon layer and impurity-doped amorphous silicon layer, and the data line 428 may include a metallic material. At the same time of forming the semiconductor line 425 and the data line 428, formed are a source electrode 430 overlapping the gate electrode 416 and extending from the data line 428 and a drain electrode 432 spaced apart from the source electrode 430. Further, a semiconductor layer 426 extending from the semiconductor line 425 may also be formed to be disposed under the source and drain electrodes 430 and 432. A portion of the semiconductor layer 426 between the source and drain electrodes 430 and 432 constitutes a channel "ch" by exposing the intrinsic amorphous silicon layer, as illustrated with reference to FIG. 10B. Namely, the semiconductor layer 426 may be exposed between the source and drain electrodes 430 and 432 through an exposure process using a diffraction mask and the exposed semiconductor layer 426 may be referred to as a channel region "ch." The gate electrode 416, the semiconductor layer 426, the source electrode 430 and the drain electrode 432 constitute a thin film transistor (TFT) T.

Figure 12C:
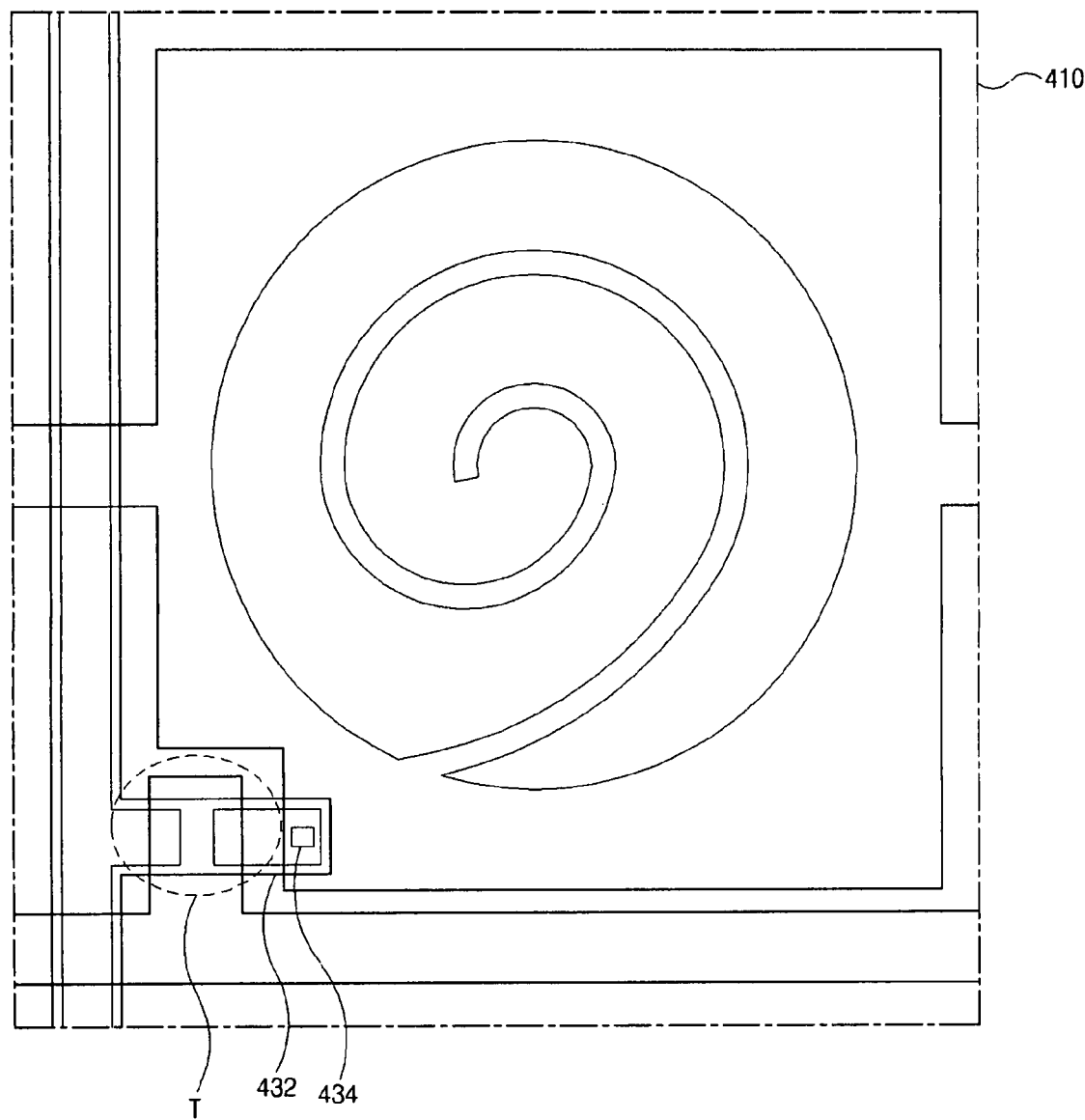

FIG. 12C shows a process of forming a drain contact hole 434. A passivation layer (not shown) is formed over the entire of the substrate 410 to cover the thin film transistor T. Then, the passivation layer (not shown) is patterned through a third mask process to form a drain contact hole 434 that exposes a portion of the drain electrode 432.

Figure 12D:
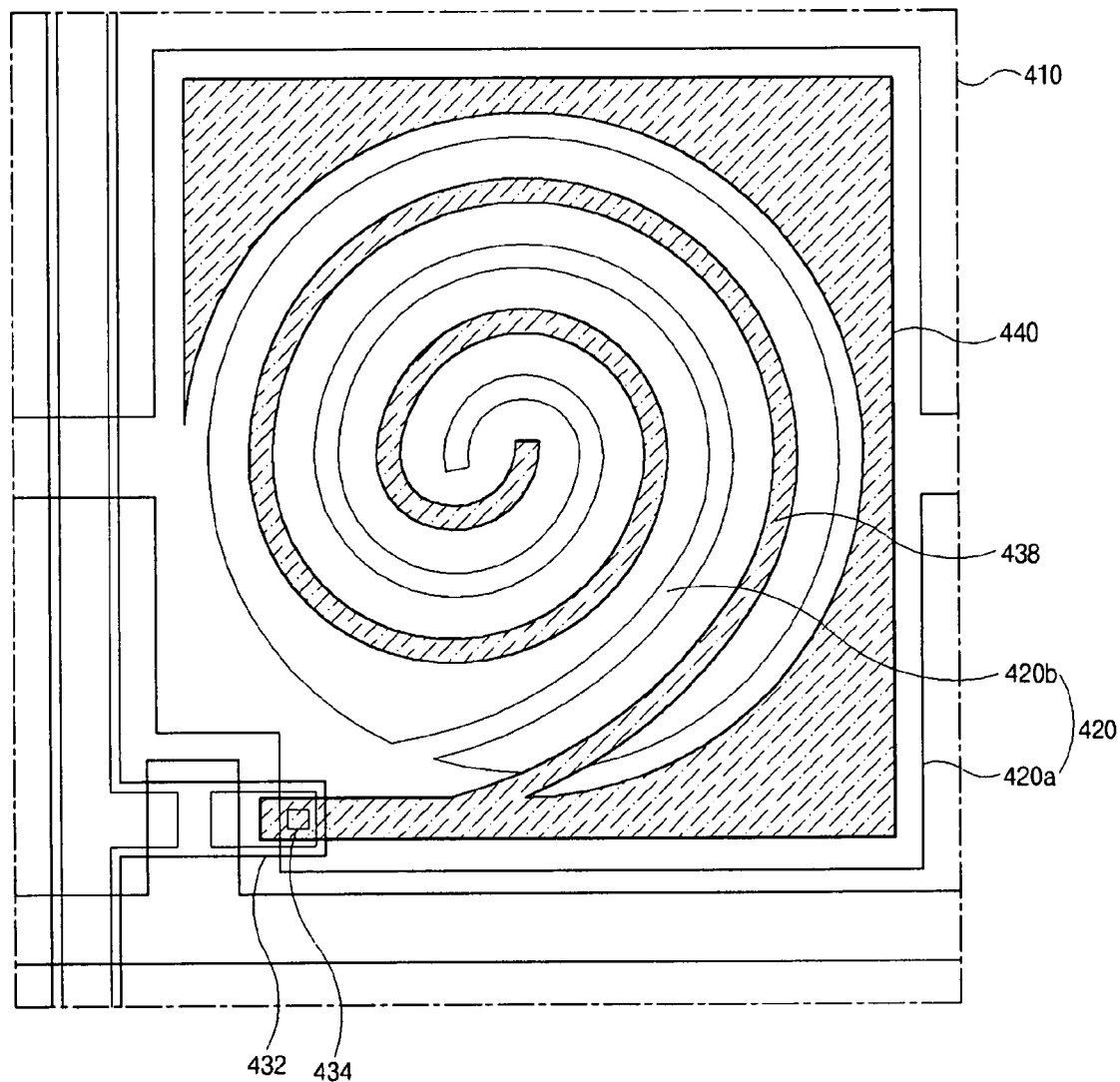

In FIG. 12D, a transparent conductive layer is formed on the passivation layer having the drain contact hole 434, and then patterned through a fourth mask process, thereby forming the capacitor electrode 440 and the gyre-shaped pixel electrode 438. The capacitor electrode 440 is disposed to overlap the first common electrode pattern 220a and connected to the drain electrode 432 through the drain contact hole 434. The pixel electrode 438 having a gyre shape extends from the capacitor electrode 440 alongside the gyroidal second common electrode pattern 420b. The extension of the pixel electrode 438 starts from a portion next to the beginning of the gyre-shapes second common electrode pattern 420b. Meanwhile, the capacitor electrode 440 should have a smaller width than the first common electrode pattern 420a in order to prevent the electrical interruption between the pixel electrode 438 and the capacitor electrode 440.

In another embodiment, the IPS-LCD device may be fabricated using a lift-off process. In a lift-off process, after forming a photoresist (PR) pattern on a first layer, a second layer is formed on the PR pattern and on the exposed first layer. The second layer is patterned by removing a portion of the second layer on the PR pattern while stripping out the PR pattern. Accordingly, a second layer pattern is obtained to have a desired shape.

FIGS. 13A to 13D are cross sectional views illustrating a lift-off process.

Figure 13A:
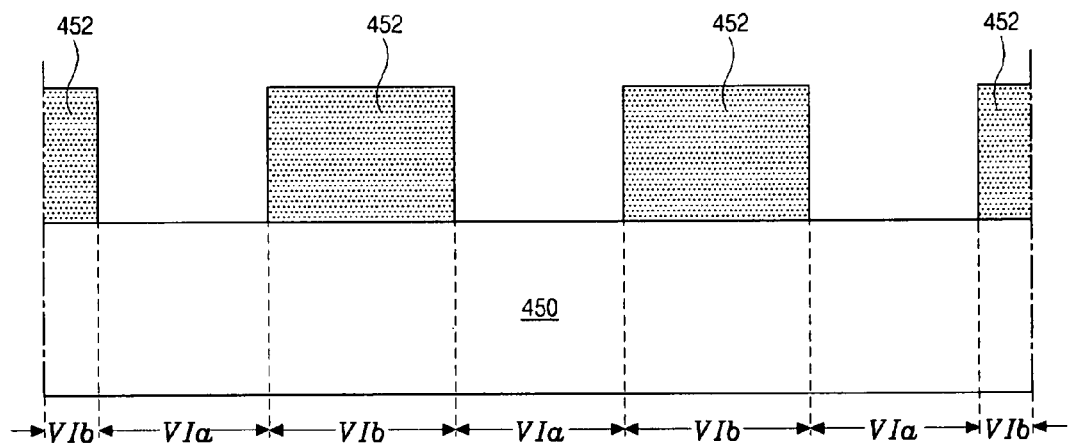
FIGS. 13A-13D are cross sectional views illustrating a lift-off process.

In FIG. 13A, first regions "VIa" and second regions "VIb" are defined on a substrate 450. PR patterns 452 having a step or height are formed on the second region "VIb" of the substrate 450.

Figure 13B:
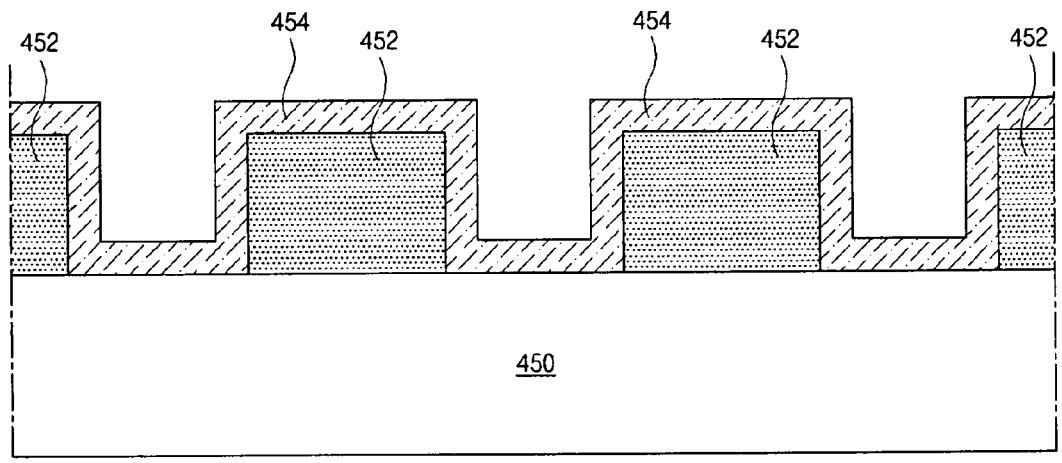

In FIG. 13B, a patterning material 454 is formed over the substrate 450 to cover the PR patterns 452. The patterning material 454 is a metallic material or a transparent conductive material. Although not shown in FIG. 13B, portions of the patterning material 454 on the PR patterns 452 may be isolated from other portions on the substrate 450 because the step or height of the PR patterns 452 affects the step coverage of the patterning material 454 when forming the patterning material 454.

Figure 13C:
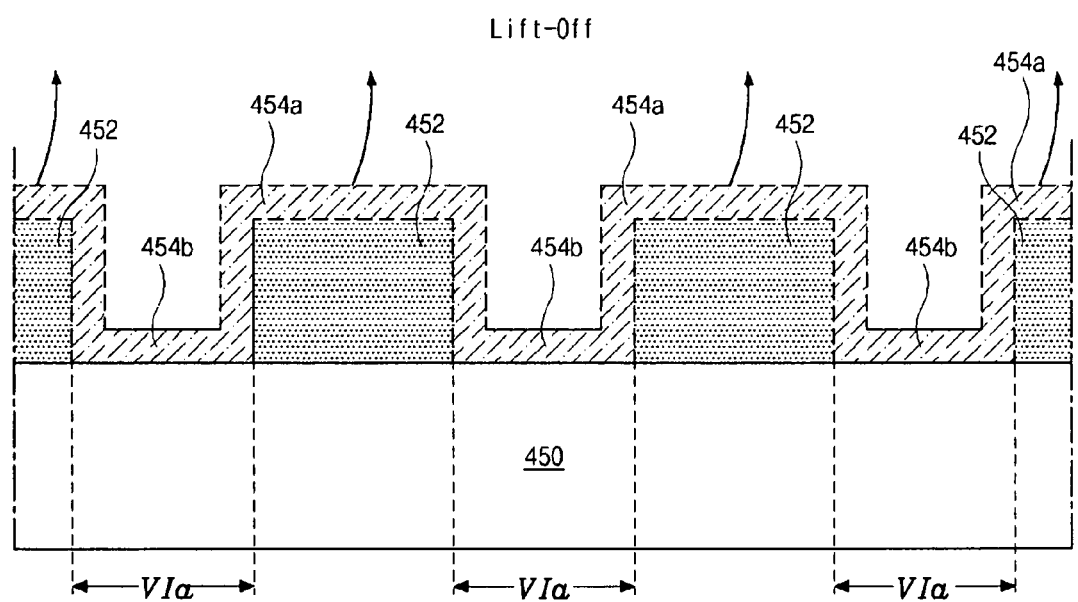
Figure 13D:
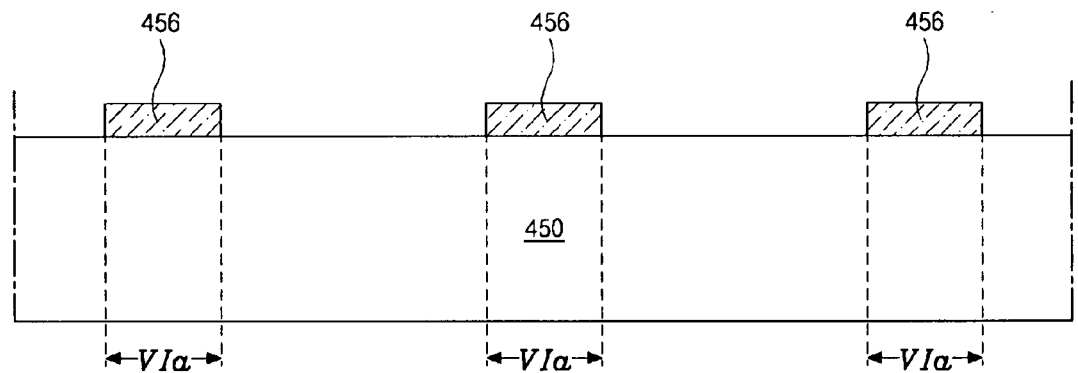

FIG. 13C shows a process of stripping off the PR patterns 454. When stripping the PR patterns 454 from the substrate 450, the portions 454a of the patterning material 454 are also removed by the lift-off process while the other portions 454b on the substrate 450 remain. Thus, as shown in FIG. 13D, the residual patterning material becomes desired patterns 456 on the substrate 450, especially corresponding to the first regions "VIa" where the PR patterns did not exist.

The aforementioned lift-off process is much simpler that the photolithograph process because it does not need exposure, developing, etching etc. The description will illustrate the array substrates formed by such lift-off process. If the lift-off process is utilized in forming the aforementioned array substrate.

Figure 14:
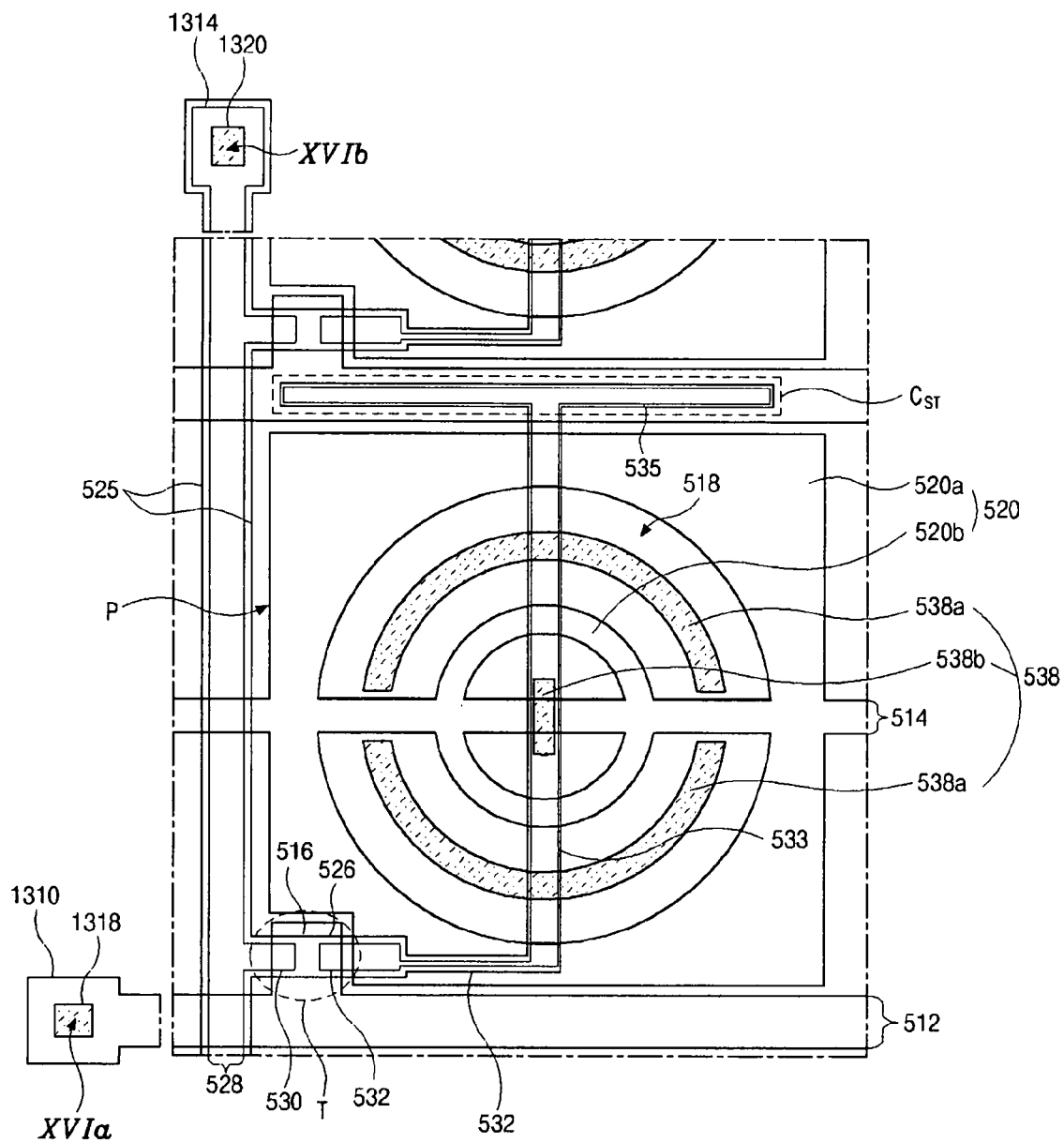
FIG. 14 is a plan view illustrating an array substrate for use in an IPS-LCD device according to a fifth embodiment of the present invention.

FIG. 14 is a plan view illustrating an array substrate for use in an IPS-LCD device according to a fifth embodiment of the present invention. The array substrate of FIG. 14 is similar to the first and third embodiments, but the array substrate of FIG. 14 is formed using a three-mask process in which a diffraction exposure and a lift-off process are utilized.

In FIG. 14, a gate line 512 is transversely arranged and a data line 528 is disposed substantially perpendicular to the gate line 512. A pair of gate and data lines 512 and 528 define one pixel region P on a substrate 510. Common and pixel electrodes 520 and 538 having circular aperture areas, are formed within the pixel region P. Because the pixel electrode 538 and the common electrode 520 have circular shapes, liquid crystal detectors are the same in all directions and a color inversion along a specific angle is prevented. A common line 514 runs from left to right in the middle of the pixel region P. The common line is parallel to and spaced apart from the gate line 512.

At one ends of the gate and data lines 512 and 528, a gate pad 1310 and a data pad 1314 are respectively disposed. A gate pad terminal 1318 is disposed over the gate pad 1310 and contacts the gate pad 1310 through a first contact opening XVIa, whereas a data terminal 1320 is disposed over the data pad 1314 and the contacts the data pad 1314 through a second contact opening XVIb.

A thin film transistor (TFT) T is disposed near a crossing of the gate and data lines 512 and 528. The TFT T includes a gate electrode 516, a semiconductor layer 526, a source electrode 530 and a drain electrode 532. The gate electrode 516 extends from the gate line 512, and the source electrode 530 extends from the data line 528. The drain electrode 532 is spaced apart from the source electrode 530 and overlaps a portion of the gate electrode 516. The drain electrode 532 is elongated transversely and connected to a pixel connecting line 533 that is formed with the drain electrode 532 as one united or integral body. A capacitor electrode 535 is formed to overlap a previous gate line and form a storage capacitor CST with the overlapped portion of the previous gate line. The pixel connecting line 533 vertically crosses the middle of the pixel region P and connects the drain electrode 532 to the capacitor electrode 535.

In the fifth embodiment, the data line 528, the source and drain electrodes 520 and 532, the pixel connecting line 533 and the capacitor electrode 535 are formed along with the semiconductor layer 526 during the same patterning process such that a semiconductor line 525 is disposed under the data line 528. The semiconductor line has the same pattern shape as the data line 528. The semiconductor layer 526 may be elongated under both the pixel connecting line 533 and the capacitor electrode 535. In particular, the semiconductor layer 526 may extend from the semiconductor line 525 under the source and drain electrodes 530 and 532, the pixel connecting line 533 and the capacitor electrode 535.

Similar to the first and third embodiments explained with reference to FIGS. 5 and 9, the common electrode 520 includes a first common electrode pattern 520a that surrounds the pixel region P and has a circular opening 518 in the middle, and a second common electrode pattern 520b within the circular opening 518. First half portions of the first and second common electrode patterns 520a and 520b extend from the common line 514 in an upward direction, and second half portions of the first and second common electrode patterns extend in a downward direction. Thus, the first and second common electrode patterns 520a and 520b are connected to the common line 514. The first common electrode pattern 520a is shaped like a rectangle and has a circular opening 518, while the second common electrode pattern 520b is shaped like a ring. Because the common line 514 transversely crosses the pixel region P, the common line 514 corresponds to and crosses along a diametric line of the circular band shaped second common electrode pattern 520b and the circular opening 518.

The pixel electrode 538 includes first and second pixel electrode patterns 538a and 538b. The first pixel electrode pattern 538a has a semicircular arc and is disposed between the first and second common electrode patterns 520a and 520b, and the second pixel electrode pattern 538b has a rod shape and is disposed inside the circular band shaped second common electrode pattern 520b. In this fifth embodiment of the present invention, the first and second pixel electrode patterns 520a and 520b are formed to directly contact the pixel connecting line 533. The circular band shaped first pixel electrode pattern 538a crosses and directly contacts the pixel connecting line 533. The second pixel electrode pattern 538b is located in the center of the pixel region P where the common and pixel connecting lines 514 and 533 cross each other. Especially, the second pixel electrode pattern 538b is disposed within an area of the pixel connecting line 533. Accordingly, the pixel electrode 538, having the first and second electrode patterns 538a and 538b, receives data signals from the thin film transistor T.

In the fifth embodiment the pixel region P is divided into multidomains, e.g., four domains, by the pixel connecting line 533 and the common line 514. Moreover, the aperture areas defined between the common and pixel electrodes 520 and 538 have circular shapes similar to the first and third embodiments of FIGS. 5 and 9, to prevent color shift and improve the image quality and viewing angle of the IPS-LCD device.

FIGS. 15A-15D are schematic plan views illustrating a three mask process of fabricating an array substrate for an IPS-LCD device according to a fifth embodiment of the present invention.

Figure 15A:
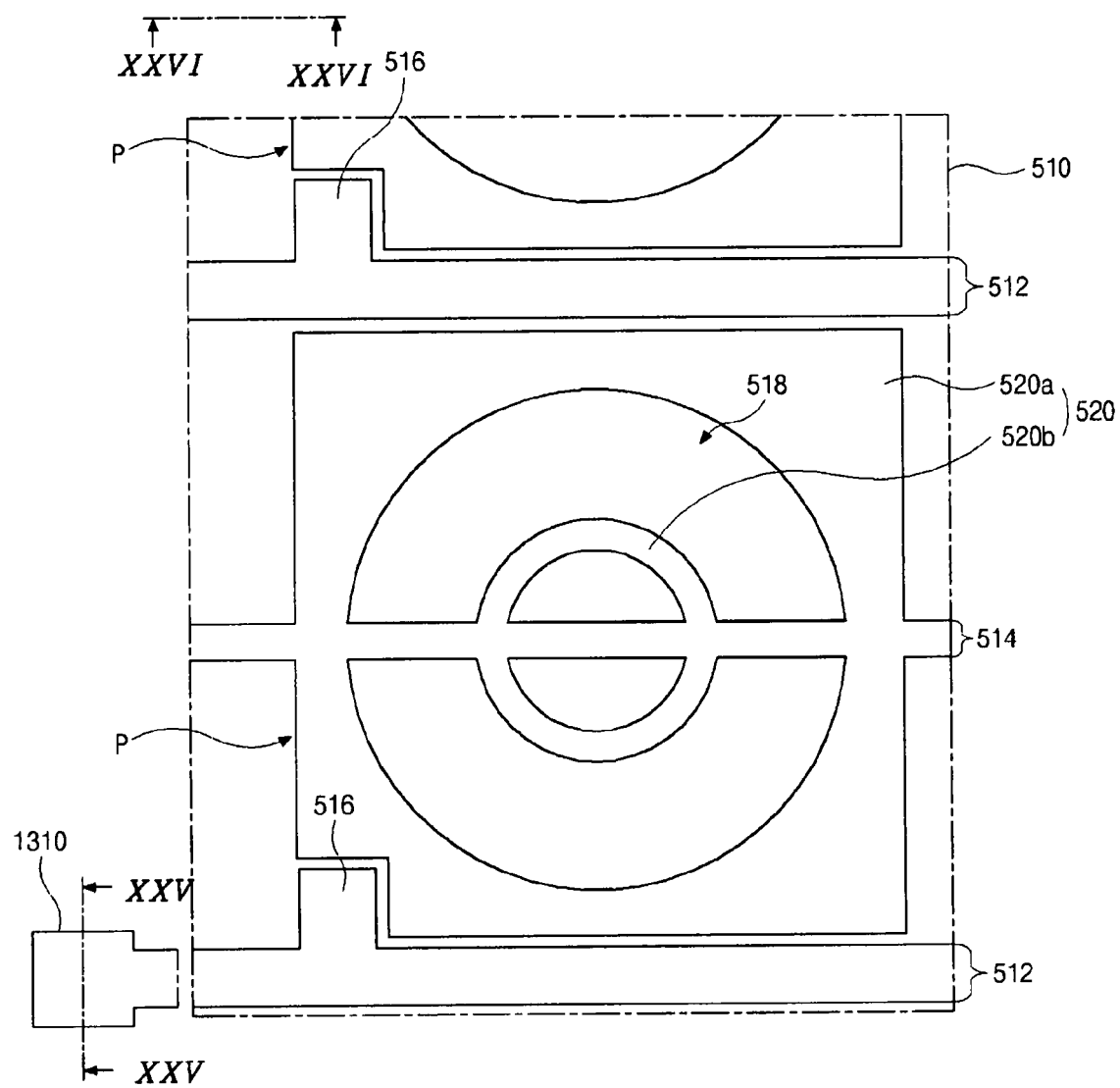
FIGS. 15A to 15D are schematic plane views illustrating a three mask process of fabricating an array substrate for an IPS-LCD device according to a fifth embodiment of the present invention.
Figure 25A:
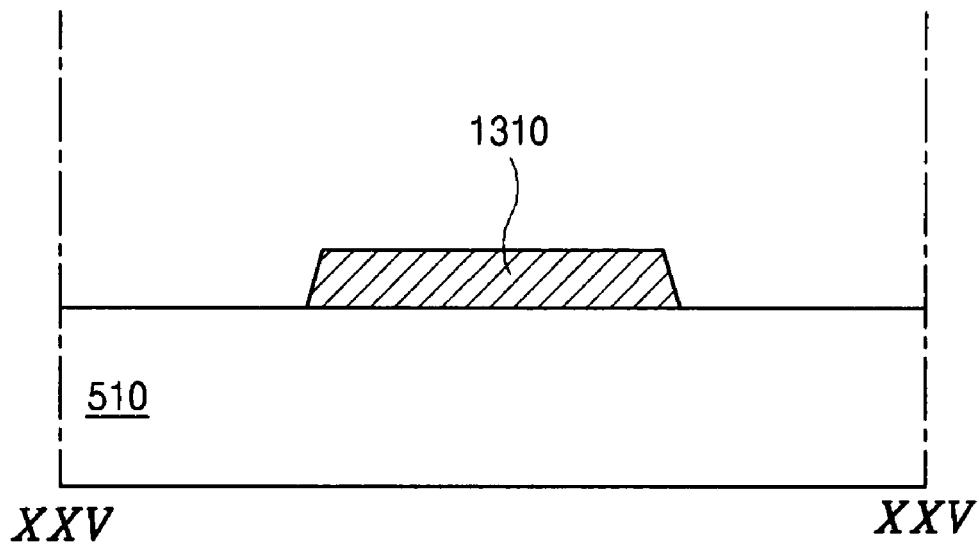
FIGS. 25A-25D are cross sectional views illustrating the process steps of forming the gate pad of FIG. 14.
Figure 26A:
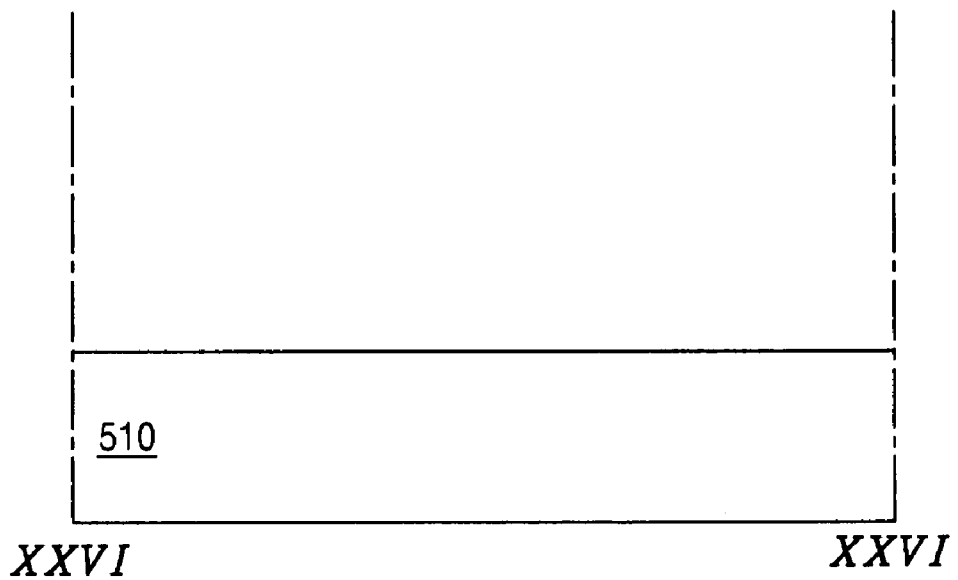
FIGS. 26A-26D are cross sectional views illustrating the process steps of forming the data pad of FIG. 14.

In FIGS. 15A, 25A and 26A, a gate line 512 and a common line 514 are formed on a substrate 510 during a first mask process. At the same time, a gate electrode 516 connected to the gate line 512, a common electrode 520 connected to the common line 514, and a gate pad 1310 connected to one end of the gate line 512 may be formed. Similar to the first and third embodiments described with reference to FIGS. 6A and 10A, respectively, the gate line 512 and the common line 514 are transversely disposed. The gate electrode 516 extends from the gate line 512. The common electrode 520 includes first and second common electrode patterns 520a and 520b. The first common electrode pattern 520a includes a circular opening 518. First half portions of the first and second common electrode patterns 520a and 520b extend from the common line 514 in an upward direction, and second half portions extend in a downward direction. The first common electrode pattern 520a is shaped like a rectangle within the pixel region P and includes a circular opening 518 such that the first common electrode pattern surrounds a boundary portion of the pixel region P. The second common electrode pattern 520b has a ring shape and is disposed within the circular opening 518. The common line 514 horizontally crosses the middle of the pixel region P such that it runs along the diametric line of the circular band shaped second common electrode pattern 520b and the circular opening 518.

Figure 15B:
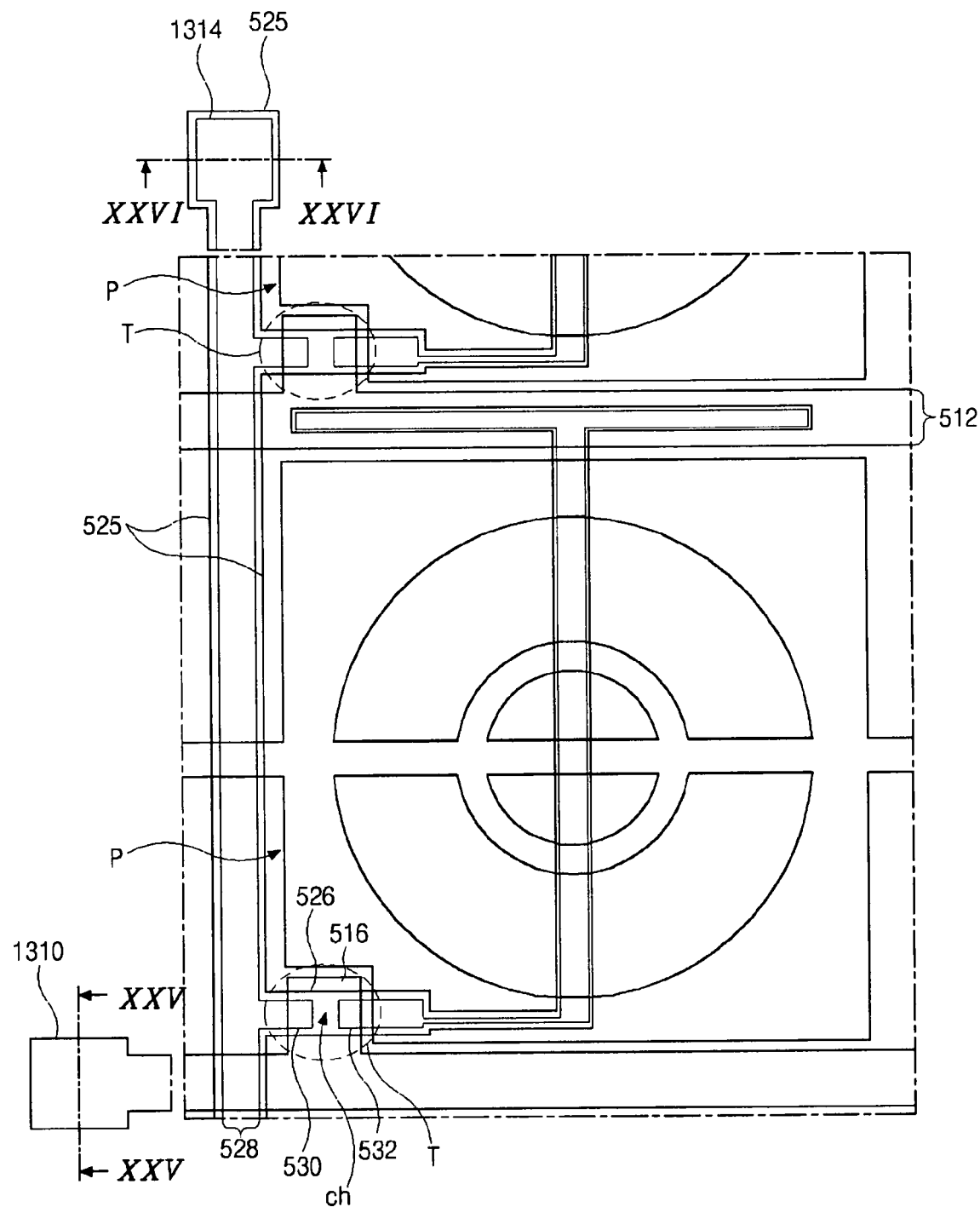
Figure 25B:
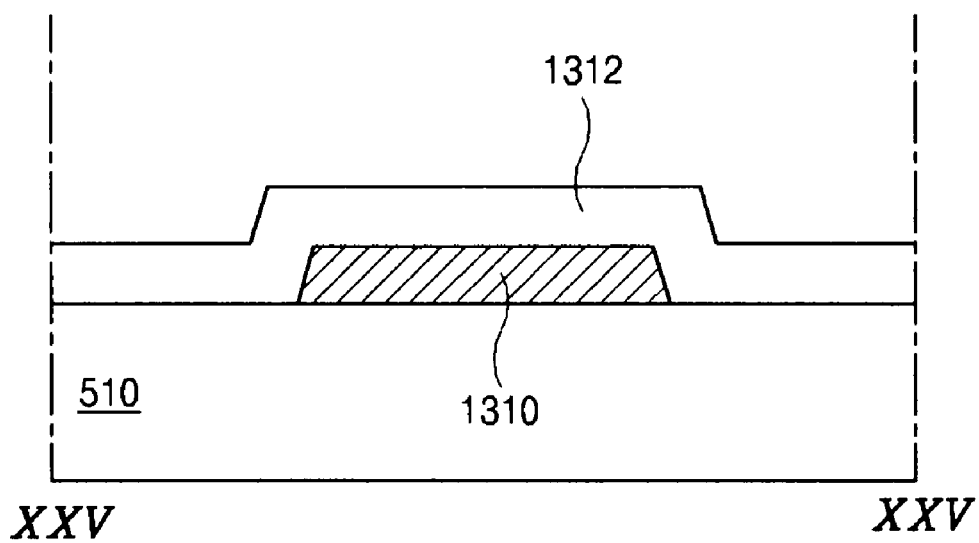
Figure 26B:
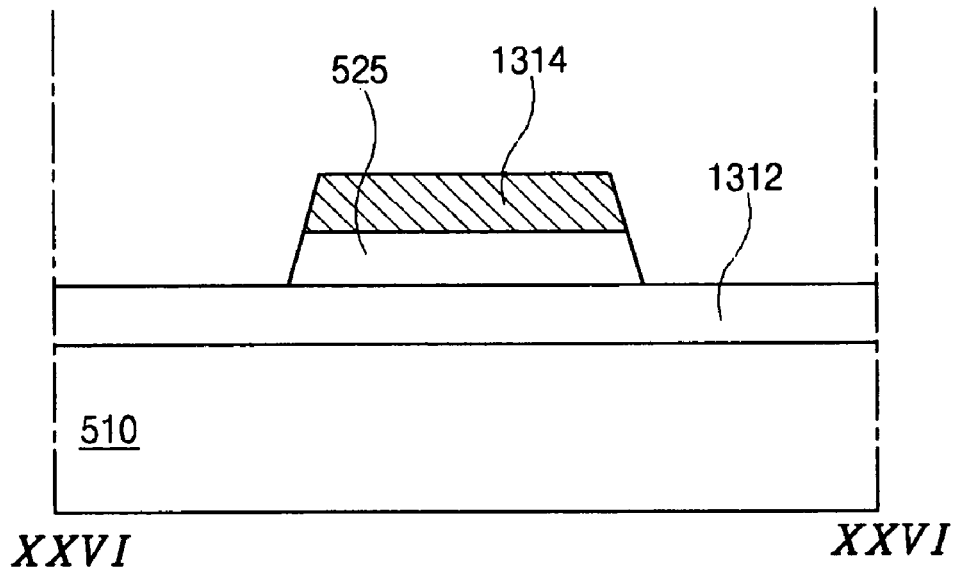

In FIGS. 15B, 25B and 26B, after forming a gate insulating layer 1312 on the gate line 512 and the common line 514, a semiconductor layer 526 and a data line 528 are simultaneously formed on the gate insulating layer 1312 through a second mask process. The semiconductor layer 526 may include a multiple layer of intrinsic amorphous silicon layer and impurity-doped amorphous silicon layer and the data line 528 may include a metallic material. At the same time, a source electrode 530 is formed to overlap the gate electrode 516 and extend from the data line 528 and a drain electrode 532 spaced apart from the source electrode 530. Because the semiconductor layer 526 is formed with the source and drain electrodes 530 and 532 during the same patterning process and using a diffraction mask similar to the third embodiment illustrated with reference to FIG. 10B, a semiconductor line 525 is formed under the data line. The semiconductor line 525 has the same pattern shape as the data line 528. Furthermore, when forming the data line 528 and the source and drain electrodes 530 and 532, a pixel connecting line 533 and a capacitor electrode 535 are also formed as a single unitary pattern with the drain electrode 532. The capacitor electrode 535 is formed over the previous gate line to form the storage capacitor, and the pixel connecting line 533 is disposed vertically crossing the pixel region P and connects the drain electrode 532 to the capacitor electrode 535. The semiconductor layer 536, extending from the semiconductor line 535, may be formed to be disposed under the pixel connecting line 533 and the capacitor electrode 535. Moreover, a portion of the semiconductor layer 536 between the source and drain electrodes 530 and 532 is removed through an exposure process using the diffraction mask, and forms a channel "ch" by exposing the intrinsic amorphous silicon layer. The gate electrode 516, the semiconductor layer 526, the source electrode 530 and the drain electrode 632 form a thin film transistor (TFT) T.

Figure 15C:
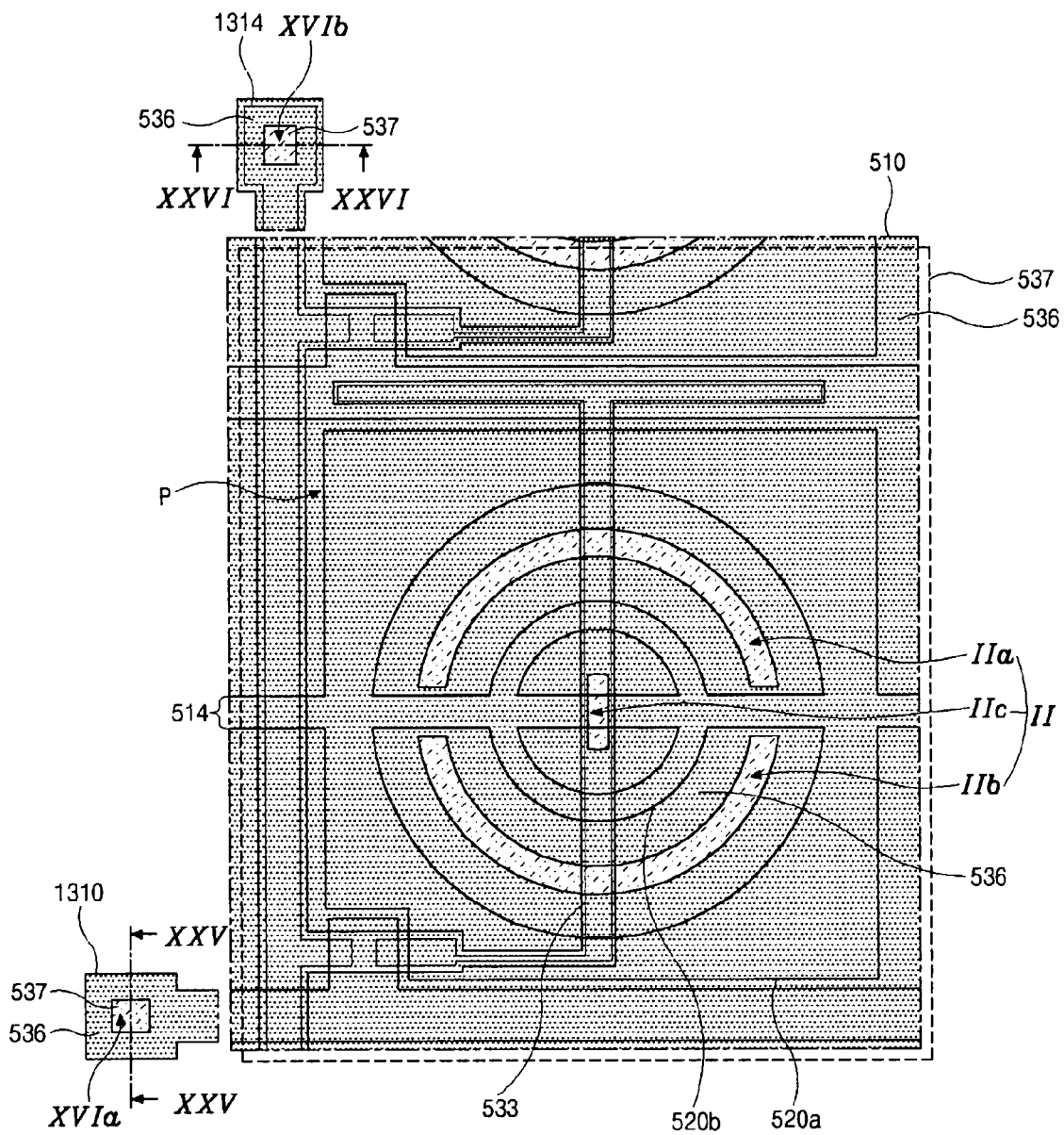
Figure 25C:
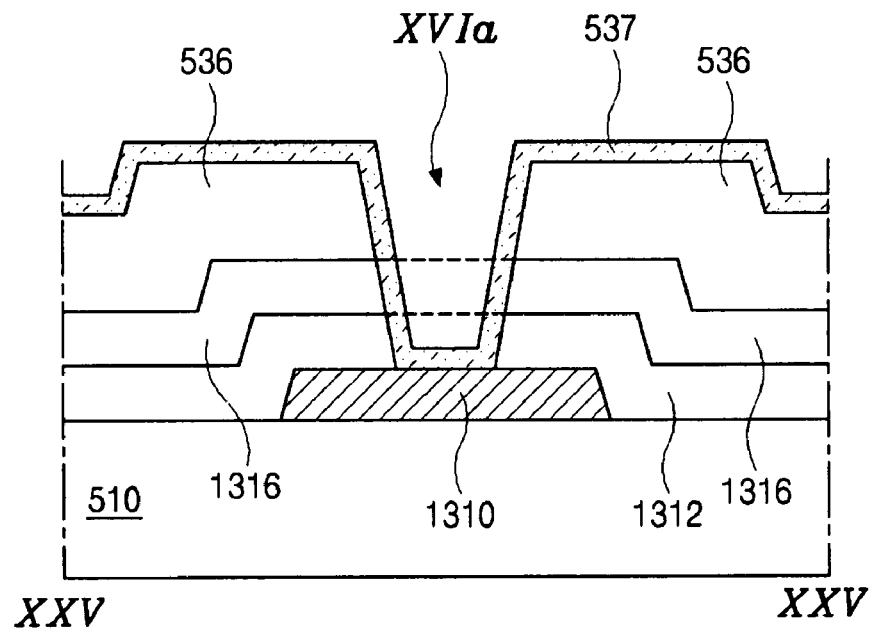
Figure 26C:
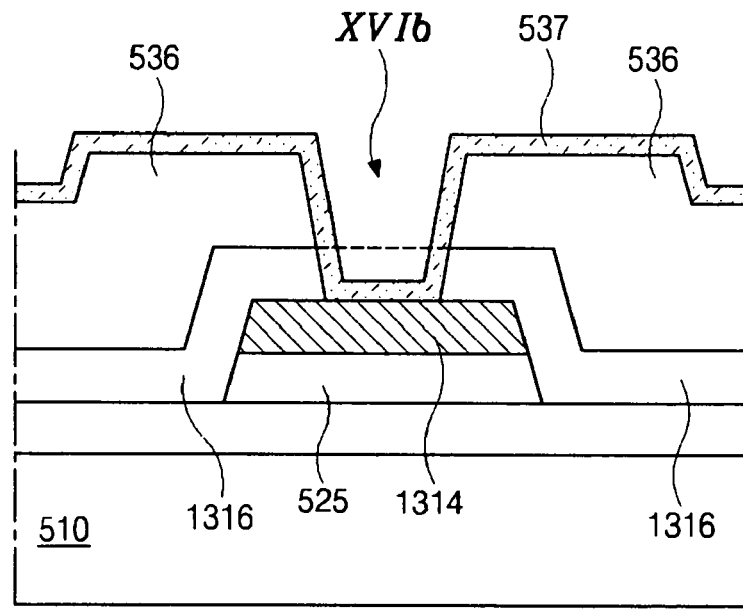

FIGS. 15C, 25C and 26C illustrate a step of forming a photoresist (PR) pattern 536 and a transparent conductive layer 537. After forming the TFT T, a passivation layer 1316 is formed over an entire of the substrate 510. Then, the photoresist material is first formed over an entire surface of the substrate and then patterned during a third mask process, to form the PR pattern 536. The PR pattern 536 includes electrode areas "II" where a PR material is removed. The electrode area "II" includes first and second electrode area "IIa" and "IIb." The first electrode area "IIa" has a semicircular arc and is disposed between the first and second common electrode patterns 520a and 520b. The second electrode area "IIb" has a rod shape in a center portion of the pixel region P wherein the pixel connecting line 533 perpendicularly crosses the common line 514. After forming the PR pattern 536, portions of the passivation and gate insulating layers 1312 and 1316, which are areas exposed by the electrode area "II", are removed using the PR pattern 536 as a mask. At this time of etching, the first contact opening XVIa and the second contact opening XVIb are also formed. As mentioned before, the first contact opening XVIa exposes the gate pad 1310, and the second contact opening XVIb exposes the data pad 1314. After the etching process, the transparent conductive layer 537 is formed on an entire surface of the substrate 510 to cover the PR pattern 536.

Figure 15D:
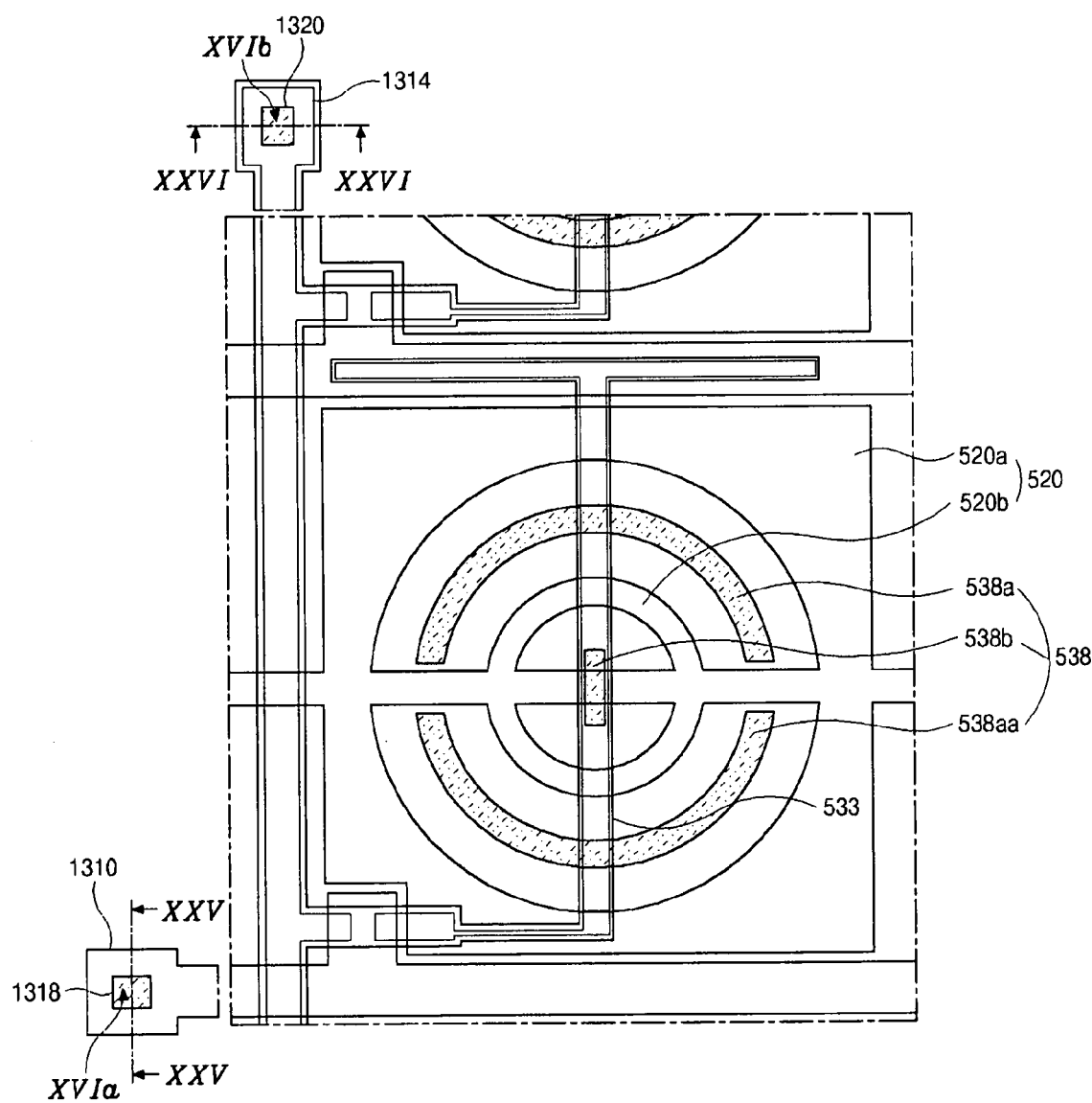
Figure 25D:
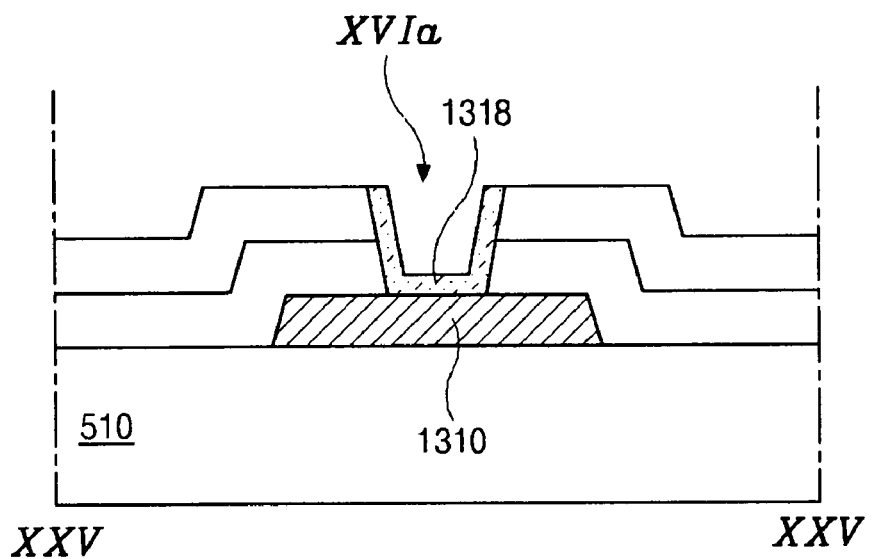
Figure 26D:
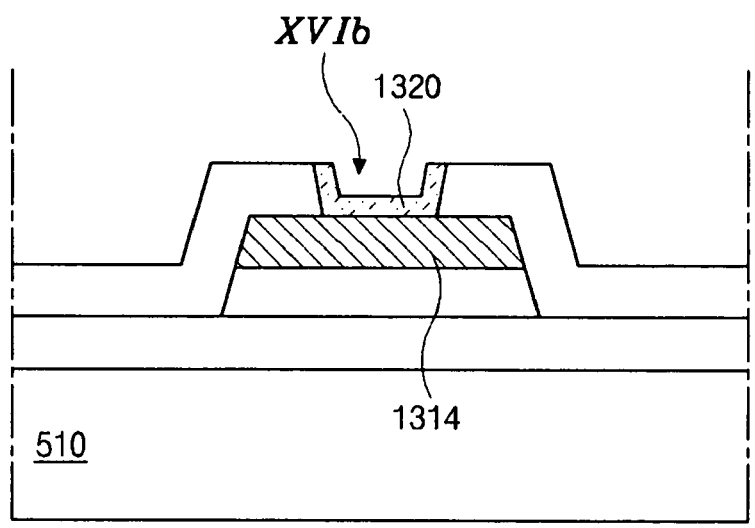

In FIG. 15D, 25D and 26D, a pixel electrode 538 is obtained by stripping the PR pattern 536 (of FIG. 15C). At this time of the stripping process, a gate pad terminal 1318 and a data pad terminal 1320 are also obtained. When the PR pattern 536 (of FIG. 15C) is stripped out, a portion of the transparent conductive layer 537 (of FIG. 15C) on the PR pattern 535 (of FIG. 15C) is also removed. Accordingly, only the transparent conductive portion not on the PR pattern 536 (of FIG. 15C) remains and the residual transparent conductive patterns become the pixel electrode 538, the gate pad terminal 1318 and the data pad terminal 1320. In this step of the lift-off process shown in FIG. 15D, 25D and 26D, an additional photolithographic process including exposure and development is not necessary such that the array substrate can be fabricated using the three-mask process.

Similar to the first and third embodiment, the pixel electrode 538 includes first and second pixel electrode patterns 538a and 538b. The first pixel electrode pattern 538a has a semicircular arc and is disposed between the first and second common electrode patterns 520a and 520b. The second pixel electrode pattern 538b has a rod shape and is disposed in a center portion of the pixel connecting line 533. The first and second pixel electrode patterns 538a and 538b directly contacts the pixel connecting line 533 because there the passivation layer is remover and there is no insulator between the pixel connecting line 533 and the pixel electrode 538.

Figure 16:
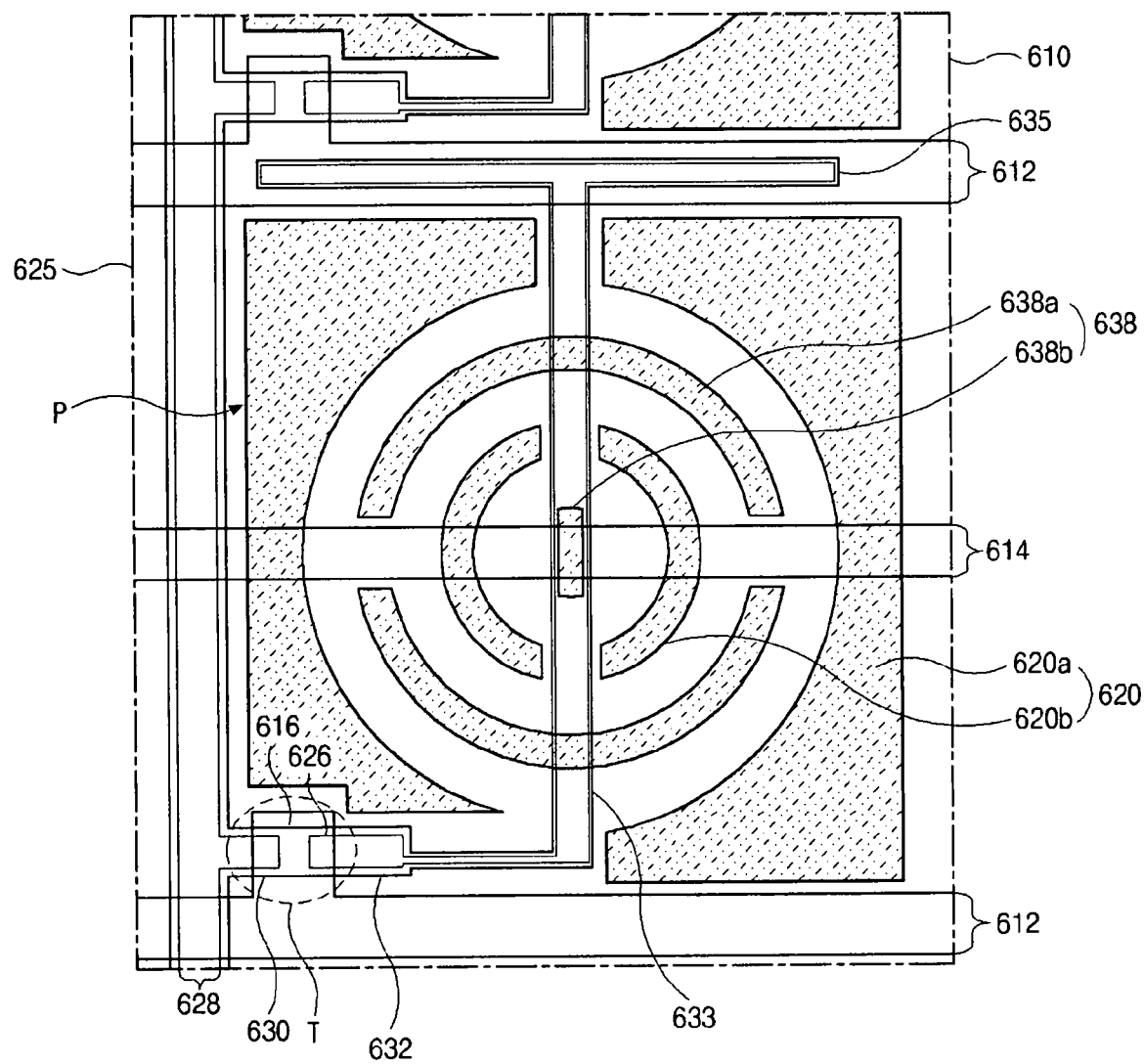
FIG. 16 is a plan view of an array substrate for use in an IPS-LCD device according to a sixth embodiment of the present invention.

FIG. 16 is a plan view of an array substrate for use in an IPS-LCD device according to a sixth embodiment of the present invention. The array substrate of FIG. 16 is similar to that of FIG. 14, but the common and pixel electrodes 620 and 638 are formed together during the same process step. Also in the sixth embodiment of the present invention, the fabrication process utilizes the aforementioned diffraction exposure and lift-off process such that the array substrate of FIG. 16 can be completed using a three-mask process.

In FIG. 16, a gate line 612 is transversely arranged and a data line 628 is disposed substantially perpendicular to the gate line 612. The gate and data lines 612 and 628 define a pixel region P on an array substrate by crossing each other. A thin film transistor (TFT) T is disposed in the pixel region P near a crossing of the gate and data line 612 and 628. The TFT T includes a gate electrode 616, a semiconductor layer 626, a source electrode 630 and a drain electrode 632. The gate electrode 616 extends from the gate line 612, and the source electrode 630 extends from the data line 628 and overlaps one end portion of the gate electrode 616. The drain electrode 632 is spaced apart from the source electrode 630 and overlaps the other end portion of the gate electrode 616. In this process step, the semiconductor material and the metal layer are patterned during the same time using the diffraction mask such that the data line 628 and the source and drain electrodes 620 and 632 are formed along with the semiconductor layer 626. A semiconductor line 625 is formed under the data line 628 and has the same pattern shape as the data line 628. The semiconductor layer 626 extends from the semiconductor line 625 and is also disposed under the source and drain electrodes 630 and 632. Furthermore, a pixel connecting line 633 and a capacitor electrode 635 are also formed at the time of forming the source and drain electrodes 630 and 632. The capacitor electrode 635 is disposed overlapping a portion of the previous gate line 612 and forms the storage capacitor with the overlapped portion of the previous gate line 612. The pixel connecting line 633 vertically crosses the pixel region P and is substantially perpendicular to the common line 614. The pixel connecting line 633 connects the drain electrode 632 to the capacitor electrode 635. The drain electrode 632, the pixel connecting line 633 and the capacitor electrode 635 may be formed as a single unitary pattern. Although not shown in FIG. 16, the semiconductor layer 626 extending from the semiconductor line 625 may be elongated under the pixel connecting line 633 and the capacitor electrode 635.

Within the pixel region P, a first common electrode pattern 620a having a rectangular shape is disposed. The first common electrode pattern 620a has a circular opening in the middle and is divided into two parts including left and right parts. The first common electrode pattern 620a does not overlap the pixel connecting line 633, such that the pixel connecting line 633 divides the first common electrode pattern 620a into left and right parts. The second common electrode pattern 620b is disposed inside the circular opening of the first common electrode pattern 620b, and are divided into two parts including left and right semicircular arcs. Like the first common electrode pattern 620a, the second common electrode pattern 620b does not overlap the pixel connecting line 633 such that the left and right semiconductor arcs of the second common electrode pattern 620b are divided by the pixel connecting line 633. The first and second common electrode patterns 620a and 620b overlap a portion of the common line 614 and directly contact the common line 614.

Within the pixel region P, a pixel electrode 638 is also formed. The first pixel electrode 638 includes a first pixel electrode pattern 638a and a second pixel electrode pattern 638b. The first pixel electrode pattern 638a is disposed between the first and second common electrode patterns 620a and 620b and is divided into two part including upper and lower semicircular arcs. The upper and lower semicircular arcs of the first pixel electrode pattern 638a cross over the pixel connecting line 633, but do not overlap the common line 614. Thus, the first pixel electrode pattern 638a is divided by the common line 614 into the upper and lower semicircular arcs. The second pixel electrode pattern 638b is shaped like a rod and disposed over the pixel connecting line 633 in the middle of the pixel region P. The second pixel electrode pattern 638b should not be out of the area of pixel connecting line 633 because the second pixel electrode pattern 638b contacts the common line 614 with receiving the common voltage and does not generate the electric field if the second pixel electrode pattern 638b overlaps the common electrode 614. The second pixel electrode pattern 638b is formed on the pixel connecting line 633 and directly contacts the pixel connecting line 633.

FIGS. 17A to 17D are schematic plane views illustrating a three-mask process for fabricating the array substrate of FIG. 16. As discussed above, the fabrication process utilizes both the diffraction mask and the lift-off process to accomplish the three-mask process.

Figure 17A:
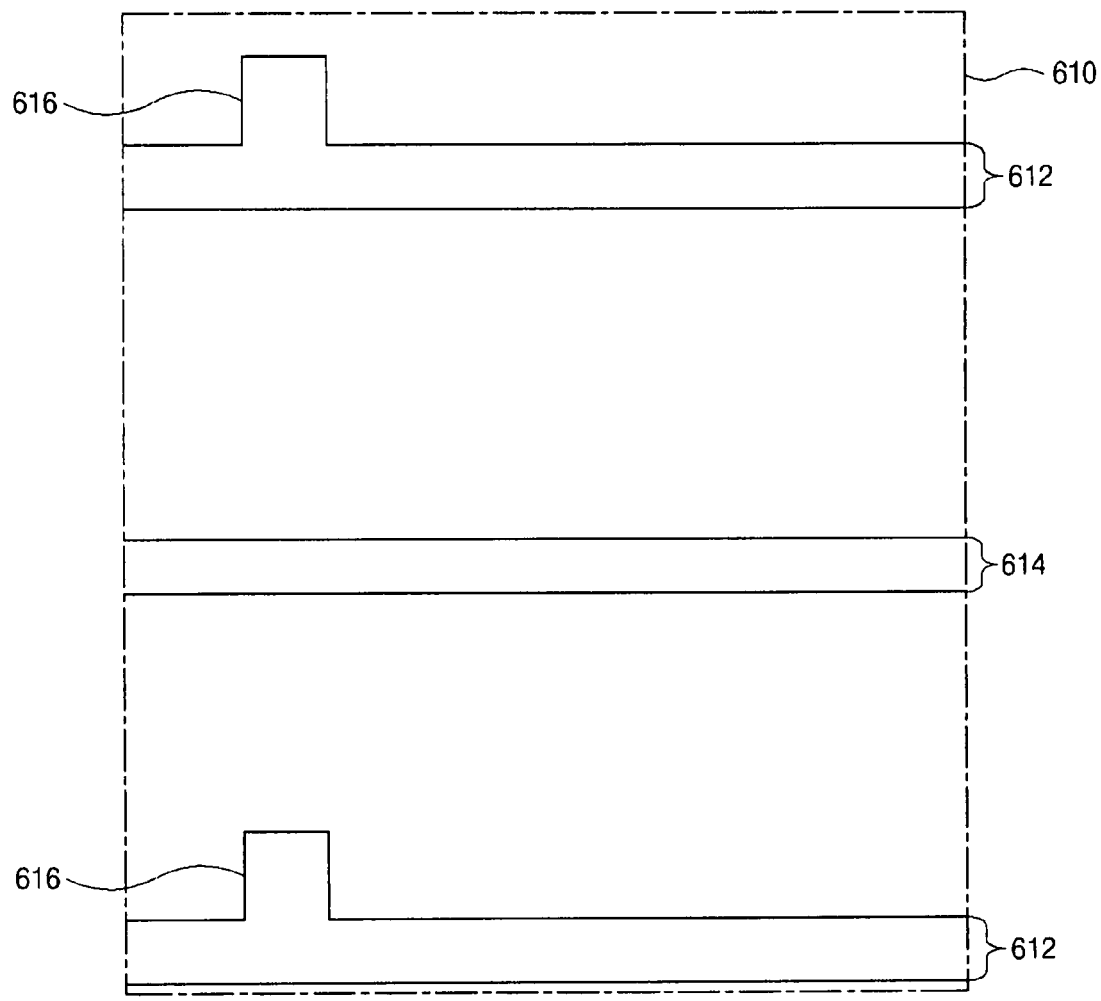
FIGS. 17A to 17D are schematic plan views illustrating a three-mask process for fabricating the array substrate of FIG. 16.

In FIG. 17A, a gate line 612 and a common line 614 are formed on a substrate 610 during a first mask process. At the same time, a gate electrode 616, connected to the gate line 612, may be formed.

Figure 17B:
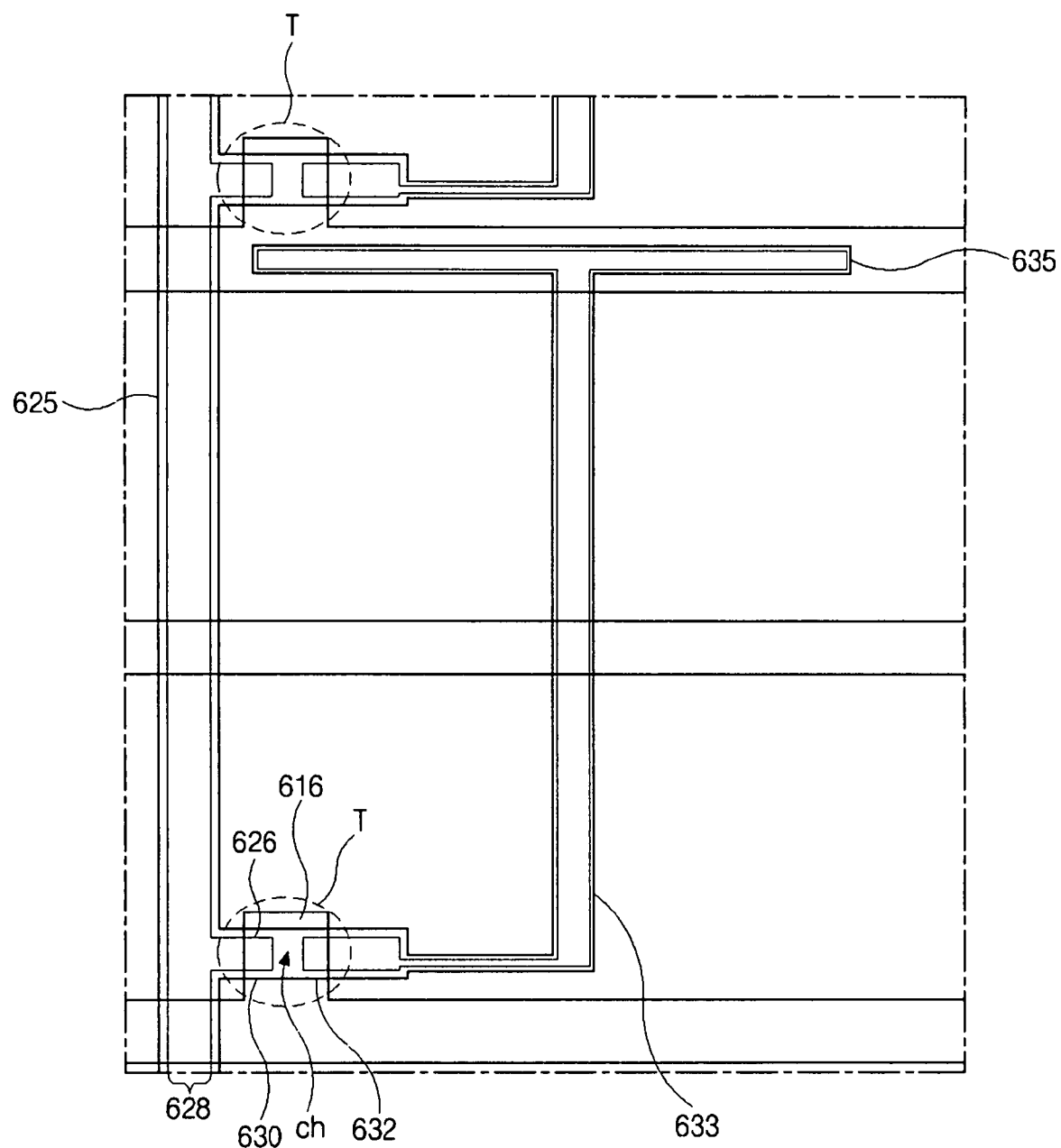

In FIG. 17B, after forming a gate insulating layer (not shown) on the gate line 612 and the common line 614, a semiconductor line 625, a semiconductor layer 626 and a data line 628 are simultaneously formed on the gate insulating layer through a second mask process. The semiconductor layer 626 includes a multiple layer of intrinsic amorphous silicon layer and impurity-doped amorphous silicon layer, and so does the semiconductor line 625. The data line 628 may include a metallic material. At the same time of forming the data line 628, a source electrode 630 is formed to overlap the gate electrode 616 and extend from the data line 628. A drain electrode 632 is spaced apart from the source electrode 630. Because the semiconductor layer 626 is formed with the source and drain electrodes 630 and 632 during the same patterning process and using a diffraction mask similar to the third and five embodiments illustrated with reference to FIGS. 10B and 15B, the semiconductor line 625 under the data line has the same pattern shape with the data line 628. Furthermore, when forming the data line 628 and the source and drain electrodes 630 and 632, a pixel connecting line 633 and a capacitor electrode 635 are also formed as a single unitary or integrated pattern with the drain electrode 632. The capacitor electrode 535 is formed over the previous gate line to form the storage capacitor, and the pixel connecting line 533 is disposed vertically to cross the pixel region P and connects the drain electrode 632 to the capacitor electrode 635. Although not shown in FIG. 17B, the semiconductor layer 636 extends from the semiconductor line 635 and may be disposed underneath the pixel connecting line 633 and the capacitor electrode 635. Moreover, a portion of the semiconductor layer 636 between the source and drain electrodes 630 and 632 may be removed through an exposure process using the diffraction mask to form a channel "ch" by exposing the intrinsic amorphous silicon layer. The gate electrode 616, the semiconductor layer 626, the source electrode 630 and the drain electrode 632 form a thin film transistor (TFT) T.

Figure 17C:
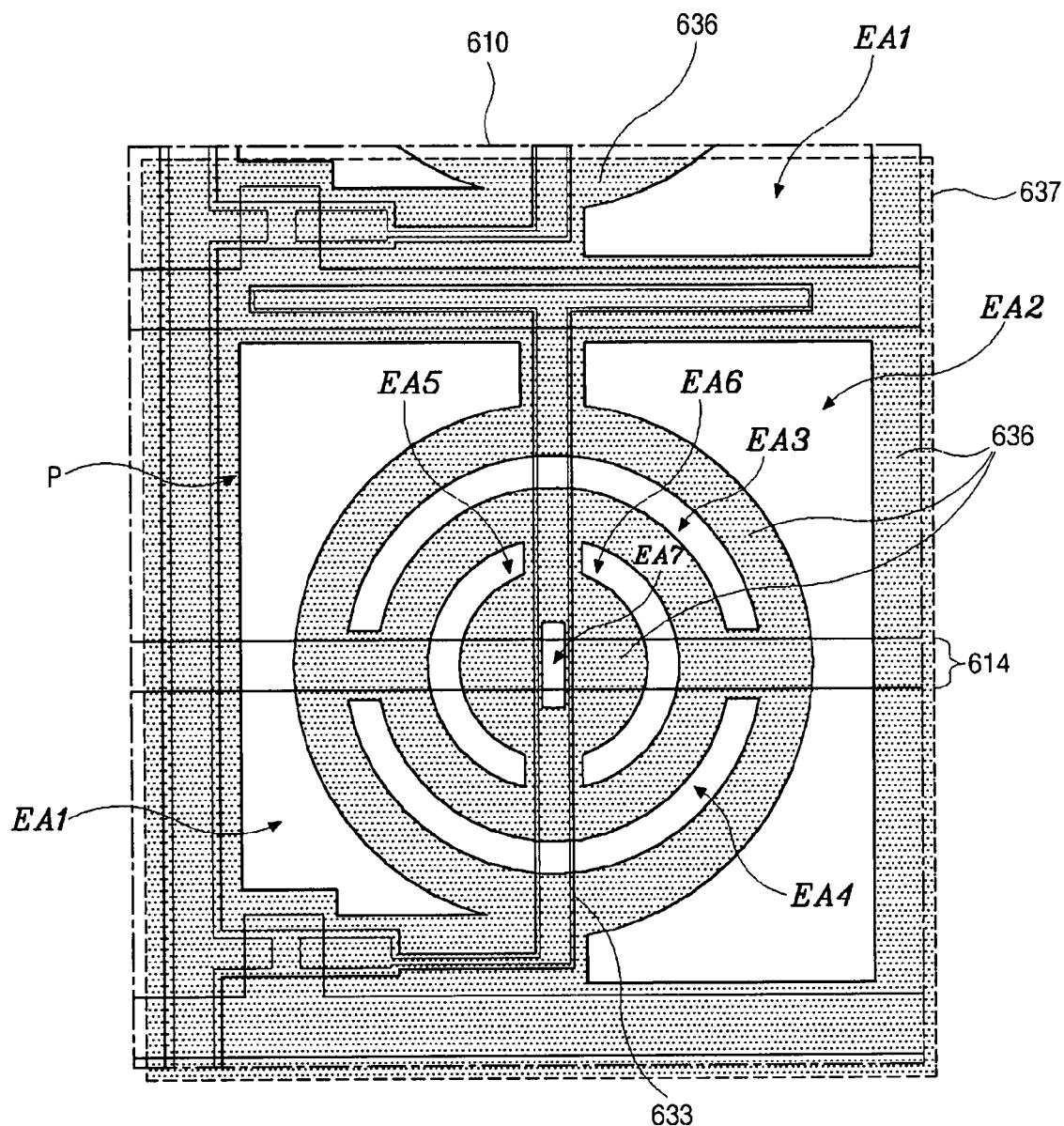

In FIG. 17C, a photoresist (PR) layer is applied over an entire surface of the substrate 610, and then patterned using a third mask process to form a photoresist (PR) pattern 635. The PR pattern 636 includes electrode areas EA where a PR material is removed during the patterning process. The electrode areas EA include first to seventh electrode areas EA1-EA7. The first and second electrode areas, EA1 and EA2, have semicircular-rounded sides, respectively, which face to each other. The first and second electrode areas EA1 and EA2 are shaped like a rectangle and surrounds a boundary portion of the pixel region P. Each of the third and fourth electrode areas EA3 and EA4 is shaped like a semicircular arc. The third and fourth electrode areas EA3 and EA4 face each other and are surrounded by the first and second electrode areas EA1 and EA2. The third and fourth electrode areas EA3 and EA4 cross the pixel connecting line 633, but do not cross the common line 614. The fifth and sixth electrode areas EA5 and EA6 are also shaped like semicircular arcs and face each other. The fifth and sixth electrode appears EA5 and EA6 are surrounded by the third and fourth electrode areas EA3 and EA4. The fifth and sixth electrode areas EA5 and EA6 cross the common line 614, respectively, but do not cross the pixel connecting line 633. The seventh electrode area EA7 is shaped like a rod, disposed within the area of the pixel connecting line 633 and is surrounded by the fifth and sixth electrode areas EA5 and EA6. The seventh electrode area EA7 exposes only a portion of the pixel connecting line 633.

After forming the PR pattern 635, the underlying gate insulating layer (not shown) is etched using the PR pattern 635 as an etching mask. Accordingly, the gate insulating layer under the first to sixth electrode areas EA1 to EA6 is removed. Because the pixel connecting line 633 covers the gate insulating layer in the seventh electrode area EA7, the gate insulating layer in the seventh electrode area EA7 is not removed and the common line 614 in the seventh electrode area EA7 is not exposed. After etching the gate insulating layer, a transparent conductive layer 637 is formed on an entire surface of the substrate 610 to cover the PR pattern 635.

Figure 17D:
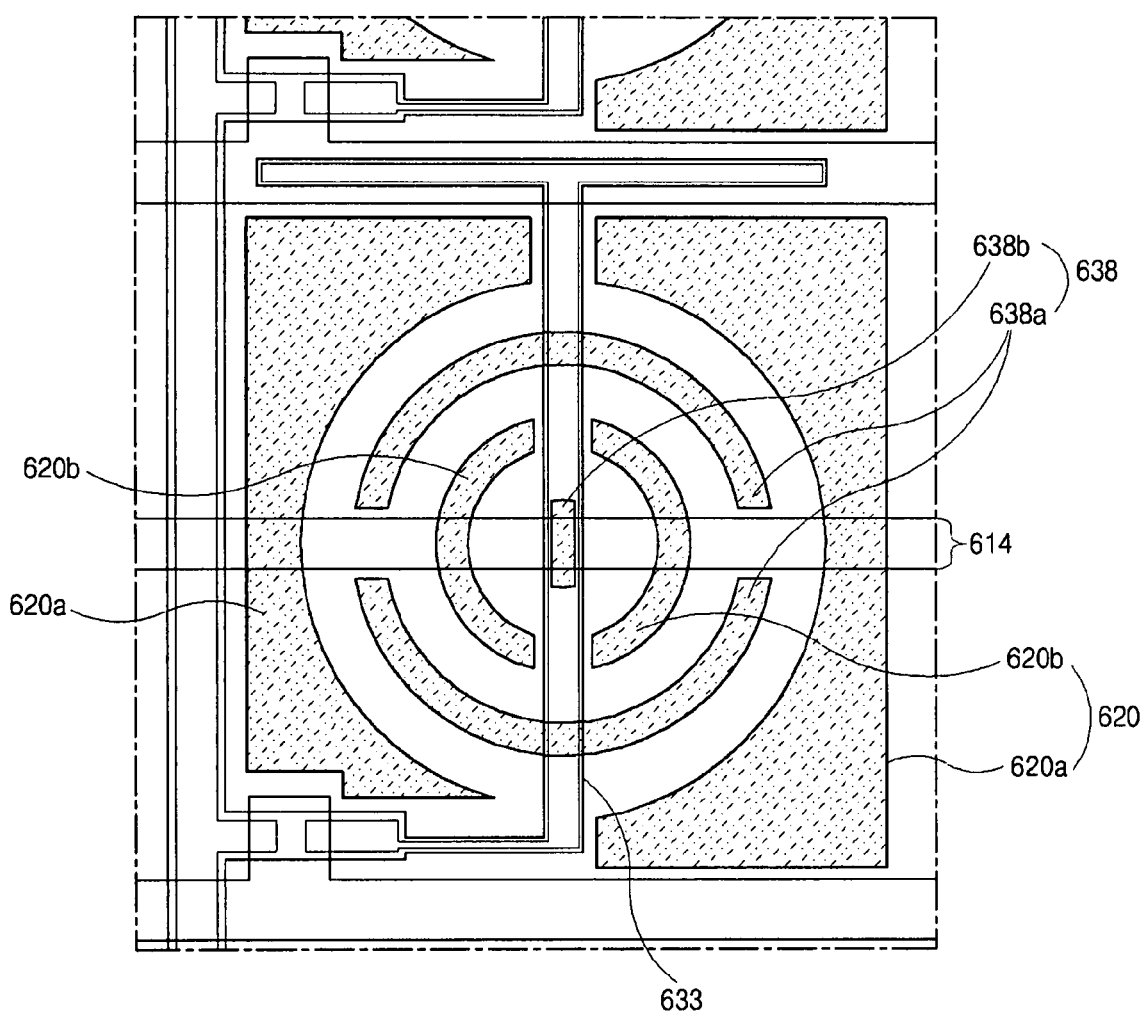

In FIG. 17D, a pixel electrode 638 and a common electrode 620 are obtained by stripping the PR pattern 636 (of FIG. 17C), e.g., the lift-off process. When the PR pattern 636 (of FIG. 17C) is stripped out, portions of the transparent conductive layer 637 (of FIG. 17C) on the PR pattern 636 (of FIG. 17C) are also removed. Accordingly, only the transparent conductive portions not on the PR pattern 636 remains and the residual transparent conductive patterns become the pixel electrode 638 and the common electrode 620. In this step of the lift-off process shown in FIG. 17D, an additional photolithographic process including exposure and development is not necessary.

As described with reference to FIG. 16, the pixel electrode 638 includes first and second pixel electrode patterns 638a and 638b and the common electrode 620 includes first and second common electrode patterns 620a and 620b. The first common electrode pattern 638a corresponds to the first and second electrode areas EA1 and EA2 (of FIG. 17C), and the second common electrode pattern 638b corresponds to the fifth and sixth electrode areas EA5 and EA6 (of FIG. 17C). The first pixel electrode pattern 638a corresponds to the third and fourth electrode areas EA3 and EA4 (of FIG. 17C), and the second pixel electrode pattern 638b corresponds to the seventh electrode area EA7. Because the gate insulating layer is removed within the first, second, fifth and sixth electrode areas (of FIG. 17C) the first and second common electrode patterns 620a and 620b directly contact the common line 614. Moreover, the first and second pixel electrode patterns 638a and 638b may directly contact the pixel connecting line 633 because there is no insulator on the pixel connecting line 633.

In the fifth embodiment, the pixel electrode 538 and the common electrode 520 are formed of the same material during the same process, and directly contact the pixel connecting line 633 and the common line 614, respectively. Accordingly, if the common electrode 620 crosses the pixel connecting line 633, the common electrode 620 may directly contact the pixel connecting line 633 and may cause an undesirable electrical short. Similarly, if the pixel electrode 638 crosses the common line 614, the pixel electrode 638 may directly contact the common line 614. Accordingly, the common electrode 620 and the pixel electrode 638 are disposed to not overlap the pixel connecting line 633 and the common line 614, respectively.

The first common electrode pattern 620a has a rectangular outline and may be divided into two parts that face each other. The opposite sides of the two parts of the first common electrode pattern 620a have rounded shapes. The second common electrode pattern 620b also have the separate two parts (i.e., left and right parts) each being shaped like a semicircular arc. The first pixel electrode pattern 638a also has two separated portions each having a semicircular arc and disposed between the first and second common electrode patterns 620a and 620b. In particular, the second pixel electrode pattern 638b is disposed only inside the area of pixel connecting line 633.

Figure 18:
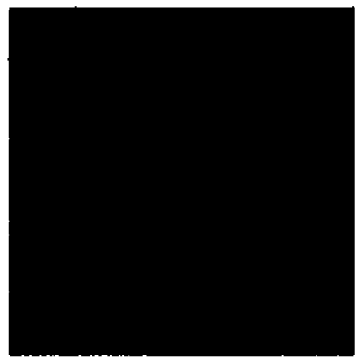
FIG. 18 show simulation testing results of gray level and liquid crystal director conducting on the IPS-LCD device of the present invention depending on the applied voltages.
Figure 18:
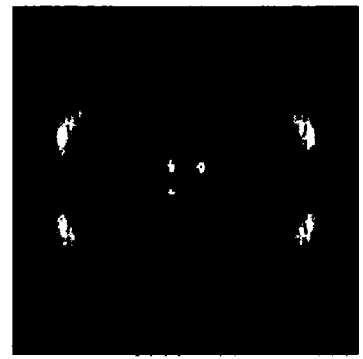
Figure 18:
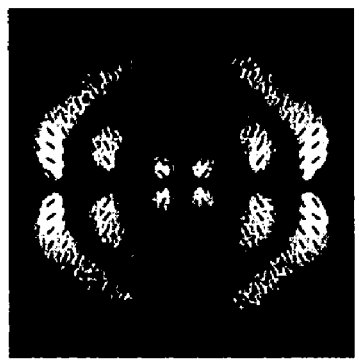
Figure 18:
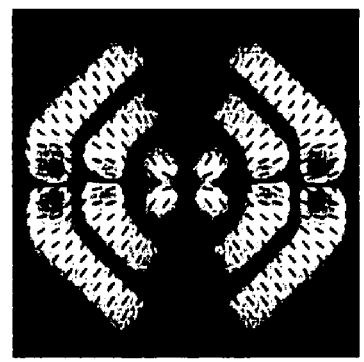
Figure 18:
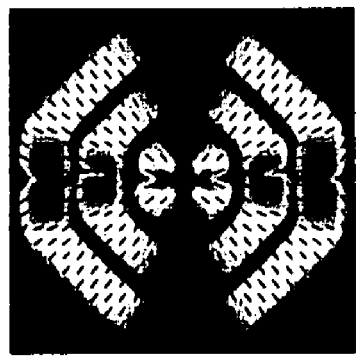
Figure 18:
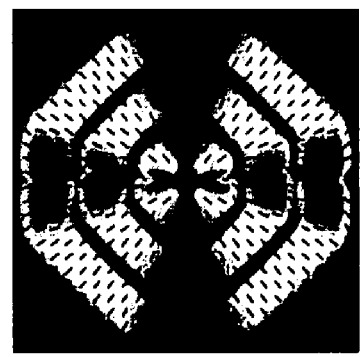

FIG. 18 show simulation testing results of gray level and liquid crystal director conducting on the IPS-LCD device of the present invention depending on the applied voltages. The simulation testing is initially performed in a normally black mode where the IPS-LCD device generates black color when the voltage is not applied. As shown in FIG. 18, when the voltage increases, the brightness also increases and the liquid crystal directors are uniform in all directions. Specifically, wherever the observer looks at the IPS-LCD device, the liquid crystal director will be the same regardless of the directions.

Figure 19:
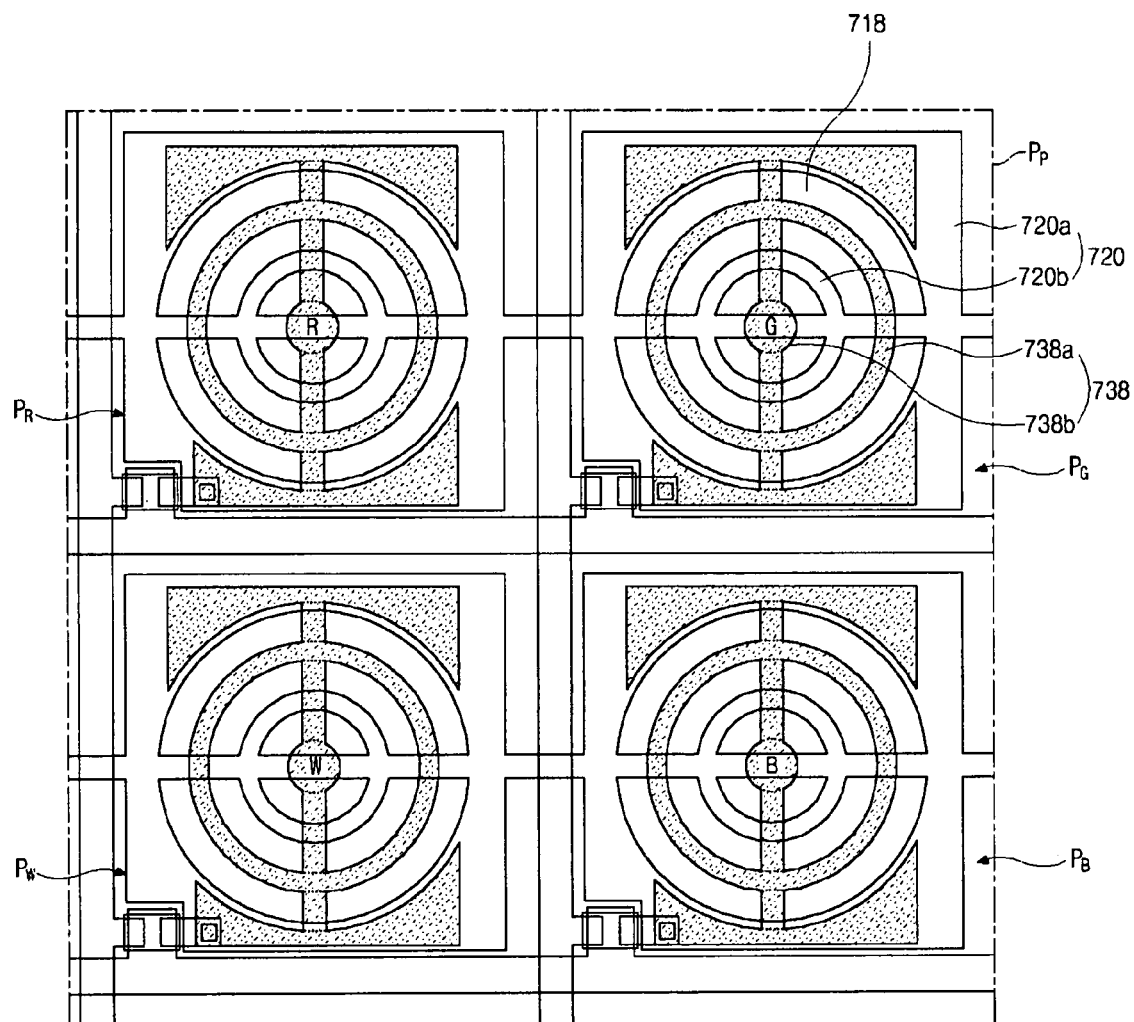
FIG. 19 is a schematic plane view of an array substrate for an IPS-LCD device according to a seventh embodiment of the present invention.

FIG. 19 is a schematic plan view of an array substrate for an IPS-LCD device according to a seventh embodiment of the present invention. In the seventh embodiment of the present invention, the IPS-LCD device includes red, green, blue and white sub-pixel regions each having a square shape. The four sub-pixels form one pixel.

In FIG. 19, red, green, blue and white sub-pixel regions "PR," "PG," "PB," and "PW" form one pixel region "PP" of a square shape. A common electrode 720 including first and second common electrode patterns 720a and 720b is formed in each sub-pixel region "PR," "PG," "PB," and "PW." The first common electrode pattern 720a including a circular opening 718 surrounds a boundary portion of each sub-pixel region "PR," "PG," "PB," or "PW." The second common electrode pattern 720b has a ring shape in the center of the circular opening 718. Also, a pixel electrode 738 having a circular band shaped first pixel electrode pattern 738a and a circular second pixel electrode pattern 738b are disposed within the circular opening 718. The common and pixel electrodes 720 and 738 form circular aperture areas. Because each sub-pixel region "PR," "PG," "PB," or "PW" has a square shape and the white sub-pixel "PW" is employed, aperture ratio is dramatically improved rather than when only red, green and blue sub-pixels are employed. Although FIG. 19 shows the array substrate having the circular aperture areas, the array substrate having the gyre aperture area can have such four sub-pixel structure.

Figure 20:
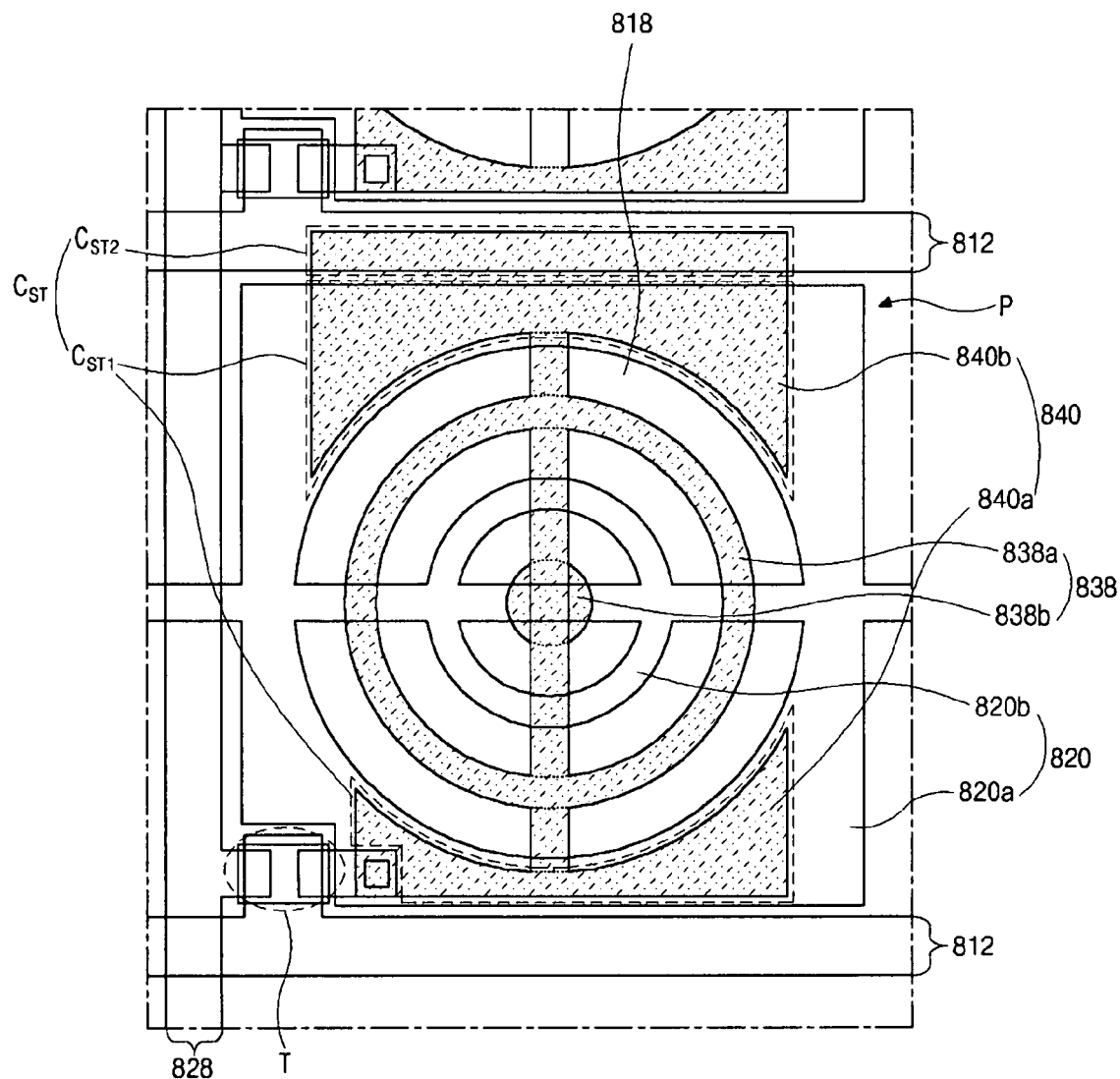
FIG. 20 is a schematic plan view illustrating a pixel of an array substrate for use in an IPS-LCD device according an eighth embodiment of the present invention.

FIG. 20 is a schematic plan view illustrating one pixel of an array substrate for use in an IPS-LCD device according an eighth embodiment of the present invention. The array substrate of FIG. 20 has a very similar elemental structure to FIG. 5, but includes an enlarged storage capacitor.

As shown in FIG. 20, a gate line 812 is transversely arranged and a data line 828 is disposed substantially perpendicular to the gate line 812. The gate and data lines 812 and 828 define a pixel region "P" on an array substrate. A thin film transistor (TFT) T is connected to the gate line 812 and the data line 828.

A common electrode 820 including first and second common electrode patterns 820a and 820b is formed in the pixel region P. The first common electrode pattern 820a, including a circular opening 818, surrounds a boundary portion of the pixel region P, and the second common electrode pattern 820b has a ring shape inside the circular opening 818.

A pixel electrode 838 includes first and second pixel electrode patterns 838a and 838b. The first pixel electrode pattern 838a has a ring shape and is disposed between the first and second common electrode patterns 820a and 820b. The second pixel electrode pattern 838b has a circular shape and is disposed inside the circular band shaped second common electrode pattern 820b.

A capacitor electrode 840 includes first and second capacitor electrode patterns 840a and 840b. The first capacitor electrode pattern 840a overlaps a bottom portion of the first common electrode pattern 820a and is connected to the thin film transistor T. The second capacitor electrode pattern 840b overlaps a top portion of the first common electrode pattern 820a and the previous gate line 812 of a neighboring pixel region. The first and second capacitor electrode patterns 840a and 840b and the overlapped top and bottom portions of the first common electrode pattern 820a form a first storage capacitor CST1. And, the second capacitor electrode pattern 840b and the overlapped portion of the previous gate line 812 form a second storage capacitor CST2. Because the second storage capacitor CST is enlarged over the previous gate line and the first and second storage capacitors CST1 and CST2 are connected substantially in parallel to each other, a total storage capacitor CST is raised without reduction of aperture ratio.

Figure 21:
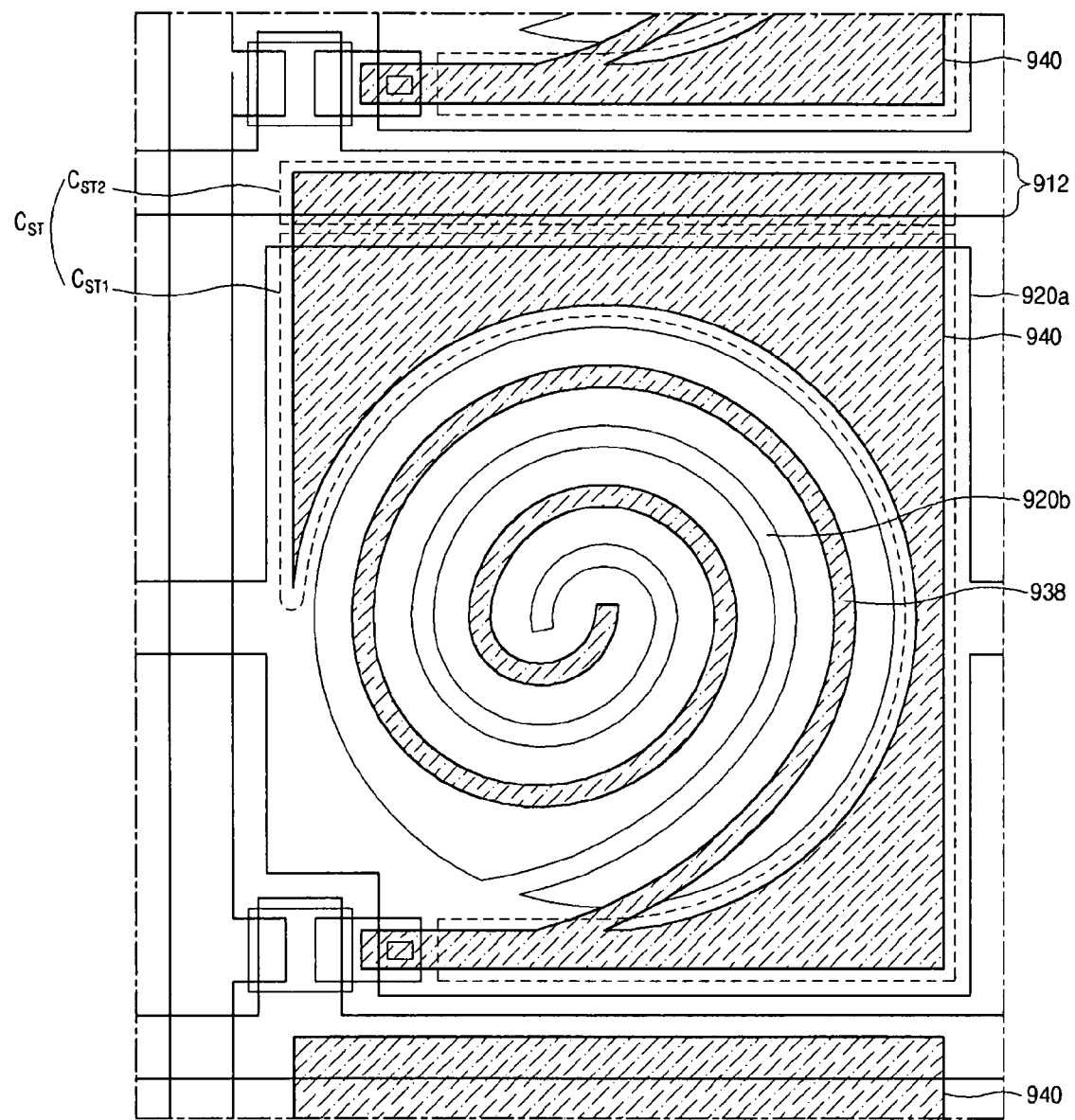
FIG. 21 is a schematic plane view of an array substrate for an IPS-LCD device according to a ninth embodiment of the present invention.

FIG. 21 is a schematic plan view of an array substrate for an IPS-LCD device according to a ninth embodiment of the present invention. The array substrate of FIG. 21 is similar to FIG. 7, but includes an enlarged storage capacitor.

In FIG. 21, the array substrate includes a gyroidal pixel electrode 938 and a gyroidal second common electrode pattern 920b such that the array substrate has an aperture area similar to the gyre shape of the second embodiment illustrated in FIG. 7. A capacitor electrode 940 overlapping a first common electrode pattern 920a is enlarged over a previous gate line 912 of a previous pixel region. Thus, the capacitor electrode 940 forms a first storage capacitor CST1 with the overlapped portion of the first common electrode pattern 920a, and forms a second storage capacitor CST2 with the overlapped portion of the pervious gate electrode 912. Therefore, a total storage capacitor CST has improved capacitance without reduction of aperture ratio and the IPS-LCD device can be driven in stable.

Figure 22:
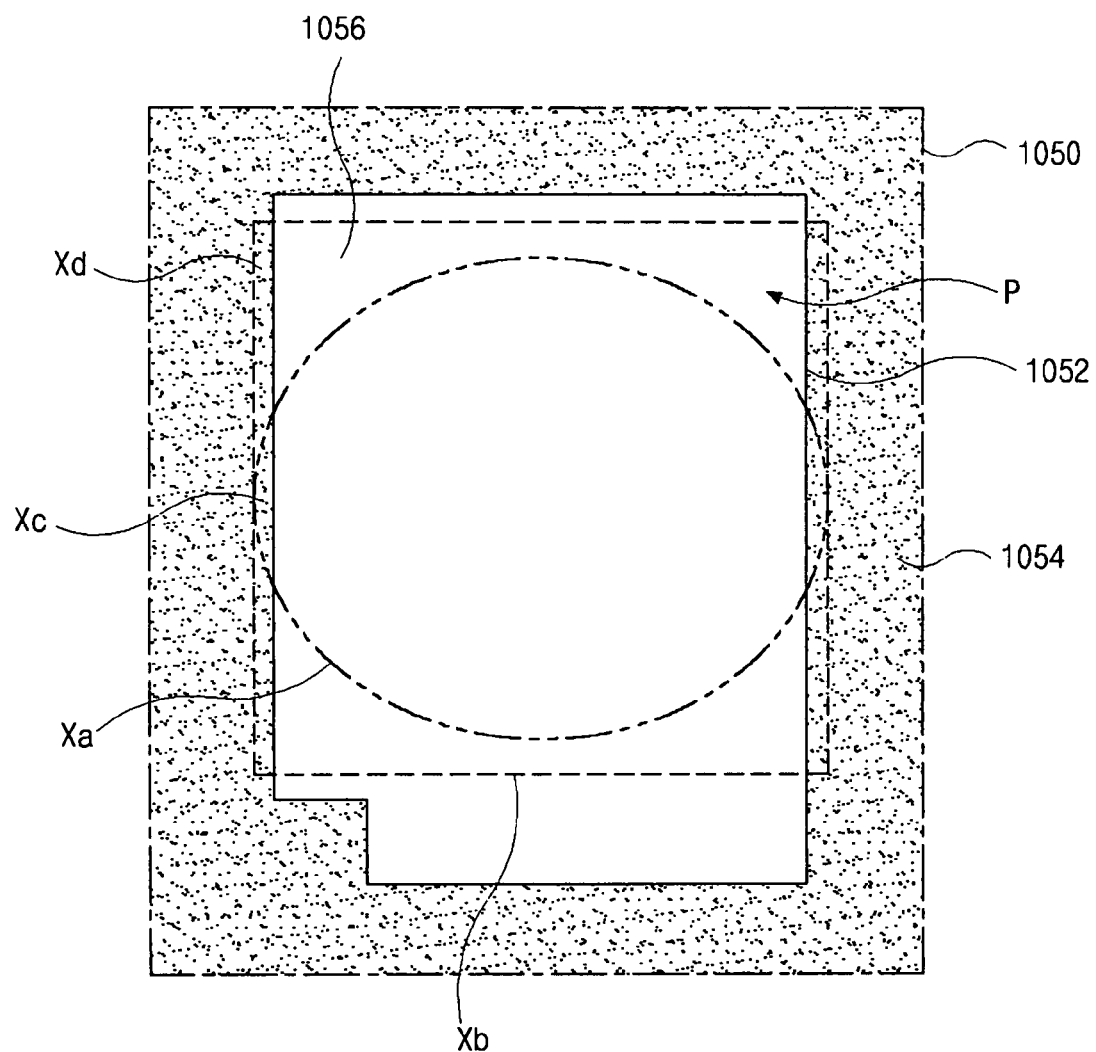
FIG. 22 is a schematic plan view illustrating a pixel of a color filter substrate that is attached to the aforementioned array substrate.

FIG. 22 is a schematic plan view illustrating one pixel of a color filter substrate that is attached to the aforementioned array substrate. The color filter substrate of FIG. 22 can be utilized for the array substrate having one of the circular aperture areas and the gyre aperture areas.

A black matrix 1054 having a rectangular-like opening 1052 is formed on a substrate 1050. A color filter 1056 is formed on the substrate 1050 to be fit into the rectangular-like opening 1052, such that the black matrix 1054 becomes a border of neighboring color filters formed next pixels. In FIG. 22, a first area "Xa" denotes an area where the circular or gyroidal electrodes are formed. A second area "Xb" denotes an area that corresponds in position to the rectangular electrode formed in array substrate. If the first area "Xa" for the circular or gyroidal electrodes overlaps the black matrix 1054, it forms a first overlapped area "Xc." And if the second area "Xb" for the rectangular electrode overlaps the black matrix 1054, it forms a second overlapped area "Xd." Generally, it is noticeable that the second overlapped area "Xd" is larger than the first overlapped area "Xc." Namely, when the color filter substrate is misaligned with the array substrate when they are attached to each other, the deduction of aperture ratio is minimized because the circular or gyroidal electrode overlaps less of the black matrix 1054 than the rectangular electrode (i.e., Xc<Xd).

Figure 23:
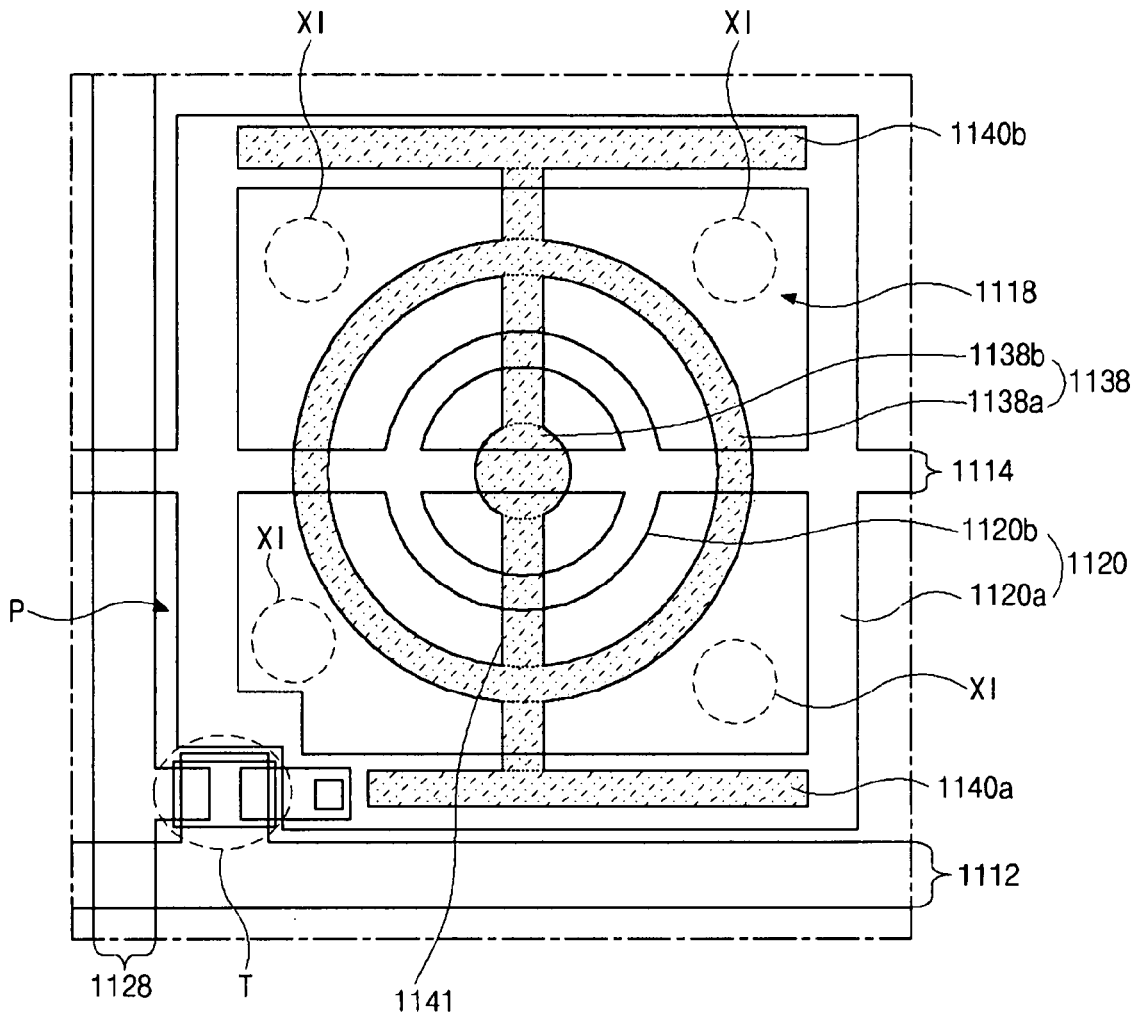
FIG. 23 is a plan view illustrating a pixel of an array substrate for use in an IPS-LCD device according to a tenth embodiment of the present invention.

FIG. 23 is a plan view illustrating one pixel of an array substrate for use in an IPS-LCD device according to a tenth embodiment of the present invention.

As shown in FIG. 23, a gate line 1112 is transversely arranged and a data line 1128 is disposed substantially perpendicular to the gate line 1112. The gate and data lines 1112 and 1128 define a pixel region "P" on an array substrate. A thin film transistor (TFT) T is disposed near the gate and data lines 1112 and 1128 and is connected to the gate line 1112 and the data line 1128.

A common electrode 1120 including first and second common electrode patterns 1120a and 1120b is formed in the pixel region P. The first common electrode pattern 1120a is shaped like a rectangle and includes a rectangular-like opening 1118. The first common electrode pattern 1120a surrounds a boundary portion of the pixel region P. The second common electrode pattern 1120b has a ring shape in the rectangular-like opening 1118. The common electrode 1120 is connected to a common line 1114 that is substantially parallel with and spaced apart from the gate line 1112. The common line 1114 runs from left to right in the middle of the pixel region P.

A capacitor electrode 1140 including first and second capacitor electrode patterns 1140a and 1140b. The first capacitor electrode pattern 1140a is disposed over a bottom portion of the first common electrode pattern 1120a and is connected to the TFT T. The second capacitor electrode pattern 1140b is disposed over a top portion of the first common electrode pattern 1120a. In particular, the capacitor electrode 1140 is formed in an area where the first common electrode pattern 1120a is disposed such that the capacitor electrode 1140 overlaps the first common electrode pattern 1120a and forms a storage capacitor with the overlapped portions of the first common electrode pattern 120a. The first capacitor electrode pattern 1140a and the second capacitor electrode pattern 1140b are disposed in bottom and top portions of the pixel region P, respectively.

A pixel electrode 1138 including first and second pixel electrode patterns 1138a and 1138b is connected to the capacitor electrode 1140 through a pixel connecting line 1141. The first pixel electrode pattern 1138a has a ring shape and is disposed between the first and second common electrode patterns 1120a and 1120b, and the second pixel electrode pattern 238b has a circular shape and is disposed inside the circular band shaped second common electrode pattern 1120b, specifically at a crossing of the common and pixel connecting lines 1114 and 1141.

In the tenth embodiment, the first and second capacitor electrode patterns 1140a and 1140b face to and are spaced apart from each other. The first and second capacitor electrode patterns 1140a and 1140b have a substantially rectangular shape and are parallel to each other. The first and second capacitor electrode patterns 1140a and 1140b are connected to the first and second pixel electrode patterns 1138a and 1138b through the pixel connecting line 1141.

In FIG. 23, aperture areas are formed in between the first pixel electrode pattern 1138a and the second common electrode pattern 1120b and between the second pixel electrode pattern 1138b and the common electrode pattern 1120b. In the tenth embodiment, the first common electrode pattern 1120a is shaped like a rectangular ring shape, and thus the rectangular-like opening 1118 has four corner opening portions "XI." Therefore, the aperture area of the pixel region P is enlarged as much as the four corner opening portions "XI." Namely, the aperture ratio of the array substrate increases and the brightness of the IPS-LCD also increases.

Although not shown in FIG. 23, the first common electrode pattern 1120a and the capacitor electrode 1140 may be utilized in an array substrate having the gyre common and pixel electrodes to produce the gyroidal aperture area.

Figure 24:
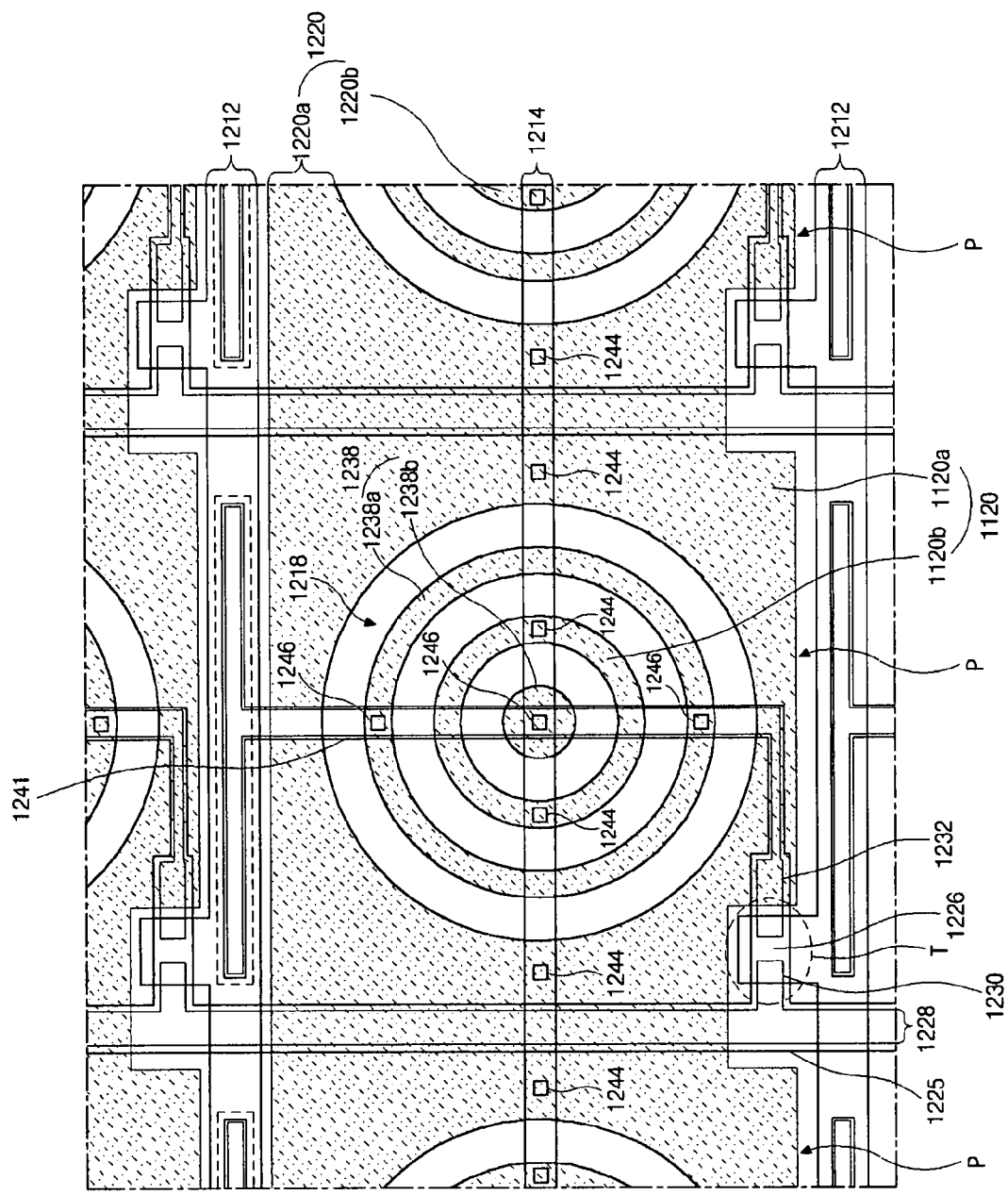
FIG. 24 is a schematic plan view of an array substrate for an IPS-LCD device according to an eleventh embodiment of the present invention.

FIG. 24 is a schematic plan view of an array substrate for an IPS-LCD device according to an eleventh embodiment of the present invention.

As shown in FIG. 24, gate lines 1212 are transversely arranged and data lines 1228 are disposed substantially perpendicular to the gate lines 1212. Pairs of the gate and data lines 1212 and 1228 define a pixel region P on an array substrate. A semiconductor line 1225 is formed to have the same pattern shape as the data line 1228. A thin film transistor (TFT) T is disposed at one corner of the pixel region P and is connected to the gate line 1212 and the data line 1228. The semiconductor line 1225 extends to the TFT T and then forms a semiconductor layer 1226 under the source and drain electrodes 1230 and 1232. A pixel connecting line 1241 vertically crosses the middle of the pixel region P, and is connected to the drain electrode 1232 of the TFT T.

A common electrode 1220 including first and second common electrode patterns 1220a and 1220b is formed in the pixel region P. The first common electrode pattern 1220a is shaped like a rectangle and includes a circular opening 1218 such that the first common electrode pattern 1220a surrounds a boundary portion of the pixel region P. The second common electrode pattern 1220b has a ring shape and is disposed inside the circular opening 1218.

A pixel electrode 1238 includes first and second pixel electrode patterns 1238a and 1238b. The first pixel electrode pattern 1238a has a ring shape and is disposed between the first and second common electrode patterns 1220a and 1220b, and the second pixel electrode pattern 1238b has a circular shape and is disposed inside the circular band shaped second common electrode pattern 1220b. The pixel electrode 1238 and the common electrode 1220 form circular band shaped aperture areas and may be formed of the same material during the same process. For example, the pixel electrode 1238 and the common electrode 1220 may be formed of a transparent conductive material using a lift-off process.

A passivation layer (not shown) having a low dielectric constant is interposed between the data line 1228 and the common electrode 1220 and between the pixel connecting line 1241 and the pixel electrode 1238. For example, benzocyclobutene (BCB) or acrylic resin may be used for the passivation layer. The passivation layer has first and second contact holes 1244 and 1246 that expose the common line 1214 and the pixel connecting line 1241, respectively. The first contact holes 1244 are disposed under the common electrode 1220 and expose portions of the common line 1214 such that first contact holes 1244 contact the common electrode 1220 to the common line 1214. The second contact holes 1246 are disposed under the pixel electrode 1238 and expose portions of the pixel connecting line 1241 such that they connect the pixel electrode 1238 to the pixel connecting line 1241. Specifically, the common electrode 1220 is connected to the common line 1214 through the first contact holes 1244 of the passivation layer, and the pixel electrode 1238 is connected to the pixel connecting line 1241 through the second contact holes 1246 of the passivation layer.

In the eleventh embodiment of FIG. 24, because the passivation layer having a low dielectric constant is interposed between the data line 1228 and the common electrode 1220 and between the pixel connecting line 1241 and the pixel electrode 1238, electric interferences between them may be reduced. Accordingly, the common electrode 1220 can be enlarged in an area and the aperture ratio is further improved. Moreover, because the array substrate shown in FIG. 24 includes the passivation layer having contact holes for high aperture ratio, the array substrate may be formed using a four mask process in which the common and pixel electrodes are formed of the same material during the same process.

In the present invention, because the common electrode and the pixel electrode have a circular shape, directors of liquid crystal molecules are the same in all directions. Thus, contrast ratio and viewing angle are improved without color inversion in a specific angle.

It will be apparent to those skilled in the art that various modifications and variation can be made in the array substrate of the present invention without departing from the spirit or scope of the invention. Thus, it is intended that the present invention cover the modifications and variations of this invention provided they come within the scope of the appended claims and their equivalents.

What is claimed is:

1. An array substrate for use in an in-plane switching liquid crystal display device, comprising:
   a gate line on a substrate;
   a data line crossing the gate line to define a pixel region having an aperture area;
   a thin film transistor disposed at one corner of the pixel region and connected to the gate line and the data line, the thin film transistor including a semiconductor layer;
   a common electrode disposed in the pixel region and having first and second common electrode patterns, wherein the first common electrode pattern is substantially rectangle-shaped and has a substantially circular opening in the middle thereof, and the second common electrode pattern is disposed in the substantially circular opening and has a substantially gyre shape;
   a common line substantially perpendicular to and crossing the data line and connecting the common electrode to a neighboring common electrode in a neighboring pixel region;
   a capacitor electrode overlapping the first common electrode pattern, the capacitor electrode connected to the thin film transistor; and
   a pixel electrode disposed within the substantially circular opening and having a substantially gyre shape along a side of the second common electrode pattern,
   wherein the pixel electrode and the second common electrode pattern each have the substantially gyre shape,
   wherein the aperture area is substantially gyre shaped.

2. The array substrate of claim 1, wherein the second common electrode pattern extends from the first common electrode pattern.

3. The array substrate of claim 2, wherein the pixel electrode extends from the capacitor electrode, the extension of the pixel electrode starting next to the extension of the second common electrode pattern.

4. The array substrate of claim 1, wherein a first helical turn of the pixel electrode is located between the first common electrode pattern and a first helical turn of the second common electrode pattern.

5. The array substrate of claim 1, wherein the common line is formed as one unitary pattern with the common electrode.

6. The array substrate of claim 1, wherein the capacitor electrode has a substantially rounded side along the substantially circular opening of the first common electrode pattern.

7. The array substrate of claim 1, wherein four neighboring pixel regions correspond to red, green, blue and white colors, respectively.

8. The array substrate of claim 1, wherein the capacitor electrode and the common electrode overlap to form a first storage capacitor.

9. The array substrate of claim 8, wherein the capacitor electrode overlaps a previous gate line of a previously neighboring pixel region to form a second storage capacitor.

10. The array substrate of claim 1, further comprising a semiconductor line under the data line and having the same pattern shape as the data line, wherein the semiconductor layer extends from the semiconductor line.

11. A method of forming an array substrate for an in-plane switching liquid crystal display device, comprising:
   forming a gate line having a gate electrode, a common electrode having first and second common electrode patterns, and a common line substantially parallel to and spaced apart from the gate line on a substrate using a first mask process, wherein the first common electrode pattern is substantially rectangle-shaped and has a substantially circular opening in the middle thereof, and the second common electrode pattern is disposed in the substantially circular opening and has a substantially gyre shape;
   forming a gate insulating layer on the gate line, the common electrode and the common line;
   forming a semiconductor layer on the gate insulating layer and over the gate electrode using a second mask process;
   forming a data line that crosses the gate line to define a pixel region having an aperture area, a source electrode extending from the data line, and a drain electrode spaced apart from the source electrode using a third mask process, wherein the source and drain electrodes overlap opposite end portions of the semiconductor layer, the semiconductor layer being exposed between the source and drain electrodes, and the gate electrode, the semiconductor layer, the source electrode and the drain electrode forming a thin film transistor;
   forming a passivation layer over an entire surface of the substrate to cover the thin film transistor and patterning the passivation layer using a fourth mask process to form a drain contact hole to expose a portion of the drain electrode; and
   forming a capacitor electrode overlapping the first common electrode pattern, and a pixel electrode within the substantially circular opening and having a substantially gyre shape along a side of the second common electrode pattern using a fifth mask process,
   wherein the capacitor electrode is connected to the thin film transistor, and the pixel electrode and the second common electrode pattern each have the substantially gyre shape, wherein the aperture area is substantially gyre shaped.

12. The method of claim 11, wherein the second common electrode pattern extends from the first common electrode pattern.

13. The method of claim 12, wherein the pixel electrode extends from the capacitor electrode, the extension of the pixel electrode starting next to the extension of the second common electrode pattern.

14. The method of claim 11, wherein a first helical turn of the pixel electrode is disposed between the first common electrode pattern and a first helical turn of the second common electrode pattern.

15. The method of claim 11, wherein the common line is formed as one unitary pattern with the common electrode.

16. The method of claim 11, wherein the capacitor electrode has a substantially rounded side along the substantially circular opening of the first common electrode pattern.

17. The method of claim 11, wherein four neighboring pixel regions correspond to red, green, blue and white colors, respectively.

18. The method of claim 11, wherein the capacitor electrode and the common electrode overlap to form a first storage capacitor.

19. The method of claim 18, wherein the capacitor electrode overlaps a previous gate line of a previously neighboring pixel region to form a second storage capacitor.

20. A method of forming an array substrate for an in-plane switching liquid crystal display device, comprising:
    forming a gate line having a gate electrode, a common electrode having first and second common electrode patterns, and a common line substantially parallel to and spaced apart from the gate line on a substrate using a first mask process, wherein the first common electrode pattern is substantially rectangle-shaped and has a substantially circular opening in the middle thereof, and the second common electrode pattern is disposed in the substantially circular opening and has a substantially gyre shape;
    forming a gate insulating layer on the gate line, the common electrode and the common line;
    forming a data line that crosses the gate line to define a pixel region having an aperture area, a source electrode extending from the data line, a drain electrode spaced apart from the source electrode across the gate electrode, a semiconductor line under the data line and having the same pattern shape as the data line, and a semiconductor layer extending from the semiconductor line over the gate electrode and under the source and drain electrode using a second mask process, wherein the source and drain electrodes overlap opposite end portions of the gate electrode, the semiconductor layer being exposed between the source and drain electrodes, and the gate electrode, the semiconductor layer, the source electrode and the drain electrode forming a thin film transistor;
    forming a passivation layer over an entire surface of the substrate to cover the thin film transistor and patterning the passivation layer using a third mask process to form a drain contact hole to expose a portion of the drain electrode; and
    forming a capacitor electrode that overlaps the first common electrode pattern, and a pixel electrode disposed within the substantially circular opening and having a substantially gyre shape along the second common electrode pattern using a fourth mask process, wherein the capacitor electrode is connected to the thin film transistor, and the pixel electrode and the second common electrode pattern each have the substantially gyre shape, wherein the aperture area is substantially gyre shaped.

21. The method of claim 20, wherein the second common electrode pattern extends from the first common electrode pattern.

22. The method of claim 21, wherein the pixel electrode extends from the capacitor electrode, the extension of the pixel electrode starting next to the extension of the second common electrode pattern.

23. The method of claim 20, wherein a first helical turn of the pixel electrode is disposed between the first common electrode pattern and a first helical turn of the second common electrode pattern.

24. The method of claim 20, wherein the common line is formed as one unitary pattern with the common electrode.

25. The method of claim 20, wherein the capacitor electrode has a substantially rounded side along the substantially circular opening of the first common electrode pattern.

26. The method of claim 20, wherein four neighboring pixel regions correspond to red, green, blue and white colors, respectively.

27. The method of claim 20, wherein the capacitor electrode and the common electrode overlap to form a first storage capacitor.

28. The method of claim 27, wherein the capacitor electrode overlaps a previous gate line of a previously neighboring pixel region to form a second storage capacitor.

29. An array substrate for use in an in-plane switching liquid crystal display device, comprising:
    a gate line on a substrate;
    a data line crossing the gate line to define a pixel region having an aperture area;
    a semiconductor line under the data line and having the same pattern shape as the data line;
    a thin film transistor disposed at one corner of the pixel region and connected to the gate and data lines, the thin film transistor including source and drain electrodes and a semiconductor layer extending from the semiconductor line;
    a common line spaced apart from and substantially parallel to the gate line;
    a capacitor electrode overlapping a previous gate line of a previously neighboring pixel region;
    a pixel connecting line substantially parallel to the data line within the pixel region and connected to the capacitor electrode and the drain electrode of the thin film transistor;
    a common electrode including a plurality of common electrode patterns, each of the common electrode patterns divided into two parts by the pixel connecting line without overlapping the pixel connecting line; and
    a pixel electrode within a substantially circular opening and including a plurality of pixel electrode patterns without overlapping the common line,
    wherein an outermost common electrode pattern is substantially rectangle-shaped within the pixel region and has a substantially circular opening in the middle thereof, and other common electrode patterns are shaped substantially like semicircular arcs,
    wherein an innermost pixel electrode pattern has a substantially rod shape and is disposed within an area of pixel connecting line, and other pixel electrode patterns have a substantially semicircular-arc shape, and
    wherein the plurality of common electrode patterns and the plurality of pixel electrode patterns form substantially circular band shaped aperture areas.

30. The array substrate of claim 29, wherein the pixel electrode overlaps portions of the pixel connecting line and directly contacts the pixel connecting line.

31. The array substrate of claim 29, wherein the common electrode overlaps portions of the common line and directly contacts the common line.

32. A method of forming an array substrate for use in an in-plane switching liquid crystal display device, comprising:
    forming a gate line having a gate electrode and a common line substantially parallel to and spaced apart from the gate line on a substrate using a first mask process;
    forming a gate insulating layer on the gate line and the common line;
    forming a data line that crosses the gate line to define a pixel region having an aperture area, a source electrode extending from the data line, a drain electrode spaced apart from the source electrode, a pixel connecting line extending from the drain electrode and substantially parallel to the data line, a capacitor electrode over a previous gate line extending from the pixel connecting line, a semiconductor line under the data line and having the same pattern shape as the data line, and a semiconductor layer extending from the semiconductor line over the gate electrode and under the source and drain electrode using a second mask process, wherein the source and drain electrodes overlap opposite end portions of the gate electrode, the semiconductor layer being exposed between the source and drain electrodes, and the gate electrode, the semiconductor layer, the source electrode and the drain electrode form a thin film transistor;

forming a photoresist pattern on the thin film transistor using a third mask process, the photoresist pattern including two first symmetric open portions separated from the pixel connecting line without overlapping the pixel connecting line and two second symmetric open portions separated from the common line without overlapping the common line;

etching the gate insulating layer using the photoresist pattern as an etch mask to expose the common and pixel connecting lines under the two first symmetric open portions;

forming a transparent conductive layer on an entire surface of the substrate having the photoresist pattern; and removing the transparent conductive layer on the photoresist pattern by stripping the photoresist pattern to obtain a common electrode and a pixel electrode, wherein the common and pixel electrodes fit in the first and second symmetric open portions of the photoresist, the common electrode including a plurality of common electrode patterns, and the pixel electrode including a plurality of pixel electrode patterns, wherein an outermost common electrode pattern is substantially rectangle-shaped within the pixel region and has a substantially circular opening in the middle thereof, and other common electrode patterns are patterned to have substantially semicircular arcs, wherein an innermost pixel electrode pattern has a substantially rod shape and is disposed within an area of the pixel connecting line, and the other pixel electrode patterns are substantially semicircular-arc shaped, and wherein the aperture area is circular band shaped.

33. The method of claim 32, wherein the pixel electrode overlaps portions of the pixel connecting line and directly contacts the pixel connecting line.

34. The method of claim 32, wherein the common electrode overlaps portions of the common line and directly contacts the common line.

35. An array substrate for an in-plane switching liquid crystal display device, comprising:
a gate line on a substrate;
a data line crossing the gate line to define a pixel region having an aperture area;
a gate pad connected to one end of the gate line;
a data pad connected to one end of the data line;
a gate pad terminal connected to the gate pad;
a data pad terminal connected to the data pad;
a semiconductor line under the data line and having the same pattern shape as the data line;
a thin film transistor disposed at one corner of the pixel region and connected to the gate and data lines, the thin film transistor including source and drain electrodes and a semiconductor layer extending from the semiconductor line;
a common line spaced apart from and substantially parallel to the gate line;
a common electrode extending from the common line and including a plurality of common electrode patterns, wherein an outermost common electrode pattern is substantially rectangle-shaped within the pixel region and has a substantially circular opening in the middle thereof;
a capacitor electrode overlapping a previous gate line of a previously neighboring pixel region;
a pixel electrode within the substantially circular opening and including a plurality of pixel electrode patterns; and
a pixel connecting line substantially parallel to the data line in the pixel region and connected to the capacitor electrode, the pixel electrode and the drain electrode of the thin film transistor,
wherein the innermost pixel electrode pattern is shaped like a rod and disposed within an area of the pixel connecting line,
wherein the pixel electrode overlaps portions of the pixel connecting line and directly contacts the pixel connecting line,
wherein other pixel electrode patterns are patterned to have semicircular shapes, and
wherein the semiconductor line extends underneath the source and drain electrodes, the pixel connection line and the capacitor electrode,
wherein an innermost portion of the plurality of common electrode patterns is substantially circular band shaped, and
wherein the aperture area is circular band shaped.

36. The array substrate of claim 35, wherein the plurality of common electrode patterns are arranged in an alternating pattern with the plurality of pixel electrode patterns.

37. The array substrate of claim 35, wherein the innermost portion of the pixel electrode pattern is disposed at a center portion of the pixel region where the common line and the pixel connecting line cross.

38. The array substrate of claim 35, wherein the capacitor electrode pattern is connected to the thin film transistor though the pixel connecting line.

39. The array substrate of claim 35, wherein four neighboring pixel regions correspond to red, green, blue and white colors, respectively.

40. The array substrate of claim 35, wherein the pixel and common electrode patterns are disposed within the substantially circular opening, except the outermost common electrode pattern.

41. A method of forming an array substrate for use in an in-plane switching liquid crystal display device, comprising:
forming a gate line having a gate electrode, a common electrode including a plurality of common electrode patterns, a gate pad connected to one end of the gate line and a common line substantially parallel to and spaced apart from the gate line on a substrate using a first mask process, wherein an outermost common electrode pattern is substantially rectangle-shaped and has a substantially circular opening in the middle thereof;

forming a gate insulating layer on the gate line, the common electrode, the gate pad and the common line;

forming a data line that crosses the gate line to define a pixel region having an aperture area, a source electrode extending from the data line, a drain electrode spaced apart from the source electrode across the gate electrode, a pixel connecting line extending from the drain electrode and substantially parallel to the data line, a capacitor electrode over a previous gate line with extending from the pixel connecting line, a data pad connected to one end of the data line, a semiconductor line under the data line and having the same pattern shape with the data line, and a semiconductor layer extending from the semiconductor line over the gate electrode and under the source and drain electrodes and pixel connecting line and capacitor electrode using a second mask process, wherein the source and drain electrodes overlap opposite end portions of the gate electrode, the semiconductor layer being exposed between the source and drain electrodes, and the gate electrode, the semiconductor layer, the source electrode and the drain electrode form a thin film transistor;

forming a passivation layer over the data line, the source and drain electrodes, the data pad, the pixel connecting line, and the capacitor electrode;

forming a photoresist pattern on the passivation layer to cover the thin film transistor using a third mask process, the photoresist pattern having openings between the plurality of common electrode patterns and contact openings exposing the gate and data pads;

forming a transparent conductive layer on an entire surface of the substrate to cover the photoresist pattern; and removing the transparent conductive layer on the photoresist pattern by stripping the photoresist pattern to obtain a pixel electrode, a gate pad terminal and a data pad terminal, wherein the pixel electrode fits in the openings of the photoresist and directly contacts the pixel connecting line, the pixel electrode including a plurality of pixel electrode patterns, wherein an innermost pixel electrode pattern has a substantially rod shape and other pixel electrode patterns are patterned to have semicircular shapes, wherein an innermost portion of the plurality of common electrode patterns is substantially circular band shaped, and wherein the aperture area is circular band shaped.

42. The method of claim 41, wherein the plurality of common electrode patterns are arranged in an alternating pattern with the plurality of pixel electrode patterns.

43. The method of claim 41, wherein the innermost pixel electrode pattern is disposed at a center portion of the pixel region where the common line and the pixel connecting line cross.

44. The method of claim 41, wherein the capacitor electrode pattern is connected to the thin film transistor though the pixel connecting line.

45. The method of claim 41, wherein the capacitor electrode overlaps the outermost common electrode pattern and forms a storage capacitor with the overlapped portion of the outermost common electrode pattern.

46. The method of claim 41, wherein the pixel and common electrode patterns are within the substantially circular opening except the outermost common electrode pattern.

* * * * *